(12) United States Patent
Hu et al.

(10) Patent No.: US 12,534,504 B2
(45) Date of Patent: Jan. 27, 2026

(54) IL-2 MUTANT PROTEIN PROLIFERATING IMMUNE CELLS

(71) Applicant: SHANGHAI GP BIOTECH CO. LTD., Shanghai (CN)

(72) Inventors: Hui Hu, Shanghai (CN); Ying Zhang, Shanghai (CN)

(73) Assignee: SHANGHAI GP BIOTECH CO. LTD., Shanghai (CN)

(*) Notice: Subject to any disclaimer, the term of this patent is extended or adjusted under 35 U.S.C. 154(b) by 1107 days.

(21) Appl. No.: 17/610,538

(22) PCT Filed: May 14, 2020

(86) PCT No.: PCT/CN2020/090365
§ 371 (c)(1),
(2) Date: Nov. 11, 2021

(87) PCT Pub. No.: WO2020/228791
PCT Pub. Date: Nov. 19, 2020

(65) Prior Publication Data
US 2022/0227829 A1    Jul. 21, 2022

(30) Foreign Application Priority Data
May 14, 2019 (CN) .......................... 201910399641.1

(51) Int. Cl.
| C07K 14/55 | (2006.01) |
| A61K 38/00 | (2006.01) |
| C12N 5/0783 | (2010.01) |
| C12N 15/62 | (2006.01) |
| C12N 15/85 | (2006.01) |

(52) U.S. Cl.
CPC ............ *C07K 14/55* (2013.01); *C12N 5/0638* (2013.01); *C12N 5/0646* (2013.01); *C12N 15/62* (2013.01); *C12N 15/85* (2013.01); *A61K 38/00* (2013.01); *C12N 2510/00* (2013.01); *C12N 2800/107* (2013.01)

(58) Field of Classification Search
CPC .. C07K 14/55; C07K 2319/30; C12N 5/0638; C12N 5/0646; C12N 2501/2302; A61K 38/00; A61K 38/2013; A61P 35/00; A61P 37/04
See application file for complete search history.

(56) References Cited

U.S. PATENT DOCUMENTS

| 5,814,314 A | 9/1998 | Uclaf |
| 2007/0036752 A1 | 2/2007 | Gillies et al. |
| 2016/0208017 A1 | 7/2016 | Ast et al. |

FOREIGN PATENT DOCUMENTS

| WO | 03015697 A2 | 2/2003 | |
| WO | WO 2003/015697 A2 * | 2/2003 | |
| WO | 2003/048334 A2 | 6/2003 | |
| WO | 2004/022593 A2 | 3/2004 | |
| WO | WO-2008003473 A2 * | 1/2008 | .............. A61P 35/00 |
| WO | 2009/061853 A2 | 5/2009 | |
| WO | 2012/107417 A2 | 8/2012 | |
| WO | 2014/150600 A2 | 9/2014 | |

OTHER PUBLICATIONS

Pechmann et al. PLoS Comput Biol. Jun. 26, 2014;10(6):e1003674. (Year: 2014).*
Mizui M. Clin Immunol. Sep. 2019;206:63-70. Epub Nov. 8, 2018. (Year: 2018).*
Carmenate, Tania et al., "Human IL-2 Mutein with Higher Antitumor Efficacy than Wild Type IL-2" The Journal of Immunology, American Association of Immunologists, vol. 190, No. 12, May 15, 2023, pp. 6230-6238.
Heaton, Keith M. et al., "Human Interleukin 2 Analogues that Preferentially Bind the Intermediate-Affinity Interleukin 2 Receptor Lead to Reduced Secondary Cytokine Secretion: Implications for the Use of These Interleukin 2 Analogues in Cancer Immunotheraphy" Cancer Research, American Association for Cancer Research, vol. 53, No. 11, Jun. 1, 1993, pp. 2597-2602.
International Search Report mailed Aug. 20, 2020 corresponding to PCT/CN2020/090365 filed May 14, 2020; 4 pages.

* cited by examiner

*Primary Examiner* — Jeffrey Stucker
*Assistant Examiner* — Sarah Cooper Patterson
(74) *Attorney, Agent, or Firm* — HSML P.C.

(57) ABSTRACT

Provided in the present invention are an IL-2 mutant protein, a fusion protein or conjugate containing the IL-2 mutant protein, and a pharmaceutical composition containing the IL-2 mutant protein, fusion protein or conjugate. Compared with wild-type IL-2 protein, the IL-2 mutant protein of the present invention eliminates or reduces the affinity for a high-affinity IL-2 receptor and substantially retains the affinity for a medium-affinity IL-2 receptor.

6 Claims, 15 Drawing Sheets

Specification includes a Sequence Listing.

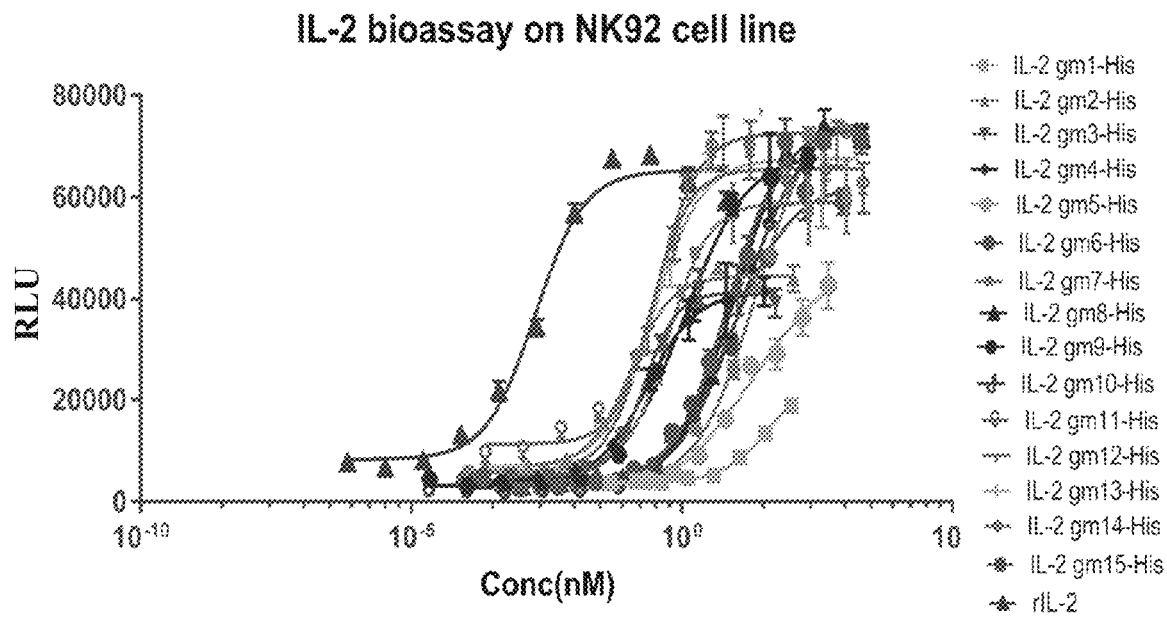
Fig. 4
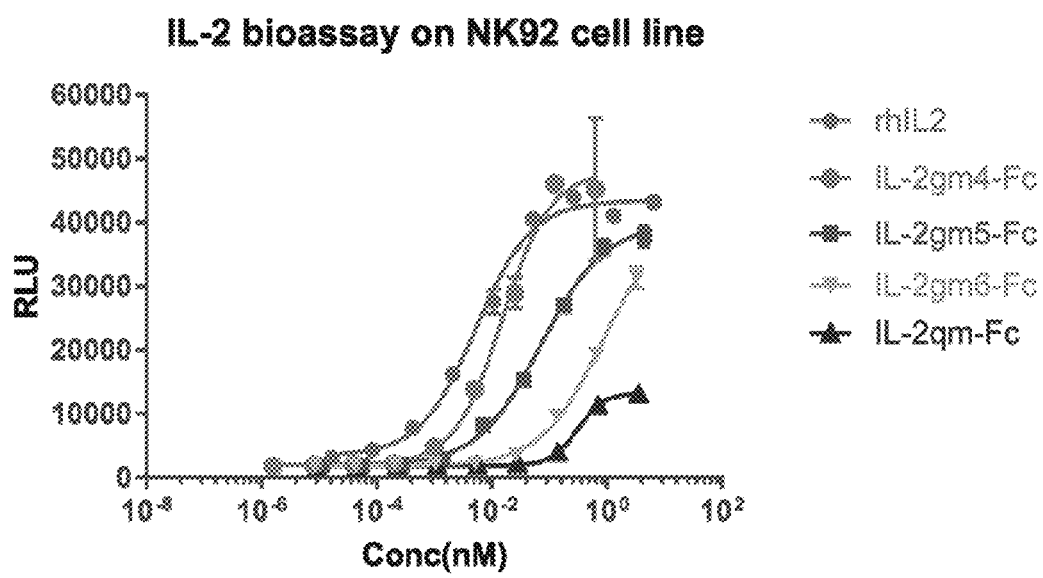
Fig. 5
APASSSTKKTQLQLEHLLLDLQMILNGINNYKNPKLTRNLTFKFYMPKK
ATELKHLQCLEEELKPLEEVLNLAQSKNFHLRPRDLISNINVIVLELKGSETTF
MCEYADETATIVEFLNRWITFAQSIISTLTHHHHHH
Fig. 6a APASSSTKKTQLQLEHLLLDLQMILNGINNYKNPKLTRNLTFKFYMPKK
ATELKHLQCLEEELKPLEEVLNLAQSKNFHLRPRDLISNINVIVLELKGSETTF
MCEYADETATIVEFLNRWITFAQSIISTLTDAHKSEVAHRFKDLGEENFKALV
LIAFAQYLQQCPFEDHVKLVNEVTEFAKTCVADESAENCDKSLHTLFGDKLC
TVATLRETYGEMADCCAKQEPERNECFLQHKDDNPNLPRLVRPEVDVMCTA
FHDNEETFLKKYLYEIARRHPYFYAPELLFFAKRYKAAFTECCQAADKAACL
LPKLDELRDEGKASSAKQRLKCASLQKFGERAFKAWAVARLSQRFPKAEFA
EVSKLVTDLTKVHTECCHGDLLECADDRADLAKYICENQDSISSKLKECCEK
PLLEKSHCIAEVENDEMPADLPSLAADFVESKDVCKNYAEAKDVFLGMFLY
EYARRHPDYSVVLLLRLAKTYETTLEKCCAAADPHECYAKVFDEFKPLVEEP
QNLIKQNCELFEQLGEYKFQNALLVRYTKKVPQVSTPTLVEVSRNLGKVGSK
CCKHPEAKRMPCAEDYLSVVLNQLCVLHEKTPVSDRVTKCCTESLVNRRPC
FSALEVDETYVPKEFNAETFTFHADICTLSEKERQIKKQTALVELVKHKPKAT
KEQLKAVMDDFAAFVEKCCKADDKETCFAEEGKKLVAASQAALGL

Fig. 6b

APASSSTKKTQLQLEHLLLDLQMILNGINNYKNPKLTRMLTFKFYMPKN
ATELKHLQCLEEELKPLEEVLNLAQSKNFHLRPRDLISNINVIVLELKGSETTF
MCEYADETATIVEFLNRWITFAQSIISTLTHHHHHH

Fig. 6c

APASSSTKKTQLQLEHLLLDLQMILNGINNYKNPKLTRMLTFKFYMPKK
ATELKHLQCLEEELKPLEEVLNLTQSKNFHLRPRDLISNINVIVLELKGSETTF
MCEYADETATIVEFLNRWITFAQSIISTLTHHHHHH

Fig. 6d

APASSSTKKTQLQLEHLLLDLQMILNGINNYKNPKLTRMLTFKFYMPKK
ATELKHLQCLEEELKPLEEVLNLSQSKNFHLRPRDLISNINVIVLELKGSETTF
MCEYADETATIVEFLNRWITFAQSIISTLTHHHHHH

Fig. 6e

APASSSTKKTQLQLEHLLLDLQMILNGINNYKNPKLTRMLTFKFYMPKK
ATELKHLQCLEEELKPLEEVLNLAQSKNFHLRPRDLISNINVIVLELKGSETTF
MCEYANETATIVEFLNRWITFAQSIISTLTHHHHHH

Fig. 6f

APASSSTKKTQLQLEHLLLDLQMILNGINNYKNPKLTRNLTFKFYMPKN
ATELKHLQCLEEELKPLEEVLNLAQSKNFHLRPRDLISNINVIVLELKGSETTF
MCEYADETATIVEFLNRWITFAQSIISTLTHHHHHH

Fig. 6g

APASSSTKKTQLQLEHLLLDLQMILNGINNYKNPKLTRMLTFKFYMPKN
ATELKHLQCLEEELKPLEEVLNLTQSKNFHLRPRDLISNINVIVLELKGSETTF
MCEYADETATIVEFLNRWITFAQSIISTLTHHHHHH

Fig. 6h

APASSSTKKTQLQLEHLLLDLQMILNGINNYKNPKLTRMLTFKFYMPKN
ATELKHLQCLEEELKPLEEVLNLTQSKNFHLRPRDLISNINVIVLELKGSETTF
MCEYADETATIVEFLNRWITFAQSIISTLTGGGSGGGSGGGSGGGSEPKSSDK
THTSPPSPAPELEGGSSVFLFPPKPKDTLMISRTPEVTCVVVDVSHEDPEVKFN
WYVDGVEVHNAKTKPREEQYASTYRVVSVLTVLHQDWLNGKAYACAVSN
KALPAPIEKTISKAKGQPREPQVYTLPPSREEMTKNQVSLTCLVKGFYPSDIA
VEWESNGQPENNYKTTPPVLDSDGSFFLYSKLTVDKSRWQQGNVFSCSVMH
EALHNHYTQKSLSLSPGK*

Note : GGGSGGGSGGGSGGGS is linker

Fig. 6i

APASSSTKKTQLQLEHLLLDLQMILNGINNYKNPKLTRNLTFKFYMPKK
ATELKHLQCLEEELKPLEEVLNLTQSKNFHLRPRDLISNINVIVLELKGSETTF
MCEYADETATIVEFLNRWITFAQSIISTLTHHHHHH

Fig. 6j

APASSSTKKTQLQLEHLLLDLQMILNGINNYKNPKLTRNLTFKFYMPKK
ATELKHLQCLEEELKPLEEVLNLAQSKNFHLRPRDLISNINVIVLELKGSETTF
MCEYANETATIVEFLNRWITFAQSIISTLTHHHHHH

Fig. 6k

APASSSTKKTQLQLEHLLLDLQMILNGINNYKNPKLTRMLTFKFYMPKN
ATELKHLQCLEEELKPLEEVLNLAQSKNFHLRPRDLISNINVIVLELKGSETTF
MCEYANETATIVEFLNRWITFAQSIISTLTHHHHHH

Fig. 6l

APASSSTKKTQLQLEHLLLDLQMILNGINNYKNPKLTRMLTFKFYMPKK
ATELKHLQCLEEELKPLEEVLNLTQSKNFHLRPRDLISNINVIVLELKGSETTF
MCEYANETATIVEFLNRWITFAQSIISTLTHHHHHH

Fig. 6m

APASSSTKKTQLQLEHLLLDLQMILNGINNYKNPKLTRNLTFKFYMPKN
ATELKHLQCLEEELKPLEEVLNLTQSKNFHLRPRDLISNINVIVLELKGSETTF
MCEYADETATIVEFLNRWITFAQSIISTLTHHHHHH

Fig. 6n

APASSSTKKTQLQLEHLLLDLQMILNGINNYKNPKLTRNLTFKFYMPKN
ATELKHLQCLEEELKPLEEVLNLTQSKNFHLRPRDLISNINVIVLELKGSETTF
MCEYADETATIVEFLNRWITFAQSIISTLTEPKSSDKTHTSPPSPAPELEGGSSV
FLFPPKPKDTLMISRTPEVTCVVVDVSHEDPEVKFNWYVDGVEVHNAKTKP
REEQYASTYRVVSVLTVLHQDWLNGKAYACAVSNKALPAPIEKTISKAKGQ
PREPQVYTLPPSREEMTKNQVSLTCLVKGFYPSDIAVEWESNGQPENNYKTT
PPVLDSDGSFFLYSKLTVDKSRWQQGNVFSCSVMHEALHNHYTQKSLSLSPG
K

Fig. 6o

APASSSTKKTQLQLEHLLLDLQMILNGINNYKNPKLTRMLTFKFYMPKN
ATELKHLQCLEEELKPLEEVLNLTQSKNFHLRPRDLISNINVIVLELKGSETTF
MCEYANETATIVEFLNRWITFAQSIISTLTHHHHHH

Fig. 6p

APASSSTKKTQLQLEHLLLDLQMILNGINNYKNPKLTRNLTFKFYMPKK
ATELKHLQCLEEELKPLEEVLNLTQSKNFHLRPRDLISNINVIVLELKGSETTF
MCEYANETATIVEFLNRWITFAQSIISTLTHHHHHH

Fig. 6q

APASSSTKKTQLQLEHLLLDLQMILNGINNYKNPKLTRNLTFKFYMPKN
ATELKHLQCLEEELKPLEEVLNLAQSKNFHLRPRDLISNINVIVLELKGSETTF
MCEYANETATIVEFLNRWITFAQSIISTLTHHHHHH

Fig. 6r

APASSSTKKTQLQLEHLLLDLQMILNGINNYKNPKLTRNLTFKFYMPKN
ATELKHLQCLEEELKPLEEVLNLTQSKNFHLRPRDLISNINVIVLELKGSETTF
MCEYANETATIVEFLNRWITFAQSIISTLTHHHHHH

Fig. 6s

APASSSTKKTQLQLEHLLLDLQMILNGINNYKNPKLTRNLTFKFYMPKN
ATELKHLQCLEEELKPLEEVLNLTQSKNFHLRPRDLISNINVIVLELKGSETTF
MCEYANETATIVEFLNRWITFAQSIISTLTEPKSSDKTHTSPPSPAPELEGGSSV
FLFPPKPKDTLMISRTPEVTCVVVDVSHEDPEVKFNWYVDGVEVHNAKTKP
REEQYASTYRVVSVLTVLHQDWLNGKAYACAVSNKALPAPIEKTISKAKGQ
PREPQVYTLPPSREEMTKNQVSLTCLVKGFYPSDIAVEWESNGQPENNYKTT
PPVLDSDGSFFLYSKLTVDKSRWQQGNVFSCSVMHEALHNHYTQKSLSLSPG
K

Fig. 6t

APASSSTKKTQLQLEHLLLDLQMILNGINNYKNPKLTRNLTFKFYMPKN
ATELKHLQCLEEELKPLEEVLNLTQSKNFHLRPRDLISNINVIVLELKGSETTF
MCEYANETATIVEFLNRWITFAQSIISTLTDAHKSEVAHRFKDLGEENFKALV
LIAFAQYLQQCPFEDHVKLVNEVTEFAKTCVADESAENCDKSLHTLFGDKLC
TVATLRETYGEMADCCAKQEPERNECFLQHKDDNPNLPRLVRPEVDVMCTA
FHDNEETFLKKYLYEIARRHPYFYAPELLFFAKRYKAAFTECCQAADKAACL
LPKLDELRDEGKASSAKQRLKCASLQKFGERAFKAWAVARLSQRFPKAEFA
EVSKLVTDLTKVHTECCHGDLLECADDRADLAKYICENQDSISSKLKECCEK
PLLEKSHCIAEVENDEMPADLPSLAADFVESKDVCKNYAEAKDVFLGMFLY
EYARRHPDYSVVLLLRLAKTYETTLEKCCAAADPHECYAKVFDEFKPLVEEP
QNLIKQNCELFEQLGEYKFQNALLVRYTKKVPQVSTPTLVEVSRNLGKVGSK
CCKHPEAKRMPCAEDYLSVVLNQLCVLHEKTPVSDRVTKCCTESLVNRRPC
FSALEVDETYVPKEFNAETFTFHADICTLSEKERQIKKQTALVELVKHKPKAT
KEQLKAVMDDFAAFVEKCCKADDKETCFAEEGKKLVAASQAALGL

Fig. 6u

APASSSTKKTQLQLEHLLLDLQMILNGINNYKNPKLTRMLTAKFAMPK
KATELKHLQCLEEELKPLEEVLNGAQSKNFHLRPRDLISNINVIVLELKGSET
TFMCEYADETATIVEFLNRWITFAQSIISTLTEPKSSDKTHTSPPSPAPELEGGS
SVFLFPPKPKDTLMISRTPEVTCVVVDVSHEDPEVKFNWYVDGVEVHNAKT
KPREEQYASTYRVVSVLTVLHQDWLNGKAYACAVSNKALPAPIEKTISKAK
GQPREPQVYTLPPSREEMTKNQVSLTCLVKGFYPSDIAVEWESNGQPENNYK
TTPPVLDSDGSFFLYSKLTVDKSRWQQGNVFSCSVMHEALHNHYTQKSLSLS
PGK

Fig. 6v

ELCDDDPPEIPHATFKAMAYKEGTMLNCECKRGFRRIKSGSLYMLCTG
NSSHSSWDNQCQCTSSATRNTTKQVTPQPEEQKERKTTEMQSPMQPVDQAS
LPGHCREPPPWENEATERIYHFVVGQMVYYQCVQGYRALHRGPAESVCKM
THGKTRWTQPQLICTGEMETSQFPGEEKPQASPEGRPESETSCLVTTTDFQIQ
TEMAATMETSIFTTEYQGGGSGGGSGGGSGGGSEPKSSDKTHTSPPSPAPELL
GGSSVFLFPPKPKDTLMISRTPEVTCVVVDVSHEDPEVKFNWYVDGVEVHN
AKTKPREEQYASTYRVVSVLTVLHQDWLNGKEYKCKVSNKALPAPIEKTISK
AKGQPREPQVYTLPPSRDELTKNQVSLTCLVKGFYPSDIAVEWESNGQPENN
YKTTPPVLDSDGSFFLYSKLTVDKSRWQQGNVFSCSVMHEALHNHYTQKSL
SLSPGK

Note : GGGSGGGSGGGSGGGGS is linker

Fig. 6w

GGGSGGGSGGGSGGGS

Fig. 6x

MGWSCIILFLVATATGVHS

Fig. 6y

IL-2-gm1-HSA (SEQ ID NO: 26)
APASSSTKKTQLQLEHLLLDLQMILNGINNYKNPKLTRNLTFKFYMPKKATELKHL
QCLEEELKPLEEVLNLAQSKNFHLRPRDLISNINVIVLELKGSETTFMCEYADETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7a

IL-2-gm4-HSA (SEQ ID NO: 27)
APASSSTKKTQLQLEHLLLDLQMILNGINNYKNPKLTRMLTFKFYMPKNATELKH
LQCLEEELKPLEEVLNLTQSKNFHLRPRDLISNINVIVLELKGSETTFMCEYADETA
TIVEFLNRWITFAQSIISTLTAAADAHKSEVAHRFKDLGEENFKALVLIAFAQYLQQ
CPFEDHVKLVNEVTEFAKTCVADESAENCDKSLHTLFGDKLCTVATLRETYGEMA
DCCAKQEPERNECFLQHKDDNPNLPRLVRPEVDVMCTAFHDNEETFLKKYLYEIA
RRHPYFYAPELLFFAKRYKAAFTECCQAADKAACLLPKLDELRDEGKASSAKQRL
KCASLQKFGERAFKAWAVARLSQRFPKAEFAEVSKLVTDLTKVHTECCHGDLLEC
ADDRADLAKYICENQDSISSKLKECCEKPLLEKSHCIAEVENDEMPADLPSLAADF
VESKDVCKNYAEAKDVFLGMFLYEYARRHPDYSVVLLLRLAKTYETTLEKCCAA
ADPHECYAKVFDEFKPLVEEPQNLIKQNCELFEQLGEYKFQNALLVRYTKKVPQV
STPTLVEVSRNLGKVGSKCCKHPEAKRMPCAEDYLSVVLNQLCVLHEKTPVSDRV
TKCCTESLVNRRPCFSALEVDETYVPKEFNAETFTFHADICTLSEKERQIKKQTALV
ELVKHKPKATKEQLKAVMDDFAAFVEKCCKADDKETCFAEEGKKLVAASQAAL
GL

Fig. 7b

IL-2-gm6-HSA (SEQ ID NO: 28)
APASSSTKKTQLQLEHLLLDLQMILNGINNYKNPKLTRNLTFKFYMPKNATELKHL
QCLEEELKPLEEVLNLTQSKNFHLRPRDLISNINVIVLELKGSETTFMCEYANETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7c

IL-2-gm7-HSA (SEQ ID NO: 29)
APASSSTKKTQLQLEHLLLDLQMILNGINNYKNPKLTRMLTFKFYMPKKATELKHL
QCLEEELKPLEEVLNLAQSKNFHLRPRDLISNINVIVLELKGSETTFMCEYANETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMADC
CAKQEPERNECFLQHKDDNPNLPRLVRPEVDVMCTAFHDNEETFLKKYLYEIARRH
PYFYAPELLFFAKRYKAAFTECCQAADKAACLLPKLDELRDEGKASSAKQRLKCAS
LQKFGERAFKAWAVARLSQRFPKAEFAEVSKLVTDLTKVHTECCHGDLLECADDR
ADLAKYICENQDSISSKLKECCEKPLLEKSHCIAEVENDEMPADLPSLAADFVESKD
VCKNYAEAKDVFLGMFLYEYARRHPDYSVVLLLRLAKTYETTLEKCCAAADPHEC
YAKVFDEFKPLVEEPQNLIKQNCELFEQLGEYKFQNALLVRYTKKVPQVSTPTLVE
VSRNLGKVGSKCCKHPEAKRMPCAEDYLSVVLNQLCVLHEKTPVSDRVTKCCTES
LVNRRPCFSALEVDETYVPKEFNAETFTFHADICTLSEKERQIKKQTALVELVKHKP
KATKEQLKAVMDDFAAFVEKCCKADDKETCFAEEGKKLVAASQAALGL

Fig. 7d

Wild type IL-2-HSA (SEQ ID NO: 30)
APASSSTKKTQLQLEHLLLDLQMILNGINNYKNPKLTRMLTFKFYMPKKATELKH
LQCLEEELKPLEEVLNLAQSKNFHLRPRDLISNINVIVLELKGSETTFMCEYADETA
TIVEFLNRWITFAQSIISTLTAAADAHKSEVAHRFKDLGEENFKALVLIAFAQYLQQ
CPFEDHVKLVNEVTEFAKTCVADESAENCDKSLHTLFGDKLCTVATLRETYGEMA
DCCAKQEPERNECFLQHKDDNPNLPRLVRPEVDVMCTAFHDNEETFLKKYLYEIA
RRHPYFYAPELLFFAKRYKAAFTECCQAADKAACLLPKLDELRDEGKASSAKQRL
KCASLQKFGERAFKAWAVARLSQRFPKAEFAEVSKLVTDLTKVHTECCHGDLLEC
ADDRADLAKYICENQDSISSKLKECCEKPLLEKSHCIAEVENDEMPADLPSLAADF
VESKDVCKNYAEAKDVFLGMFLYEYARRHPDYSVVLLLRLAKTYETTLEKCCAA
ADPHECYAKVFDEFKPLVEEPQNLIKQNCELFEQLGEYKFQNALLVRYTKKVPQV
STPTLVEVSRNLGKVGSKCCKHPEAKRMPCAEDYLSVVLNQLCVLHEKTPVSDRV
TKCCTESLVNRRPCFSALEVDETYVPKEFNAETFTFHADICTLSEKERQIKKQTALV
ELVKHKPKATKEQLKAVMDDFAAFVEKCCKADDKETCFAEEGKKLVAASQAAL
GL

Fig. 7e

IL-2Rα (SEQ ID NO: 31)
MDSYLLMWGLLTFIMVPGCQAELCDDDPPEIPHATFKAMAYKEGTMLNCECKRG
FRRIKSGSLYMLCTGNSSHSSWDNQCQCTSSATRNTTKQVTPQPEEQKERKTTEM
QSPMQPVDQASLPGHCREPPPWENEATERIYHFVVGQMVYYQCVQGYRALHRGP
AESVCKMTHGKTRWTQPQLICTGEMETSQFPGEEKPQASPEGRPESETSCLVTTTD
FQIQTEMAATMETSIFTTEYQDDDDKSGGGGSHHHHHH

Fig. 7f

IL-2Rβ (SEQ ID NO: 32)
MGWSCIILFLVATATGVHSASEPKSCDKTHTCPPCPAPELLGGPSVFLFPPKPKD
TLMISRTPEVTCVVVDVSHEDPEVKFNWYVDGVEVHNAKTKPREEQYNSTYR
VVSVLTVLHQDWLNGKEYKCKVSNKALPAPIEKTISKAKGQPREPQVYTLPPSR
DELTKNQVSLWCLVKGFYPSDIAVEWESNGQPENNYKTTPPVLDSDGSFFLYS
KLTVDKSRWQQGNVFSCSVMHEALHNHYTQKSLSLSPGSGGGGSDDDDKAVN
GTSQFTCFYNSRANISCVWSQDGALQDTSCQVHAWPDRRRWNQTCELLPVSQ
ASWACNLILGAPDSQKLTTVDIVTLRVLCREGVRWRVMAIQDFKPFENLRLMA
PISLQVVHVETHRCNISWEISQASHYFERHLEFEARTLSPGHTWEEAPLLTLKQK
QEWICLETLTPDTQYEFQVRVKPLQGEFTTWSPWSQPLAFRTKPAALGKDT

Fig. 7g

IL-2Rγ (SEQ ID NO: 33)
MGWSCIILFLVATATGVHSASEPKSCDKTHTCPPCPAPELLGGPSVFLFPPKPKD
TLMISRTPEVTCVVVDVSHEDPEVKFNWYVDGVEVHNAKTKPREEQYNSTYR
VVSVLTVLHQDWLNGKEYKCKVSNKALPAPIEKTISKAKGQPREPQVYTLPPSR
DELTKNQVSLSCAVKGFYPSDIAVEWESNGQPENNYKTTPPVLDSDGSFFLVSK
LTVDKSRWQQGNVFSCSVMHEALHNHYTQKSLSLSPGSGGGGSDDDDKLNTTI
LTPNGNEDTTADFFLTTMPTDSLSVSTLPLPEVQCFVFNVEYMNCTWNSSSEPQ
PTNLTLHYWYKNSDNDKVQKCSHYLFSEEITSGCQLQKKEIHLYQTFVVQLQD
PREPRRQATQMLKLQNLVIPWAPENLTHKLSESQLELNWNNRFLNHCLEHLV
QYRTDWDHSWTEQSVDYRHKFSLPSVDGQKRYTFRVRSRFNPLCGSAQHWSE
WSHPIHWGSNTSKENPFLFALEA

Fig. 7h

IL-2-gm1a-HSA (SEQ ID NO: 34)
APASSSTKKTQLQLEHLLLDLQMILNGINNYKNPKLTRDLTFKFYMPKKATELKHL
QCLEEELKPLEEVLNLAQSKNFHLRPRDLISNINVIVLELKGSETTFMCEYADETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7i

IL-2-gm1b-HSA (SEQ ID NO:35)
APASSSTKKTQLQLEHLLLDLQMILNGINNYKNPKLTRELTFKFYMPKKATELKHL
QCLEEELKPLEEVLNLAQSKNFHLRPRDLISNINVIVLELKGSETTFMCEYADETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7j

IL-2-gm1c-HSA (SEQ ID NO: 36)
APASSSTKKTQLQLEHLLLDLQMILNGINNYKNPKLTRQLTFKFYMPKKATELKHL
QCLEEELKPLEEVLNLAQSKNFHLRPRDLISNINVIVLELKGSETTFMCEYADETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7k

IL-2-gm1d-HSA (SEQ ID NO: 37)
APASSSTKKTQLQLEHLLLDLQMILNGINNYKNPKLTRALTFKFYMPKKATELKHL
QCLEEELKPLEEVLNLAQSKNFHLRPRDLISNINVIVLELKGSETTFMCEYADETATI
VEFLNRWITFAQSIISTLTAAADAHKSEVAHRFKDLGEENFKALVLIAFAQYLQQCP
FEDHVKLVNEVTEFAKTCVADESAENCDKSLHTLFGDKLCTVATLRETYGEMAD
CCAKQEPERNECFLQHKDDNPNLPRLVRPEVDVMCTAFHDNEETFLKKYLYEIAR
RHPYFYAPELLFFAKRYKAAFTECCQAADKAACLLPKLDELRDEGKASSAKQRLK
CASLQKFGERAFKAWAVARLSQRFPKAEFAEVSKLVTDLTKVHTECCHGDLLECA
DDRADLAKYICENQDSISSKLKECCEKPLLEKSHCIAEVENDEMPADLPSLAADFV
ESKDVCKNYAEAKDVFLGMFLYEYARRHPDYSVVLLLRLAKTYETTLEKCCAAA
DPHECYAKVFDEFKPLVEEPQNLIKQNCELFEQLGEYKFQNALLVRYTKKVPQVST
PTLVEVSRNLGKVGSKCCKHPEAKRMPCAEDYLSVVLNQLCVLHEKTPVSDRVTK
CCTESLVNRRPCFSALEVDETYVPKEFNAETFTFHADICTLSEKERQIKKQTALVEL
VKHKPKATKEQLKAVMDDFAAFVEKCCKADDKETCFAEEGKKLVAASQAALGL

Fig. 7l

IL-2 MUTANT PROTEIN PROLIFERATING IMMUNE CELLS

CROSS REFERENCE TO RELATED APPLICATIONS

This application is a U.S. National Stage Application under 35 U.S.C. 371 of International Patent Application No. PCT/CN2020/090365, filed on May 14, 2020, which claims priority to Chinese Patent Application No. 201910399641.1, filed on May 14, 2019.

SEQUENCE LISTING

This application contains a Sequence Listing, which has been filed electronically in .txt format and is hereby incorporated by reference in its entirety. Said ASCII copy, created on May 14, 2019, is named P2020-0859.txt and is 117,914 bytes in size.

TECHNICAL FIELD

The present invention relates to the field of protein engineering. In particular, the present invention relates to a novel interleukin-2 (IL-2) mutant and a preparation method thereof. Compared with the wild-type original IL-2 protein, the interleukin-2 (IL-2) mutant possesses a reduced ability to bind to its binding partner IL-2 receptor α subunit, but retains the ability to bind IL-2 receptor β subunit and IL-2 receptor γ subunit and corresponding biological activities, and can better stimulate the proliferation of tumor immune cells, including but not limited to T effector cells and NK cells.

BACKGROUND

Interleukin-2 (IL-2, Interleukin-2) is a type of cell growth factor in the immune system, which can regulate the cell activity of white blood cells in the immune system, promote the proliferation of Th0 and CTL, and participate in antibody response, hematopoiesis, and tumor surveillance either. IL-2 exerts its effects by binding to IL-2 receptor (IL-2R). IL-2R consists of three chains of α, β and γ, and different combinations thereof can produce receptor forms with different affinities for IL-2: IL-2Rγ chain alone cannot bind IL-2, βγ chain is a medium-affinity IL-2R, and αβγ chain is a high-affinity IL-2R.

IL-2 is mainly synthesized by activated T cells, especially helper T cells. It stimulates the proliferation and differentiation of T cells, induces the generation of cytotoxic T lymphocytes (CTL) and the differentiation of peripheral blood lymphocytes into cytotoxic cells and lymphokine activated killer (LAK) cells, promotes T cell to express cytokines and cytolytic molecule, promotes the proliferation and differentiation of B cells and the synthesis of immunoglobulin via B cells, and stimulates the production, proliferation and activation of natural killer (NK) cells.

IL-2's ability to expand lymphocyte populations in vivo and enhance the effector functions of these cells confers IL-2 anti-tumor effects, thereby making IL-2 immunotherapy an attractive treating option for certain metastatic cancers. Therefore, a high-dosage IL-2 therapy has been approved for patients with metastatic renal cell carcinoma and malignant melanoma. However, IL-2 exhibits a dual function in the immune response, that is, it not only mediates the expansion and activity of effector cells, but is also critically involved in maintaining peripheral immune tolerance.

Side effects resulted from recombinant human IL-2 treatment are related to IL-2 immunotherapy. Patients receiving a high-dosage of IL-2 treatment often experience severe cardiovascular, lung, kidney, liver, gastrointestinal, neurological, skin, blood, and systemic adverse events, which require close monitoring and inpatient management. Most of these side effects can be explained by the formation of the so-called vascular (or capillary) leak syndrome (VLS), which is a pathological increase in vascular permeability leading to fluid overflow in multiple organs (resulting in, for example, the lungs and skin edema and liver cell damage) and intravascular fluid loss (resulting in a decrease in blood pressure and a compensatory increase in heart rate). Low-dosage IL-2 regimens have been tested in patients to avoid VLS, which is, however, at the cost of reduced treatment outcomes.

Tumor immunity is an effective method for treating tumors in recent years. The killing of tumor cells by T cells and NK cells in vivo is achieved by PD-1 or PD-L1 inhibitors, and other similar immunosuppressants, such as CTLA-4, CD-47 antibodies, and the like. IL-2 is a known effective growth-promoting factor for T cells and NK cells, however the application thereof is limited due to the aforementioned side effects.

Cellular immunotherapy is also an effective method for treating tumors or autoimmune diseases in recent years. Immune cells are collected from a human body and cultured in vitro to increase the number of the cells and enhance their targeted-killing function. And then the immune cells are returned to the human body to kill pathogens, cancer cells, and mutated cells in blood and tissues, break immune tolerance, activate and enhance the body's immune ability, thereby taking into account the dual effects of treatment and health care. Cellular immunotherapy included Cytokine-induced killer cell (CIK) therapy, dendritic cell (DC) therapy, DC+CIK cell therapy, natural killer cell (NK) therapy, DC-T, CART, CAR-NK cell therapy, and the like. IL-2 is often used in the in vitro expansion of immune cells. Wild-type IL-2 also expands non-tumor-killing immune cells. Therefore, IL-2, which can more effectively expand immune cells such as CD8$^+$ immune cells, is desired.

Several approaches have been adopted in the art to overcome these problems associated with IL-2 immunotherapy. For example, IL-2 is combined with certain anti-IL-2 monoclonal antibodies to enhance therapeutic effects of IL-2 in vivo (Kamimura et al., J Immunol 177, 306-14 (2006); Boyman et al., Science 311, 1924-27 (2006)). IL-2 can also be mutated in various ways to reduce its toxicity and/or increase its efficacy. For example, Hu et al. (Blood 101, 4853-4861 (2003), US Patent Publication No. 2003/0124678) replaced the arginine residue at position 38 of IL-2 with tryptophan to eliminate the vascular permeability of IL-2. Shanafelt et al. (Nature Biotechnol 18, 1197-1202 (2000)) mutated asparagine 88 to arginine to enhance the selective expansion of T cells and reduce the expansion of NK cells with toxic side effects. Heaton et al. (Cancer Res 53, 2597-602 (1993); U.S. Pat. No. 5,229,109) introduced two mutations, Arg38Ala and Phe42Lys, to reduce the secretion of pro-inflammatory cytokines by NK cells. Gillies et al. (US Patent Publication No. 2007/0036752) reduced VLS by substituting 3 residues (Asp20Thr, Asn88Arg and Gln126Asp) in IL-2. In Gillies et al. (WO2008/0034473), the interface between mutant IL-2 and CD25 is also changed by amino acid substitutions Arg38Trp and Phe42Lys, thereby reducing the interaction with CD25 and activation of Timf cells to enhance efficacy. For the same purpose, Wittrup et al. (WO2009/061853) obtained IL-2 mutants, which have increased affinities for CD25 while do not activate the receptor, thereby acting as antagonists. The purpose of introducing mutations is to disrupt the interaction with the receptor β subunit and/or γ subunit. However, none of these known IL-2 mutants overcome the above-mentioned problems related to IL-2 immunotherapy, namely, induction of toxicity caused by VLS, induction of tumor tolerance caused by AICD, and immunity inhibition caused by activation of Timf cells. Rocheglicat (CN103492411A) mutated three amino acids at positions of F42A, Y45A and L72G in IL-2, thereby reducing the affinity of IL-2 protein to the high-affinity IL-2 receptor and retaining the affinity of the mutant IL-2 protein to the medium-affinity IL-2 receptor, however, the biological activities of the resulting IL-2 mutant is also reduced. For example, Miami University (CN107074967A) has constructed a fusion protein comprising a first polypeptide of interleukin-2 or a functional variant or fragment thereof and a second polypeptide fused to the open reading frame of the first polypeptide, wherein the second polypeptide comprises the extracellular domain of interleukin-2 receptor α (IL-2Rα) or a functional variant or fragment thereof, and wherein the fusion protein has IL-2 activities. The constructed fusion protein eliminates the binding of IL-2 to the high-affinity IL-2Rα on the cell surface by self-binding. However, the fusion protein may self-bind or bind to each other between different molecules, which is easy to produce multimers, and not conducive to production and quality control. There is a balance between binding and dissociation in the body for the fusion protein, the binding to the high-affinity IL-2Rα on the cell surface cannot be completely eliminated and the fusion protein may still bind to IL-2Rα on the cell surface.

Therefore, there is a need in the art to improve the efficacy of IL-2 and stably and conveniently produce enhanced IL-2 polypeptides.

SUMMARY OF THE INVENTION

The purpose of the present invention is to provide a novel IL-2 mutant. Compared with wild-type IL-2, the IL-2 mutant of the present invention can overcome problems related to IL-2 immunotherapy, but can still retain the desired biological activities.

In the first aspect, an IL-2 mutant is provided in the present invention. Compared with wild-type IL-2, the amino acid residues of the IL-2 mutant are mutated, so that the binding ability of IL-2 to its receptor is altered; and the affinity of the IL-2 mutant to the high-affinity IL-2 receptor is eliminated or reduced and the affinity of the IL-2 mutant to the medium-affinity IL-2 receptor is substantially retained.

In a preferred embodiment, the high-affinity IL-2 receptor is a heterotrimeric form of the IL-2 receptor, which is composed of receptor α subunit, receptor β subunit and receptor γ subunit; and the medium-affinity IL-2 receptor contains only the IL-2 receptor β subunit and IL-2 receptor γ subunit without the IL-2 receptor α subunit.

In a preferred embodiment, compared with wild-type IL-2, the binding affinity of the IL-2 mutant to the high-affinity IL-2 receptor is reduced by 55% or more, more preferably 60% or more, 65% or more, 70% or more, 75% or more, 80% or more, 85% or more, 90% or more, 95% or more, 96% or more, 97% or more, 98% or more, 99% or more; and most preferably, the IL-2 mutant does not bind the high-affinity IL-2 receptor;

The binding affinity of the IL-2 mutant to the medium-affinity IL-2 receptor is 50% or more, more preferably 60% or more, 70% or more, 80% or more, 90% or more, 95% or more of the binding affinity of the wild-type IL-2 to the medium-affinity IL-2 receptor; and most preferably, the binding affinity of the IL-2 mutant to the medium-affinity IL-2 receptor is comparable to the binding affinity of the wild-type IL-2 to the medium-affinity IL-2 receptor.

In a preferred embodiment, the IL-2 mutant retains the ability to proliferate activated tumor immune cells, including but not limited to T effector cells and NK cells.

In a specific embodiment, the IL-2 mutant has amino acid residue mutations at one or more of the following positions corresponding to wild-type IL-2:39, 49, 73, and 109.

In a preferred embodiment, the IL-2 mutant has amino acid residue mutations at any of the following positions corresponding to wild-type IL-2:39, 49, 73, and 109.

In a preferred embodiment, the IL-2 mutant has an amino acid residue mutation only at position 39 corresponding to wild-type IL-2.

In a preferred embodiment, the IL-2 mutant has amino acid residue mutations at position 39 and optionally at one or more of the following positions corresponding to wild-type IL-2:49, 73 and 109;

The IL-2 mutant has amino acid residue mutations at position 49 and optionally at one or more of the following positions corresponding to wild-type IL-2:39, 73 and 109;

The IL-2 mutant has amino acid residue mutations at position 73 and optionally at one or more of the following positions corresponding to wild-type IL-2:39, 49 and 109;

The IL-2 mutant has amino acid residue mutations at position 109 and optionally at one or more of the following positions corresponding to wild-type IL-2:39, 49 and 73.

In a preferred embodiment, the IL-2 mutant has mutations at 1, 2, 3, or 4 of positions 39, 49, 73, and 109 corresponding to wild-type IL-2.

In a preferred embodiment, the IL-2 mutant has one or more of the following amino acid residue mutations in wild-type IL-2: M39D, M39E, M39Q, M39N, M39A, K49N, A73T, A73S and D109N.

In a preferred embodiment, the IL-2 mutant has the following single amino acid residue mutation in wild-type IL-2: M39D, M39E, M39Q, M39N or M39A; preferably M39D, M39E, M39Q or M39N; more preferably M39D, M39E or M39Q; more preferably M39D or M39E; and most preferably M39D.

In a preferred embodiment, the IL-2 mutant eliminates the O glycosylation site.

In a preferred embodiment, the IL-2 mutant is mutated at position 3 corresponding to wild-type IL-2, thereby eliminating the O glycosylation site.

In a preferred embodiment, the IL-2 mutant has the following amino acid residue mutations at position 3 corresponding to the wild-type IL-2 protein: T3A, T3G, T3Q, T3E, T3N, T3D, T3R, T3K, and T3P; and preferably T3A.

In a preferred embodiment, the IL-2 mutant has Cys mutated at position 125: C125L, C125S, C125A; and preferably C125S.

In a second aspect, a fusion protein or conjugate is provided in the present invention, comprising the IL-2 mutant of the first aspect and a non-IL-2 functional moiety.

In a preferred embodiment, the non-IL-2 functional moiety is selected from the following group:
 a Fc fragment, including but not limited to: Fc fragment of human IgG1, IgG2, IgG3, IgG4, and Fc fragment mutant with a homology of more than 90%;

a Human serum albumin (HSA);
an anti-HSA antibody or antibody fragment;
a Transferrin;
a Human chorionic gonadotropin β subunit carboxy terminal peptide (CTP);
an Elastin-like peptide (ELP);
an antigen binding portion.

In a preferred embodiment, the antigen binding portion is:
an antibody or an active antibody fragment thereof;
a Fab molecule, scFv molecule and VHH molecule; or
a cell receptor or ligand.

In a preferred embodiment, the IL-2 mutant and the non-IL-2 functional moiety in the fusion protein can be connected directly or through a linker; and the linker can be a repeating sequence of AAA or GS, including but not limited to a repeating sequence of $G_3S$ or a repeating sequence of $G_4S$; for example, $(G_3S)_4$.

In a preferred embodiment, the IL-2 mutant or fusion protein can be further modified as follows to form a conjugate:
Polyethylene glycol modification (PEGylation);
Polysialylation modification (PSAization);
Saturated fatty acid modification;
Hyaluronic acid modification (Hyaluronic acid, HA);
Polyamino acid modification (proline-alamine-serine polymer, PASation).

In a third aspect, a polynucleotide is provided in the present invention, encoding the IL-2 mutant of the first aspect or the fusion protein or conjugate of the second aspect.

In the fourth aspect, an expression vector is provided in the present invention, comprising the polynucleotide of the third aspect.

In a fifth aspect, a host cell is provided in the present invention, comprising the expression vector of the fourth aspect, or having the polynucleotide of the third aspect integrated into the genome of the host cell.

In a preferred embodiment, the host cell is an eukaryotic cell; preferably yeast, insect cell, or animal cell; and it may be a mammalian cell.

In the sixth aspect, a cell-free expression system is provided in the present invention, comprising the expression vector of the fourth aspect.

In a seventh aspect, a pharmaceutical composition is provided in the present invention, comprising the IL-2 mutant protein of the first aspect or the fusion protein or conjugate of the second aspect and a pharmaceutically acceptable excipient.

In the eighth aspect, the use of the IL-2 mutant of the first aspect or the fusion protein of the second aspect is provided in the present invention, for preparing a medicament for in vitro expansion of T lymphocytes, natural killer NK cells or for the treatment of a disease in an individual.

In a preferred embodiment, the disease is a disease in which IL-2 is used for immunotherapy.

In a preferred embodiment, the disease is cancer, immune disease, human immunodeficiency virus HIV infection, hepatitis C virus HCV infection, rheumatoid arthritis, atopic dermatitis and the like.

In a preferred embodiment, the cancer, immune disease, human immunodeficiency virus HIV infection, hepatitis C virus HCV infection, rheumatoid arthritis, atopic dermatitis and the like are treated by stimulating the immune system or proliferating immune cells.

In the ninth aspect, the IL-2 mutant of the first aspect or the fusion protein of the second aspect is provided in the present invention, for use in in vitro expansion of T lymphocytes, natural killer NK cells, or treating a disease in an individual.

In a preferred embodiment, the disease is a disease in which IL-2 is used for immunotherapy.

In a preferred embodiment, the disease is cancer, immune disease, human immunodeficiency virus HIV infection, hepatitis C virus HCV infection, rheumatoid arthritis, atopic dermatitis and the like.

In a preferred embodiment, the cancer is a cancer that is treated by stimulating the immune system or proliferating immune cells.

In a tenth aspect, a treatment method is provided in the present invention, comprising a step of administering the IL-2 mutant protein of the first aspect or the fusion protein or conjugate of the second aspect or the pharmaceutical composition of the sixth aspect to a patient in need of IL-2 immunotherapy.

In a preferred embodiment, the treatment method treat cancer or immune diseases, human immunodeficiency virus HIV infection, hepatitis C virus HCV infection, rheumatoid arthritis, atopic dermatitis and the like by stimulating the immune system or proliferating immune cells.

It should be understood that within the scope of the present invention, the above technical features of the present invention and the technical features specifically described in the following (such as the embodiments) can be combined with each other to form a new or preferred technical solution, which will not be repeated one by one herein.

DESCRIPTION OF THE DRAWINGS

FIG. 4 shows the proliferation of NK92 cells in response to rhIL-2 and mutant interleukin-2 (His tag).

FIG. 5 shows the proliferation of NK92 cells in response to rhIL-2 and mutant interleukin-2 (Fc tag).

FIGS. 6*a*-*y* show the sequence of SEQ ID NO: 1-25, respectively. FIG. 6*a*: SEQ ID NO: 1. FIG. 6*b*: SEQ ID NO: 2. FIG. 6*c*: SEQ ID NO: 3. FIG. 6*d*: SEQ ID NO: 4. FIG. 6*e*: SEQ ID NO: 5. FIG. 6*f*: SEQ ID NO: 6. FIG. 6*g*: SEQ ID NO: 7. FIG. 6*h*: SEQ ID NO: 8. FIG. 6*i*: SEQ ID NO: 9. FIG. 6*j*: SEQ ID NO: 10. FIG. 6*k*: SEQ ID NO: 11. FIG. 6l: SEQ ID NO: 12. FIG. 6*m*: SEQ ID NO: 13. FIG. 6*n*: SEQ ID NO: 14. FIG. 6o: SEQ ID NO: 15. FIG. 6*p*: SEQ ID NO: 16. FIG. 6*q*: SEQ ID NO: 17. FIG. 6*r*: SEQ ID NO: 18. FIG. 6*s*: SEQ ID NO: 19. FIG. 6*t*: SEQ ID NO: 20. FIG. 6*u*: SEQ ID NO: 21. FIG. 6*v*: SEQ ID NO: 22. FIG. 6*w*: SEQ ID NO: 23. FIG. 6*x*: SEQ ID NO: 24. FIG. 6*y*: SEQ ID NO: 25.

FIGS. 7 a-1 shows the sequence of SEQ ID NO: 26-37, respectively.

FIG. 10 shows the IFN-γ release induced by IL-2 mutants, in which

10B shows the release of interferon γ from NK92 cells induced by different concentrations of IL-2gm6-HSA and wild-type IL-2-HSA.

Figure 11A:
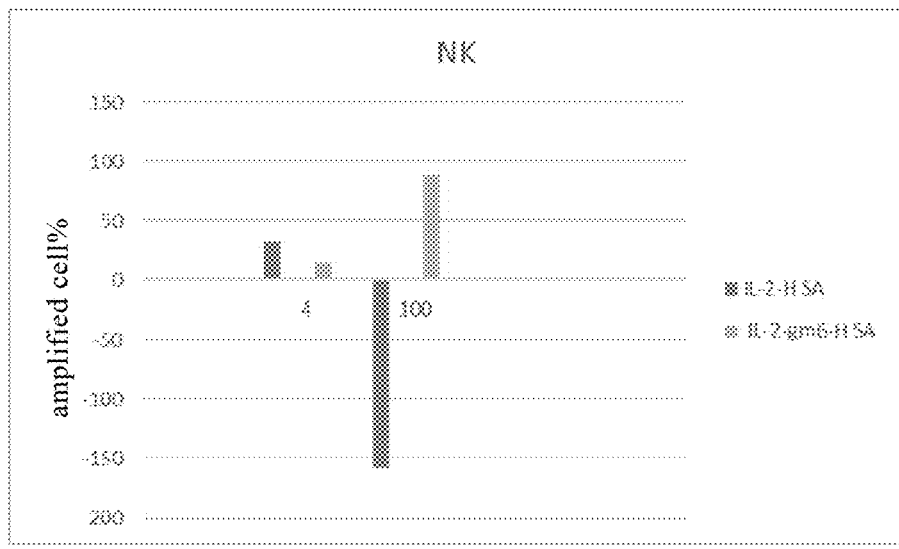
Figure 11B:
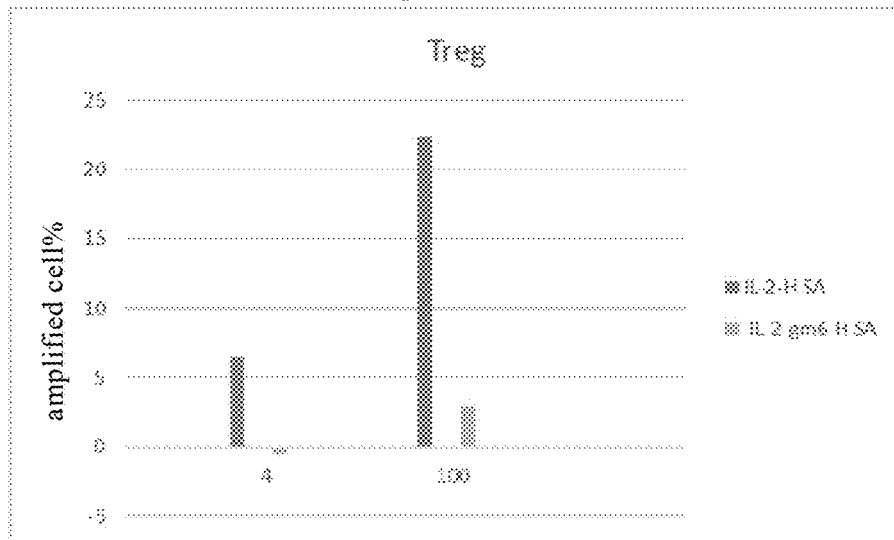

FIG. 11 shows the proliferation effects of IL-2gm6-HSA and wild-type IL-2-HSA on NK cells and Treg cells; in which FIG. 11A shows the proliferation of NK cells after 6 days of incubation with different concentrations of IL-2gm6-HSA and wild-type IL-2-HSA; and FIG. 11B shows the proliferation of Treg cells after 6 days of incubation with different concentrations of IL-2gm6-HSA and wild-type IL-2-HSA.

Figure 12A:
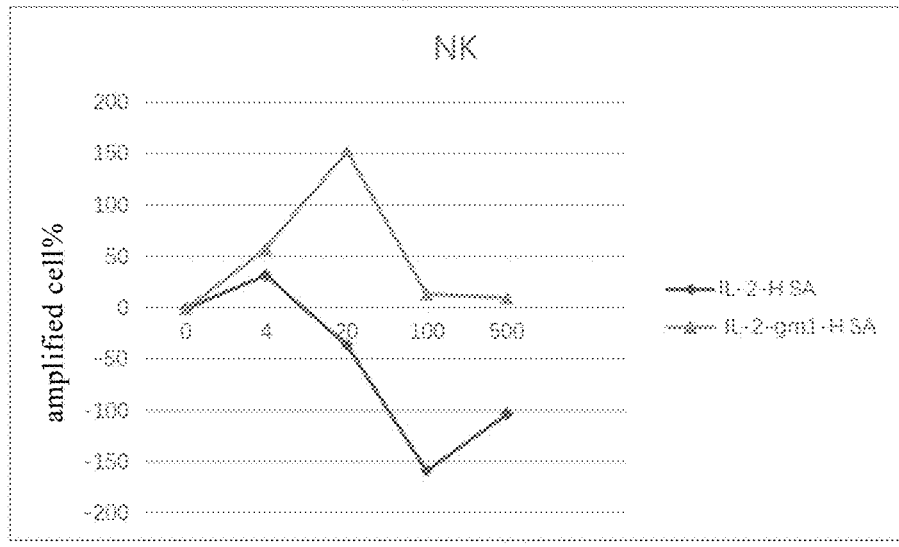
Figure 12B:
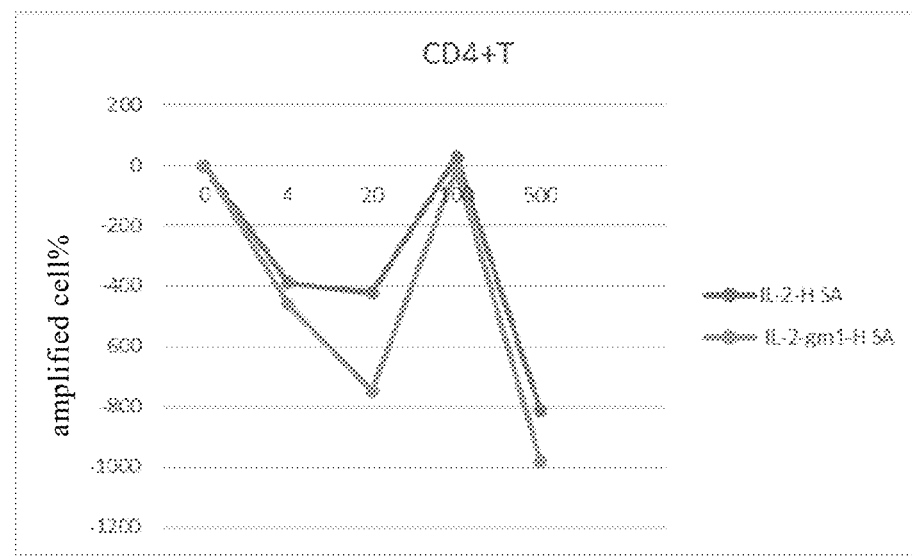

FIG. 12 shows the effects of IL-2gm1-HSA and wild-type IL-2-HSA on the proliferation of NK cells and CD4+ T cells; in which FIG. 12A shows that, under the stimulation of the sample concentration of 0-500 nM, IL-2gm1-HSA can significantly increase the proliferation of NK cells as compared with wild-type IL-2-HSA; and FIG. 12B shows that, under the stimulation of the concentration of 0-500 nM, the effects of IL-2gm1-HSA on the proliferation of CD4+ T cells is significantly weakened, as compared with wild-type IL-2-HSA.

MODES FOR CARRYING OUT THE INVENTION

After extensive and in-depth research, the inventors unexpectedly discovered that a new type of IL-2 mutant polypeptide that undergoes glycosylation modification after site-directed mutation of IL-2 polypeptide can eliminate or reduce the affinity of IL-2 protein to high-affinity IL-2 receptor, while retains the affinity of the mutant IL-2 protein to the medium-affinity IL-2 receptor, and retains the biological activities of IL-2. Therefore, the mutant IL-2 protein can better stimulate the proliferation of tumor immune cells, including but not limited to T effector cells and NK cells, thereby achieving the purpose of treatment. The present invention has been completed based on the above findings.
Site-Directed Mutagenesis Site-directed mutagenesis is a protein engineering technique that replaces, inserts, or deletes specific nucleotides in a known DNA sequence based on the structure and function of a known protein to produce mutant protein molecules with new properties.

Site-directed mutagenesis technology can change physical and chemical properties of a protein, for example, improving the stability of a protein drug; enhancing the solubility of a protein drug; improving biological properties, including (but not limited to) changing the specificity of an enzyme to substrates, improving enzyme activities, and improving affinities and specificities, etc.

Site-directed mutagenesis technology can increase or eliminate the binding activity between a ligand and receptor, enzyme and substrate by mutating amino acids in the binding domain. Such mutation will lead to changes in the secondary structure or higher structure of a protein and the characteristics of charges. If a mutated amino acid is exactly at the key antigen-antibody interaction site, then the amino acid change is likely to cause changes in the charge and secondary structure or higher structure of the site, and a ligand can not bind to its receptor, or an enzyme can not bind to its substrate, thereby achieving the purpose of mutation. Moreover, the original antibody cannot recognize this site, and a new antigen is formed. This is inevitably possible with this traditional mutation method.
IL-2 Mutant of the Present Invention In the present invention, site-directed mutagenesis allows changes in the amino acid residues of the IL-2 polypeptide, thereby changing the binding mode of the IL-2 polypeptide and the IL-2R receptor. The affinity of the IL-2 mutant of the present invention to the IL-2 receptor has been altered. In a specific embodiment, the affinity of the IL-2 mutant of the present invention for the high-affinity IL-2 receptor has been eliminated or reduced, while its affinity for the medium-affinity IL-2 receptor is retained, and biological activities of IL-2 is also retained. Therefore, the IL-2 mutant of the present invention can not only better stimulate the proliferation of tumor immune cells, including but not limited to T effector cells and NK cells, its side effects can also be significantly reduced as compared with wild-type IL-2, thereby achieving better treatment purpose.

When there is glycosylation modification to the IL-2 mutant or fusion protein of the present invention, it is preferably expressed in eukaryotic cells and obtained by cell culture. Yeast, insect cells, animal cells can be selected, or transgenic animals can be selected. In a specific embodiment, the host cell is a eukaryotic cell; preferably yeast, insect cells, and animal cells. When there is no glycosylation modification to the IL-2 mutant or fusion protein of the present invention, a cell-free expression, or expression in E. coli, yeast, etc., preferably cell-free expression and expression in yeast cells, can be used.

When yeast cells or insect cells are used as host cells, the glycoform of the obtained IL-2 mutant may be of non-human. A skilled person will know that the non-human glycoforms can be further transformed into a human glycoforms.

In other embodiments, it is also possible to obtain IL-2 mutants by using prokaryotic expression and fermentation or in vitro cell-free synthesis, and then correctly glycosylated IL-2 mutants can be obtained through methods such as in vitro enzyme catalysis. Both in vivo and in vitro modifications can achieve the same purpose, that is, site-directed glycosylation of IL-2.
Protein Glycosylation Modification and Mutation Protein glycosylation is a complex process of post-translational modification. Glycosylation is performed at a specific site of a protein. The modified site is usually an asparagine residue (N-linked) or a serine/threonine residue (O-Link), N-linked glycosylation usually occurs in Asn-X-Ser/Thr (X is a non-proline amino acid, called N glycosylation site); and O-linked glycosylation usually occurs in Serine (Ser) or threonine (Thr) residue (called O glycosylation site), and an O-glycosidic bond is formed through N-acetylgalactosamine (Gal-NAc) and the hydroxyl of Ser/Thr. Accordingly, the glycosylation site introduced in wild-type IL-2 by site-directed mutagenesis is an artificial glycosylation site.

The inventors artificially introduced glycosylation mutations to increase the three-dimensional structure on the binding surface between the receptor protein and the ligand protein, so that the receptor and the ligand cannot directly contact. And it was also found that mutations at certain sites can also significantly change the binding of a receptor to ligand without glycosylation modification. In the present invention, the number of amino acid mutations is significantly reduced, which is completely different from the site-directed mutation involving multiple amino acids as said above. βγ changing multiple amino acids, the traditional site-directed mutagenesis will change the hydrophilic or hydrophobic area of the binding surface of a protein, or change the higher structure of the protein, so that two proteins cannot form a stable binding state after contact. However, in the present invention, upon glycosylation mutation, the binding surface is destroyed by the sugar chain, and two proteins cannot get close. When the sites are properly selected, the ability to eliminate binding of the present invention is much higher than that of traditional mutation, or in the present invention, the binding between a ligand and receptor can be reduced or eliminated by only changing one amino acid, such as methionine at position 39.

In particular, the inventors selected mutation sites in the possible binding region of interleukin 2 and interleukin 2 receptor and nearby amino acid sequences, and used sites containing ASN, Thr or Ser in the original amino acid sequence as much as possible. The first two amino acids at Thr or Ser site are preferably selected for mutation, so that the amino acid at the mutation site will be masked by the sugar chain after glycosylation, thereby minimizing the immunogenicity. The mutation of Thr or Ser after Asn position is also a feasible solution.

A single-site mutation at position 39 can change IL2's ability to bind to the receptor regardless of glycosylation. And the potential immunogenicity is extremely low since there is only a single-site mutation.

Traditionally, it is believed that macromolecular amino acids and amino acids containing complex aromatic rings are more immunogenic, and multiple-site mutations will produce more obvious immunogenicity. Due to the large molecular weight of sugar chains, especially N-glycan have complex 2-antenna, 3-antenna to 4-antenna structures (see Jonathan J. Lyons, etc., Glycans instructing immunity: the emerging role of altered glycosylation in clinical immunology. Front. Pediatr., 11 Jun. 2015), therefore mutations near any binding site will affect the binding between two proteins.

According to the teachings of the present invention, a skilled person will know how to introduce fewer mutation sites in wild-type IL-2 through site-directed mutagenesis. In order to reduce the immunogenicity of the obtained IL-2 mutant, for the IL-2 mutant of the present invention, the number of mutation sites shall be reduced as much as possible and existing amino acid residues in natural IL-2 shall be used to generate new glycosylation sites, so that the structure of the obtained IL-2 mutant is similar to that of natural IL-2, thereby avoiding the influence of the mutation on other structural sites of the protein and retaining biological activities. In a specific embodiment, amino acid residue at one or more of the following positions (i.e., 1, 2, 3, or 4 positions) of wild-type IL-2 mutate: 39, 49, 73, and 109. In a specific embodiment, amino acid residue at one or more of the following positions of wild-type IL-2 mutate: M39D, M39E, M39Q, M39N, M39A, K49N, A73T, A73S and D109N; preferably M39D, M39E, M39Q, M39N or M39A single-site mutation; more preferably M39D, M39E, M39Q or M39N single-site mutation; more preferably M39D, M39E or M39Q single-site mutation; more preferably M39D or M39E single-site mutation; and most preferably M39D single-site mutation.

Based on conventional practices in the art, the original O-glycan sites in the IL-2 polypeptide can also be eliminated. The removal of O-glycan won't affect biological activities of IL-2. The structure of O-glycan is complex, the analysis on which is difficult. For reducing the complexity of quality control during the production, genetic engineering can usually be used to eliminate the glycosylation site. Therefore, the IL-2 mutant of the present invention may have the following amino acid residue mutations at position 3 corresponding to the wild-type IL-2 protein: T3A, T3G, T3Q, T3E, T3N, T3D, T3R, T3K and T3P; and preferably T3A. During the purification and renaturation of IL-2 products, activities of IL-2 will be reduced due to mismatching disulfide bonds or the formation of disulfide bonds between molecules. At present, cysteine at the 125th position can be mutated to leucine or serine by site-mutation, so that only one disulfide bond can be formed, thereby ensuring the activity of IL-2 during the refolding process. It is also reported that protein engineering is used to produce a new type of rIL-2, in which cysteine at the 125th position of IL-2 molecule is changed to alanine, and the specific activity of IL-2 is significantly higher than that of natural IL-2. Therefore, the IL-2 mutant of the present invention can have the following amino acid residue mutations at position 125 corresponding to the wild-type IL-2 protein: C125L, C125A, C125S; and preferably C125S.

The affinity of the IL-2 mutant protein of the present invention to the high-affinity IL-2 receptor is eliminated or reduced, while the affinity of the IL-2 mutant to the medium-affinity IL-2 receptor can be substantially retained. As used herein, "elimination or reduction" refers to a situation where it is changed by more than 50% compared with the original level (for example, compared with the affinity of wild-type IL-2 to the high-affinity IL-2 receptor). Therefore, "the affinity of the IL-2 mutant protein of the present invention to the high-affinity IL-2 receptor is eliminated or reduced" as described herein means that, compared with the wild-type IL-2 protein, the binding affinity of the IL-2 mutant of the present invention to the high-affinity IL-2 receptor is reduced by 50% or more, more preferably 60% or more, 70% or more, 80% or more, 90% or more, 95% or more, and most preferably, the IL-2 mutant protein does not bind the high-affinity IL-2 receptor. Similarly, "the affinity of the IL-2 mutant to the medium-affinity IL-2 receptor can be substantially retained" as described herein means that the binding affinity of the IL-2 mutant to the medium-affinity IL-2 receptor is 50% or more, more preferably 60% or more, 70% or more, 80% or more, 90% or more, 95% or more of the binding affinity of the wild-type IL-2 for the medium-affinity IL-2 receptor. In a preferred embodiment, the binding affinity of the IL-2 mutant to the medium-affinity IL-2 receptor is comparable to the binding affinity of the wild-type IL-2 to the medium-affinity IL-2 receptor.

In addition, due to the large individual differences between subjects, the inventors found that effects of some IL-2 mutant proteins in the prior art are relatively different under different molecular structures or between different experimental batches. For example, there is a big difference between the effects exhibited at low concentration and high concentration. However, the IL-2 mutant of the present invention can exhibit excellent technical effects at both low and high concentrations.

"Corresponding to"

As used herein, the term "corresponding to" has the meaning commonly understood by a skilled person. Specifically, "corresponding to" means that, after two sequences are aligned for homology or sequence identity, one sequence corresponds to a designated position in the other sequence. Therefore, for example, "corresponding to wild-type IL-2" means that a certain amino acid sequence is aligned with the amino acid sequence of wild-type IL-2, and the position on the amino acid sequence that corresponds to wild-type IL-2 is found.

Methods for determining sequence homology or identity well-known to a skilled person include, but not limited to: Computational Molecular Biology, Lesk, AM Ed., Oxford University Press, New York, 1988; Biocomputing: Information Biocomputing: Informatics and Genome Projects (Biocomputing: Informatics and Genome Projects), Smith, DW, Academic Press, New York, 1993; Computer Analysis of Sequence Data, Part 1, Griffin, A M and Griffin, HG, Humana Press, New Jersey, 1994; Sequence Analysis in Molecular Biology, von Heinje, G., Academic Press, 1987 and Sequence Analysis Primer, Gribskov, M. and Devereux, J. Ed. M Stockton Press, New York, 1991 and Carillo, H. and Lipman, D., SIAM J. Applied Math., 48:1073 (1988). The preferred method for determining identity is to obtain the largest match between tested sequences. The method for determining identity is compiled in a publicly available computer program. Preferred computer program methods for determining the identity between two sequences include but not limited to: GCG package (Devereux, J. et al., 1984), BLASTP, BLASTN and FASTA (Altschul, S, F. et al., 1990). BLASTX program is publicly available from NCBI and other sources (BLAST Handbook, Altschul, S. et al., NCBI NLM NIH Bethesda, Md. 20894; Altschul, S. et al., 1990). The well-known Smith Waterman algorithm can also be used to determine identity.

Fusion Protein or Conjugate of the Present Invention

Based on the IL-2 mutants of the present invention, a skilled person will know that the IL-2 mutants of the present invention and other non-IL-2 functional moieties can be made into fusion proteins or conjugates. As used herein, a conjugate refers to a water-soluble polymer covalently linked to the residues of the mutant IL-2 polypeptide. In a specific embodiment, the non-IL-2 functional moiety includes, but not limited to: a Fc fragment, Human serum albumin (HSA), an anti-HSA antibody or antibody fragment, Transferrin, Human chorionic gonadotropin β subunit carboxy terminal peptide (CTP), Elastin-like peptide (ELP) and antigen binding portion. In a preferred embodiment, the antigen binding portion can be an antibody or an active antibody fragment thereof, a Fab molecule, scFv molecule and VHH molecule, immunoglobulin molecule, receptor protein molecule or ligand protein molecules; and the immunoglobulin molecule can be an IgG molecule.

Based on conventional operations in the art, a skilled person will know how to obtain a fusion protein or conjugate containing the IL-2 mutant of the present invention. For example, the IL-2 mutant of the present invention can be directly connected to other non-IL-2 functional moieties, or can be connected through a linker. The linker can be a repetitive sequence of AAA or GS, including but not limited to a repetitive sequence of $G_3S$ or a repetitive sequence of $G_4S$; for example, $(G_3S)4$.

Moreover, the IL-2 mutant or fusion protein can also be modified with polyethylene glycol (PEGylation), polysialylated (PSA), saturated fatty acid, and hyaluronic acid (Hyaluronic acid, HA) or polyamino acid (proline-alanine-serine polymer, PAS) to form a conjugate.

Pharmaceutical Composition of the Present Invention and Administration Method Thereof Based on the IL-2 mutant of the present invention, a pharmaceutical composition is also provided in the present invention. In a specific embodiment, the pharmaceutical composition of the present invention comprises the IL-2 mutant of the present invention or the fusion protein or conjugate according to claim 5 and optionally a pharmaceutically acceptable excipient.

Optionally, the composition of the present invention further comprises a pharmaceutically acceptable excipient. If desired, a pharmaceutically acceptable excipient can be added to the IL-2 mutant polypeptide, fusion protein or conjugate of the present invention to form a composition.

Exemplary excipients include, but not limited to, those excipients selected from the group consisting of sugars, inorganic salts, antimicrobial agents, antioxidants, surfactants, buffers, acids, based, amino acids, and combinations thereof. Sugars, such as sugar, derivatized sugar (such as sugar alcohols, aldonic acids, esterified sugars and/or sugar polymers), may be present as excipients. Specific sugar excipients include, for example: monosaccharides, such as fructose, maltose, galactose, glucose, D-mannose, sorbose, etc.; disaccharides, such as lactose, sucrose, trehalose, cellobiose, etc.; polysaccharides, such as raffinose, maltodextrin, dextran, starch, etc.; and sugar alcohols, such as mannitol, xylitol, maltitol, lactitol, xylitol, sorbitol (glucitol), inositol, cyclodextrin, and the like.

Excipients may also include inorganic salts or buffers, such as citric acid, sodium chloride, potassium chloride, sodium sulfate, potassium nitrate, sodium dihydrogen phosphate, disodium hydrogen phosphate, and combinations thereof.

The composition may also include an antimicrobial agent for preventing or suppressing the growth of microorganisms. Non-limiting examples of antimicrobial agents suitable for one or more embodiments of the present invention include benzalkonium chloride, benzethonium chloride, benzyl alcohol, phenol, phenethyl alcohol, and combinations thereof.

Antioxidants can also be present in the composition. Antioxidants are used to prevent oxidation, thereby preventing the deterioration of proteins, conjugates, or other components of the formulation. Antioxidants suitable for one or more embodiments of the present invention include, for example, ascorbyl palmitate, butylated hydroxyanisole, butylated hydroxytoluene, hypophosphorous acid, monothioglycerol, and combinations thereof.

Surfactants can be present as excipients. Exemplary surfactants include: polysorbates, such as "Tween 20" and "Tween 80", and pluronics, such as F68 and F88; sorbitan esters; lipids, such as phospholipids (such as lecithin and other phosphatidyl cholines), fatty acids and fatty esters; steroids such as cholesterol.

Acids or bases can be present in the composition as excipients. Non-limiting examples of acids that can be used include those selected from the group consisting of hydrochloric acid, acetic acid, phosphoric acid, citric acid, malic acid, lactic acid, formic acid, trichloroacetic acid, nitric acid, perchloric acid, phosphoric acid, sulfuric acid, fumaric acid, and combinations thereof. Examples of suitable bases include, but not limited to, bases selected from the group consisting of sodium hydroxide, sodium acetate, ammonium hydroxide, potassium hydroxide, ammonium acetate, potassium acetate, sodium phosphate, potassium phosphate, sodium citrate, sodium formate, sodium sulfate, potassium sulfate, potassium fumarate, and combinations thereof.

Described herein are one or more amino acids that may be present as excipients in the composition. In this regard, exemplary amino acids include arginine, lysine, and glycine.

The amount of the conjugate (i.e., the conjugate formed between the active agent and the polymer agent) in the composition will vary depending on a number of factors, however when the composition is stored in a unit-dosage container (e.g., a vial), a therapeutically effective dosage will be preferred. In addition, the pharmaceutical preparation can be contained in a syringe. The therapeutically effective dosage can be determined experimentally by repeatedly administering increasing amounts of the drug in order to determine which amount will produce a clinically desired endpoint.

The amount of any individual excipient in the composition will vary depending on the activity of the excipient and specific needs of the composition. Typically, the optimal amount of any single excipient is determined by routine experimentation, that is, by preparing a composition containing different amounts of excipients (ranging from low to high), detecting stability and other parameters of the composition, and then determining the range for obtaining the best performance without significant adverse effects.

However, in general, the excipients in the composition are present in an amount of from about 1% to about 99% by weight, preferably from about 5% to about 98% by weight, more preferably from about 15 to about 95% by weight, and most preferably, less than 30% by weight.

These compositions encompass all types of formulations as well as those that are particularly suitable for injection, such as powders or lyophilized formulations and liquid formulations that can be reconstituted. Examples of diluents suitable for reconstituting a solid composition prior to injection include bacteriostatic water for injection, 5% dextrose in water, phosphate buffered saline, sterile water, deionized water, and combinations thereof. For liquid pharmaceutical compositions, solutions and suspensions can be envisaged.

The composition of one or more embodiments of the present invention is typically (but not necessarily) administered by injection, and therefore is generally a liquid solution or suspension immediately before administration. Pharmaceutical preparations can also take other forms, such as syrups, creams, ointments, tablets, powders, and the like. Other modes of administration are also included, such as transpulmonary, transrectal, transdermal, transmucosal, oral, intrathecal, intratumoral, peritumoral, intraperitoneal, subcutaneous, intraarterial administration, and so on.

The present invention also provides a method for administering a therapeutically effective dosage to a patient. Injection of a medicament (such as intramuscular, subcutaneous and parenteral administration) are possible. Types of formulations suitable for parenteral administration include, in particular, injection ready-to-use solutions, dry powders combined with a solvent before application, injection ready-to-use suspensions, and dry insoluble compositions combined with a vehicle before application as well as emulsions and liquid concentrates diluted before application.

The method of administration can be used to treat any condition that can be treated or prevented by administering the mutant protein, fusion protein, or conjugate. A skilled person will understand which condition can be effectively treated by a particular composition. For example, a patients suffering from a disease selected from the following group can be treated: renal cell carcinoma, metastatic melanoma, hepatitis C virus (HCV), human immunodeficiency virus (HIV), acute myeloid leukemia, non-Hodgkin's lymphoma, cutaneous T-cell lymphoma, juvenile rheumatoid arthritis, atopic dermatitis, breast cancer, and bladder cancer.

The actual dosage to be administered will vary according to the age, weight and overall condition of a subject, as well as the severity of the condition being treated, and the judgment of a health care professional. The therapeutically effective amount is known to a skill person and/or described in relevant reference texts and documents. In general, the therapeutically effective amount will range from about 0.001 mg to 1000 mg, preferably in a dosage from 0.01 mg per day to 100 mg per day and more preferably in a dosage from 0.10 mg per day to 50 mg per day. A given dosage can be administered periodically until the symptoms such as organophosphate poisoning are alleviated and/or completely eliminated.

The unit dosage can be determined based on the judgment from a clinician and the needs from a patient, etc., and can be administered in a variety of administration schedules. The specific dosing schedule will be known to a skilled person or can be determined experimentally using conventional methods. Exemplary dosing schedules include, but not limited to, twice a day, once a day, three times a week, twice a week, once a week, twice a month, once a month, and any combination thereof. Once the clinical endpoint has been achieved, the administration of the composition is suspended.

It should be understood that the present invention has been described based on the preferred specific embodiments of the present invention, however, the foregoing description and the following examples are intended to illustrate rather than limit the scope of the present invention. Other aspects, advantages, and modifications within the scope of the present invention will be apparent to a skilled person in the field to which the present invention belongs.

Use and Method for Using the IL-2 Mutant of the Present Invention

As described above, the IL-2 mutant of the present invention can eliminate or reduce the affinity of the IL-2 protein to the high-affinity IL-2 receptor, while retain the affinity of the mutant IL-2 protein to the medium-affinity IL-2 receptor, and retain the biological activities of IL-2, so as to better stimulate the proliferation of tumor immune cells, including but not limited to T effector cells and NK cells. Therefore, the IL-2 mutant, fusion protein, conjugate or pharmaceutical composition of the present invention can be prepared into corresponding drugs. The drug can be used to expand T lymphocytes, natural killer NK cells in vitro or treat diseases that use IL-2 for immunotherapy. In a specific embodiment, the disease is cancer; for example, a cancer that needs to be treated by stimulating the immune system or by proliferating immune cells. In a specific embodiment, the disease may also be an immune disease, human immunodeficiency virus HIV infection, hepatitis C virus HCV infection, rheumatoid arthritis, atopic dermatitis and the like.

The IL-2 mutant of the present invention can also be used to replace wild-type IL-2 in expanding cells in vitro during cell therapy such as CAT-T and CAR-NK.

Advantages of the Present Invention:

1. The IL-2 mutant protein of the present invention reduces or eliminates the affinity to the high-affinity IL-2 receptor, while substantially retains the affinity to the medium-affinity IL-2 receptor;
2. The structure of the IL-2 mutant of the present invention is similar to that of natural IL-2, thereby avoiding effects of mutation on other structural sites of the protein, and retaining biological activities;
3. Compared with other IL-2 mutants in the prior art, the IL-2 mutant of the present invention has lower immunogenicity;
4. The molecule design for the IL-2 mutant of the present invention is simple and convenient for application on different molecules;
5. The IL-2 mutant of the present invention is convenient for production and quality control, and generally in vitro re-modification is not necessary, thereby reducing production steps and improving production efficiency;

6. The IL-2 mutant of the present invention is convenient to form a bifunctional or multifunctional fusion protein or immune composition with other molecules; and
7. The IL-2 mutant of the present invention can be used for immunotherapy, however, it will not cause vascular (or capillary) leak syndrome (VLS) caused by natural IL-2.

The present invention will be further explained below in conjunction with specific embodiments. It should be understood that these embodiments are only used to illustrate the present invention and not to limit the scope of the present invention. The experimental methods without specific conditions in the following examples are usually in accordance with conventional conditions such as the conditions described in Sambrook et al., Molecular Cloning: Laboratory Manual (New York: Cold Spring Harbor Laboratory Press, 1989), or in accordance with the conditions suggested by the manufacturer.

EXAMPLE

Example 1. Synthesis of Mutant Interleukin-2 (IL-2) Protein

1. Synthesis of Gene

The nucleotide sequence encoding the amino acid sequence of the mutant interleukin-2 (IL-2) protein was obtained by an automated gene synthesis method. In some embodiments, HIS tags were added to the ends of gene fragments to facilitate purification. In some embodiments, IgG1-Fc was added to the ends of gene fragments to facilitate purification. Fc tag was also a common means to extend the half-life of a protein drug. The gene fragment flanks with a single restriction endonuclease cleavage site. All gene synthesis sequences were designed to have a 5' DNA sequence encoding a leader peptide that can target the proteins for secretion in eukaryotic cells.

TABLE 1

| Number of mutations | Mutation site | Name of mutants | Protein Tag | Sequence |
|---|---|---|---|---|
| 2 | 3, 39 | IL-2gm1 (T3A, M39N) | HIS | SEQ ID NO: 1 |
| 2 | 3, 39 | IL-2gm1 (T3A, M39N) | HSA | SEQ ID NO: 2 |
| 2 | 3, 49 | IL-2gm2 (T3A, K49N) | HIS | SEQ ID NO: 3 |
| 2 | 3, 73 | IL-2gm3 (T3A, A73T) | HIS | SEQ ID NO: 4 |
| 2 | 3, 73 | IL-2gm3 (T3A, A73S) | HIS | SEQ ID NO: 5 |
| 2 | 3, 109 | IL-2gm7 (T3A, D109N) | HIS | SEQ ID NO: 6 |
| 3 | 3, 39 and 49 | IL-2gm8 (T3A, M39N, K49N) | HIS | SEQ ID NO: 7 |
| 3 | 3, 49 and 73 | IL-2gm4 (T3A, K49N, A73T) | HIS | SEQ ID NO: 8 |
| 3 | 3, 49 and 73 | IL-2gm4 (T3A, K49N, A73T) | IgG1-Fc | SEQ ID NO: 9 |
| 3 | 3, 39 and 73 | IL-2gm9 (T3A, M39N, A73T) | HIS | SEQ ID NO: 10 |
| 3 | 3, 39 and 109 | IL-2gm10 (T3A, M39N, D109N) | HIS | SEQ ID NO: 11 |
| 3 | 3, 49 and 109 | IL-2gm11 (T3A, K49N, D109N) | HIS | SEQ ID NO: 12 |
| 3 | 3, 73 and 109 | IL-2gm12 (T3A, A73T, D109N) | HIS | SEQ ID NO: 13 |
| 4 | 3, 39, 49, 73 | IL-2gm5 (T3A, M39N, K49N, A73T) | HIS | SEQ ID NO: 14 |
| 4 | 3, 39, 49, 73 | IL-2gm5 (T3A, M39N, K49N, A73T) | IgG1-Fc | SEQ ID NO: 15 |
| 4 | 3, 49, 73, 109 | IL-2gm13 (T3A, K49N, A73T, D109N) | HIS | SEQ ID NO: 16 |
| 4 | 3, 39, 73, 109 | IL-2gm14 (T3A, M39N, A73T, D109N) | HIS | SEQ ID NO: 17 |
| 4 | 3, 39, 49, 109 | IL-2gm15 (T3A, M39N, K49N, D109N) | HIS | SEQ ID NO: 18 |
| 5 | 3, 39, 49, 73, 109 | IL-2gm6 (T3A, M39N, K49N, A73T, D109N) | HIS | SEQ ID NO: 19 |
| 5 | 3, 39, 49, 73, 109 | IL-2gm6 (T3A, M39N, K49N, A73T, D109N) | IgG1-Fc | SEQ ID NO: 20 |
| 5 | 3, 39, 49, 73, 109 | IL-2gm6 (T3A, M39N, K49N, A73T, D109N) | HSA | SEQ ID NO: 21 |
| 4 | 3, 42, 45, 72 | IL-2qm(T3A, F42A, Y45A, L72G) | IgG1-Fc | SEQ ID NO: 22 Rocheglicat (CN103492411B) |

2. Construction of Plasmid

The synthesized gene was subcloned into pcDNA3.4 plasmid, and the molecular biology reagents were used in accordance with the manufacturer's instructions.

3. Expression of Mutant Interleukin-2 (IL-2) Protein

Expi293F cells (Thermo Fisher Scientific) were used for plasmid transfection. The cells were cultured in a shaker (VWR Scientific) at 37° C. and 8% $CO_2$ and inoculated in Corning Erlenmeyer Flasks the day before transfection. The transfection method was carried out in accordance with the manufacturer's instructions.

The cell supernatants on the $2^{nd}$ day, $4^{th}$ day, and $5^{th}$ day were collected for Western blotting to confirm protein expression.

Example 2. Expression of CD25 Protein

Gene Synthesis

The nucleotide sequence encoding the amino acid sequence (SEQ ID NO: 23) of the CD25 protein was obtained by an automated gene synthesis method. SEQ ID NO: 24 (GGGSGGGSGGGSGGGS) is the amino acid sequence of a linker. In some embodiments, gene fragments were co-expressed with IgG1-Fc through a linker to facilitate purification. The gene fragment flanks with a single restriction endonuclease cleavage site. All gene synthesis sequences were designed to have a 5' DNA sequence encoding a leader peptide that can target proteins for secretion in eukaryotic cells. SEQ ID NO: 25 shows an exemplary leader peptide sequence. The synthesized gene was subcloned into pcDNA3.4 plasmid, and the molecular biology reagents were used in accordance with the manufacturer's instructions.

Expi293F cells (Thermo Fisher Scientific) were used for plasmid transfection. The cells were cultured in a shaker (VWR Scientific) at 37° C. and 8% $CO_2$ and inoculated in Corning Erlenmeyer Flasks the day before transfection. The transfection method was carried out in accordance with the manufacturer's instructions.

The cell supernatant suspensions on the $2^{nd}$ day, $4^{th}$ day, and $5^{th}$ day were collected for Western blotting to confirm protein expression.

Example 3. Experiment to Detect the Binding Affinity to CD25 by Using ELISA, Fortebio or Biacore™

The inventors used enzyme-linked immunoassay to detect the binding ability of IL-2 mutants to CD25.

CD25 (from Example 2) was coated on a 96-well high adsorption microtiter plate (3590, Costar), washed and blocked. The sample to be tested was diluted to an appropriate concentration and added to wells. TMB development was conducted, and a microplate reader (M5, Molecular Devices) was used at a wavelength of 450/650 nm to read the signal value of each well. rhIL-2 is a recombinant human interleukin-2 for injection (Quanqi).

TABLE 2

Overview of the binding activity of rhIL-2 and IL-2 mutants to CD25

| Concentration | Binding activity (%) | | |
|---|---|---|---|
| (ug/ml) | 1 | 0.2 | 0.04 |
| IL-2gm1 | 0.88% | 1.08% | 1.66% |
| IL-2gm2 | 30.99% | 31.26% | 16.64% |
| IL-2gm3 | 10.33% | 5.62% | 2.27% |
| IL-2gm4 | 14.79% | 7.50% | 3.18% |

TABLE 2-continued

Overview of the binding activity of rhIL-2 and IL-2 mutants to CD25

| Concentration | Binding activity (%) | | |
|---|---|---|---|
| (ug/ml) | 1 | 0.2 | 0.04 |
| IL-2gm5 | 0.88% | 1.08% | 1.51% |
| IL-2gm6 | 0.88% | 1.08% | 1.36% |
| IL-2gm7 | 8.10% | 2.96% | 1.82% |
| IL-2gm8 | 0.74% | 0.99% | 1.51% |
| IL-2gm9 | 0.88% | 1.18% | 1.51% |
| IL-2gm10 | 0.88% | 1.08% | 1.51% |
| IL-2gm11 | 12.49% | 5.03% | 2.42% |
| IL-2gm12 | 2.77% | 1.48% | 1.97% |
| IL-2gm13 | 2.23% | 1.18% | 1.51% |
| IL-2gm14 | 0.74% | 0.99% | 1.51% |
| IL-2gm15 | 0.68% | 0.99% | 1.36% |
| IL-2qm | 0.74% | 0.99% | 1.51% |
| rhIL-2 | 100.00% | 100.00% | 100.00% |

Note:
The binding activity of IL-2gm at each concentration is based on rhIL-2 (binding activity 100%) as a control.

Figure 1:
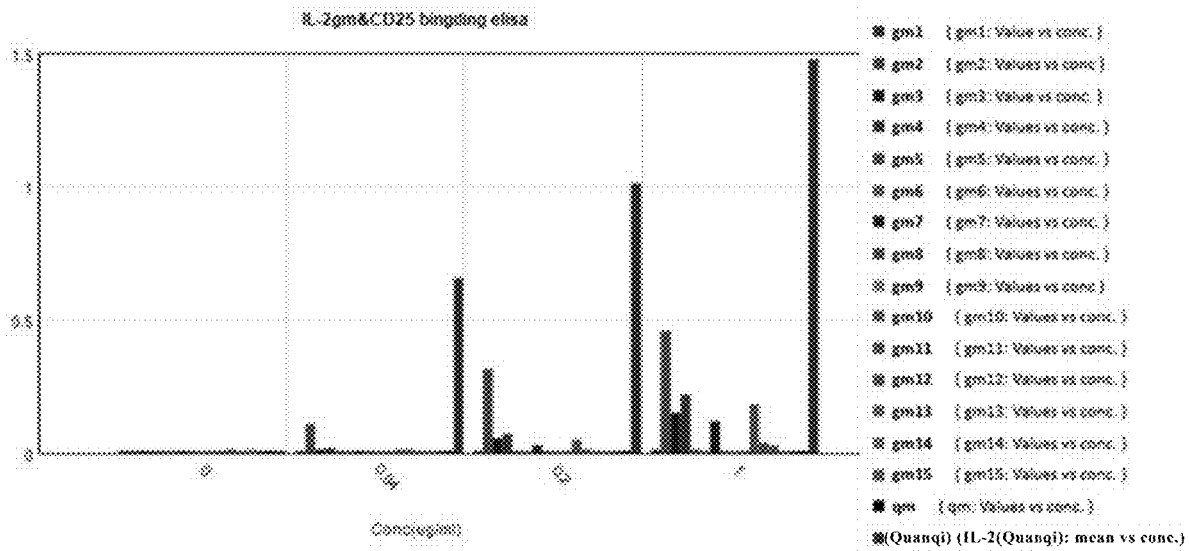
FIG. 1 shows the binding ability of IL-2 mutants to CD25 detected by enzyme-linked immunosorbent assay.

Results are shown in FIG. 1. From the figure, it can be clearly seen that under the experimental concentrations, rhIL-2 can bind CD25, and the dosage-dependent binding activities were: rhIL-2>IL-2gm2>IL-2gm4>IL-2gm11>IL-2gm3>IL-2gm7>IL-2gm12>IL-2gm13. It can be judged as no binding, when there is no dosage correlation at these concentrations, including IL-2gm1, IL-2gm5, IL-2gm6, IL-2gm8, IL-2gm9, IL-2gm10, IL-2gm14, IL-2gm15, IL-2qm (CN103492411A), demonstrating that the abilities of IL-2gm1, IL-2gm5, IL-2gm6, IL-2gm8, IL-2gm9, IL-2gm10, IL-2gm14, IL-2gm15 to bind CD25 were completely lost; and the abilities of IL-2gm2, IL-2gm4, IL-2gm11, IL-2gm3, IL-2gm7, IL-2gm12, and IL-2gm13 to bind CD25 were partially lost.

Example 4. Analysis on Cell Proliferation Using CTLL2 Cells

In this example, the inventors used CTLL2 cells to evaluate the activity of rhIL-2 and the mutant interleukin-2 of Example 1 in the cell proliferation analysis.

The same number of CTLL-2 cells (mouse cytotoxic T lymphocyte cell line, which is IL-2 dependent, and highly express CD25 on the cell surface) were inoculated in an experimental plate, and then rhIL-2 and IL-2 mutant were added according to the concentration gradient. After incubating for 48 hours, cell Titer Glo Luminescent buffer was added. Intracellular content of ATP was detected by chemiluminescence (SpectraMaxM5), and the number of cells in each well was detected, so as to detect the effects of different concentrations of rhIL-2 and IL-2 mutants on cell proliferation. The data was analyzed with GraphPad Prism7 software, and the curve was fitted with Nonlinear regression. The EC50 value of cell proliferation (the concentration of the test compound required to exhibit 50% of the maximum response) was obtained from the non-linear regression analysis of the dose-response curve.

Figure 2:
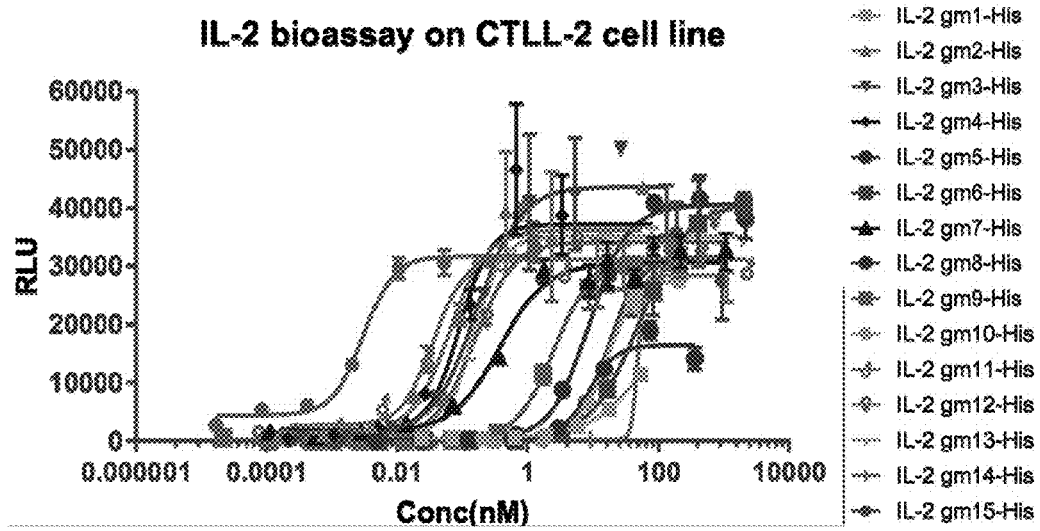
FIG. 2 shows the proliferation of CTLL-2 cells in response to rhIL-2 and mutant interleukin-2 (His tag).

Analysis on cell proliferation was used to measure the activity of rhIL-2 and mutant interleukin-2 (His tag), and a summary of the results is shown in Table 3 and FIG. 2. All test articles induced the growth of CTLL-2 cells in a dose-dependent manner. When the cell proliferation folds are comparable, we believe that the larger the EC50, the weaker the activity of stimulating the growth of CTLL2. This change is due to the effects of the mutant protein on the binding to CD25, however the mutant protein retains the ability to activate IL-2R signal transduction through the IL-2Rβγ heterodimer. Therefore, after the concentration was increased, the cells were effectively expanded. Compared with rhIL-2, the highest potency of all IL-2 mutants (His tag) does not exceed 8.314%, demonstrating that IL-2 gm (1~15) can eliminate the binding to CD25, and the stimulation effect was weakened since the IL-2Rαβγ heterotrimer was not formed. Preferably, compared with the control sample rhIL-2, the proliferation effects of IL-2gm1, IL-2gm3, IL-2gm5, IL-2gm6, IL-2gm7, IL-2gm8, IL-2gm9, IL-2gm10, IL-2gm12, IL-2gm14 and IL-2gm15 were reduced by more than 50 times (more than 100 times for IL-2gm1, IL-2gm6, and IL-2gm14).

TABLE 3

Overview of CTLL-2 cell proliferation in response to rhIL-2 and mutant interleukin-2 (His tag)

| Tested Sample | $EC_{50}$ (nM) | Potency relative to rhIL-2 (%) |
|---|---|---|
| rhIL-2 | 2.90E−03 | 100% |
| IL-2gm1-His | 8.34E+01 | 0.003% |
| IL-2gm2-His | 6.38E−02 | 4.547% |
| IL-2gm3-His | 1.65E−01 | 1.763% |
| IL-2gm4-His | 9.06E−02 | 3.199% |
| IL-2gm5-His | 8.221 | 0.035% |
| IL-2gm6-His | 5.15E+01 | 0.006% |
| IL-2gm7-His | 3.65E−01 | 0.794% |
| IL-2gm8-His | 8.838 | 0.033% |
| IL-2gm9-His | 2.385 | 0.122% |
| IL-2gm10-His | 1.56E+01 | 0.019% |
| IL-2gm11-His | 3.49E−02 | 8.314% |
| IL-2gm12-His | 1.56E−01 | 1.865% |
| IL-2gm13-His | 1.44E−01 | 2.012% |
| IL-2gm14-His | 4.79E+01 | 0.006% |
| IL-2gm15-His | 1.65E+01 | 0.018% |

Figure 3:
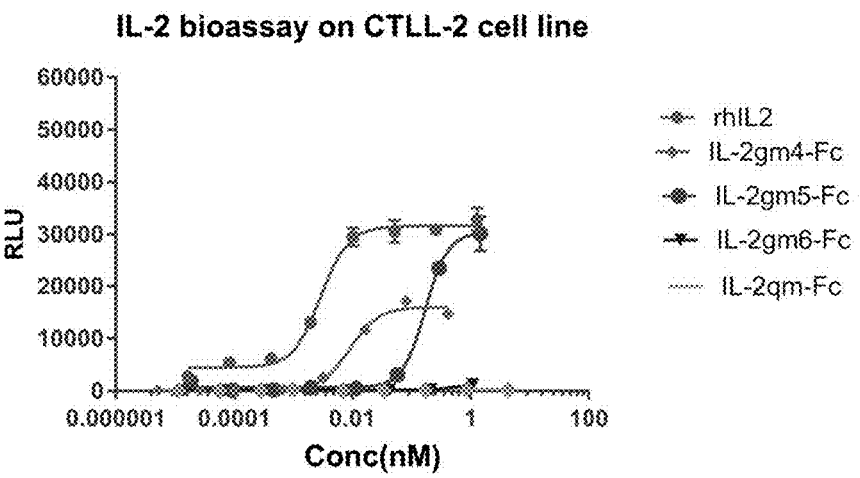
FIG. 3 shows the proliferation of CTLL-2 cells in response to rhIL-2 and mutant interleukin-2 (Fc tag).

Analysis on cell proliferation was used to measure the activities of rhIL-2 and mutant interleukin-2 (Fc tag), and a summary of the results is shown in Table 4 and FIG. 3. All test articles induced the growth of CTLL-2 cells in a dose-dependent manner. When the cell proliferation folds are comparable, the larger the $EC_{50}$, the weaker the activity of stimulating the growth of CTLL2. This change is due to the effects of the mutant protein on the binding to CD25, however the mutant protein retains the activation of IL-2R signaling through the IL-2Rβγ heterodimer. Therefore, after the concentration was increased, the cells were effectively expanded. Compared with rhIL-2, the highest potency of all IL-2 mutants (Fc tag) does not exceed 31.546%. It is proved that the dual form of IL-2 gm (4~6) can also eliminate the binding to CD25, and the stimulation effect was weakened since the IL-2Rαβγ heterotrimer was not formed. Preferably, compared with the control sample rhIL-2, the proliferation effects of IL-2qm-Fc, IL-2gm5 and IL-2gm6 on CTLL2 were reduced by more than 50 times, in which IL-2qm-Fc and IL-2gm6-Fc were not observed for significant cell proliferation in the tested concentration range.

TABLE 4

Overview of CTLL-2 cell proliferation in response to rhIL-2 and mutant interleukin-2 (Fc tag)

| Tested Sample | $EC_{50}$ (nM) | Potency relative to rhIL-2 (%) |
|---|---|---|
| rhIL-2 | 2.90E−03 | 100% |
| IL-2gm4-Fc | 9.19E−03 | 31.546% |
| IL-2gm5-Fc | 1.73E−01 | 1.681% |

TABLE 4-continued

Overview of CTLL-2 cell proliferation in response to rhIL-2 and mutant interleukin-2 (Fc tag)

| Tested Sample | $EC_{50}$ (nM) | Potency relative to rhIL-2 (%) |
|---|---|---|
| IL-2gm6-Fc | 5.95E+00 | 0.049% |
| IL-2qm-Fc | 2.07E+13 | 0.000% |

Example 5. Analysis on Cell Proliferation Using NK92 Cells

The inventors used NK92 cells to evaluate the activities of rhIL-2 and the mutant interleukin-2 of Example 1 in cell proliferation analysis.

The same number of NK92 cells (NK-92 cell is a strain of IL-2 dependent NK cell line derived from peripheral blood mononuclear cells of a 50-year-old white male with rapidly progressive non-Hodgkin's lymphoma, and the cell expresses CD25 on the surface) were inoculated in an experimental plate, and then rhIL-2 and IL-2 mutant were added according to the concentration gradient. After incubating for 72 hours, cell Titer Glo Luminescent buffer was added. Intracellular content of ATP was detected by chemiluminescence (SpectraMaxM5), and the number of cells in each well was detected, so as to detect the effects of different concentrations of rhIL-2 and IL-2 mutants on cell proliferation. The data was analyzed with GraphPad Prism7 software, and the curve was fitted with Nonlinear regression. The EC50 value of cell proliferation (the concentration of the test compound required to exhibit 50% of the maximum response) was obtained from the non-linear regression analysis of the dose-response curve.

Analysis on cell proliferation was used to measure the activity of rhIL-2 and mutant interleukin-2 (His tag), and a summary of the results is shown in Table 5 and FIG. 4. All test articles induced the growth of NK92 cells in a dose-dependent manner. When the cell proliferation folds are comparable, the larger the EC50, the weaker the activity of stimulating the growth of NK92. This change is due to the effects of the mutant protein on the binding to CD25, however the mutant protein retains the ability to activate IL-2R signal transduction through the IL-2Rβγ heterodimer. Therefore, after the concentration was increased, the cells were effectively expanded. Compared with rhIL-2, the highest potency of all IL-2 mutants (His tag) does not exceed 1.721%, demonstrating that for NK-92 cell with CD25 expressed on the surface, IL-2 gm (1~15) can eliminate the binding to CD25, and the stimulation effect was weakened since the IL-2Rαβγ heterotrimer was not formed. Among them, IL-2gm1, IL-2gm5 and IL-2gm14 were the most significant, and the proliferation effect was reduced by more than 100 times.

TABLE 5

Overview of NK92 cell proliferation in response to rhIL-2 and mutant interleukin-2 (His tag)

| Tested Sample | $EC_{50}$ (nM) | Potency relative to rhIL-2 (%) |
|---|---|---|
| rhIL-2 | 1.93E−03 | 100 |
| IL-2gm1-His | 3.85E+01 | 0.005% |
| IL-2gm2-His | 1.12E−01 | 1.721% |
| IL-2gm3-His | 2.21E+00 | 0.088% |

TABLE 5-continued

Overview of NK92 cell proliferation in response
to rhIL-2 and mutant interleukin-2 (His tag)

| Tested Sample | EC$_{50}$ (nM) | Potency relative to rhIL-2 (%) |
|---|---|---|
| IL-2gm4-His | 2.34E−01 | 0.828% |
| IL-2gm5-His | 20.68 | 0.009% |
| IL-2gm6-His | 7.08E+00 | 0.027% |
| IL-2gm7-His | 5.57E−01 | 0.347% |
| IL-2gm8-His | 8.91 | 0.022% |
| IL-2gm9-His | 1.067 | 0.181% |
| IL-2gm10-His | 1.27E+01 | 0.015% |
| IL-2gm11-His | 2.80E−01 | 0.690% |
| IL-2gm12-His | 2.96E−01 | 0.653% |
| IL-2gm13-His | 2.93E−01 | 0.661% |
| IL-2gm14-His | 2.32E+01 | 0.008% |
| IL-2gm15-His | 7.76E+00 | 0.025% |

Analysis on cell proliferation was used to measure the activities of rhIL-2 and mutant interleukin-2 (Fc tag), and a summary of the results is shown in Table 6 and FIG. 5. All test articles induced the growth of NK92 cells in a dose-dependent manner. When the cell proliferation folds are comparable, the larger the EC50, the weaker the activity of stimulating the growth of NK92. This change is due to the effects of the mutant protein on the binding to CD25, however the mutant protein retains the activation of IL-2R signaling through the IL-2Rβγ heterodimer. Therefore, after the concentration was increased, the cells were effectively expanded. Compared with rhIL-2, the highest potency of all IL-2 mutants (Fc tag) does not exceed 34.783%. It is proved that for NK-92 cell with CD25 expressed on the surface, the dual form of IL-2qm-Fc, IL-2 gm (4~6) can also reduce the binding to CD25, and the stimulation effect was weakened since the IL-2Rαβγ heterotrimer was not formed. Preferably, compared with rhIL-2, the potency of IL-2qm-Fc and IL-2gm6-Fc are reduced by more than 100 times. However, the amplification folds of IL-2qm on NK92 cells was significantly lower than that of other mutant proteins.

TABLE 6

Overview of NK92 cell proliferation in response to
rhIL-2 and mutant interleukin-2 (Fc tag)

| Tested Sample | EC$_{50}$ (nM) | Potency relative to rhIL-2 (%) |
|---|---|---|
| rhIL-2 | 5.28E−03 | 100 |
| IL-2gm4-Fc | 1.52E−02 | 34.783% |
| IL-2gm5-Fc | 7.11E−02 | 7.425% |
| IL-2gm6-Fc | 8.24E−01 | 0.641% |
| IL-2qm-Fc | 3.06E−01 | 1.727% |

Example 6. Study on the Half-Life of the Mutant Protein of the Present Invention The inventors further studied the in vivo half-life of the mutant protein obtained by the method of the present invention, and found that the half-life of the mutant protein obtained by the method of the present invention increased to varying degrees.

Example 7. Synthesis of IL-2 Mutant Protein (HSA Tag)

The inventors further synthesized following IL-2 mutants:

TABLE 7

| Number of mutations | Mutation site | Name of mutants | Protein Tag | Sequence number |
|---|---|---|---|---|
| 2 | 3, 39 | IL-2gm1 (T3A, M39N) | HSA | SEQ ID NO: 26 |
| 3 | 3, 49 and 73 | IL-2gm4 (T3A, K49N, A73T) | HSA | SEQ ID NO: 27 |
| 5 | 3, 39, 49, 73, 109 | IL-2gm6 (T3A, M39N, K49N, A73T, D109N) | HSA | SEQ ID NO: 28 |
| 2 | 3, 109 | IL-2gm7 (T3A, D109N) | HSA | SEQ ID NO: 29 |
| 2 | 3, 39 | IL-2gm1a (T3A, M39D) | HSA | SEQ ID NO: 34 |
| 2 | 3, 39 | IL-2gm1b (T3A, M39E) | HSA | SEQ ID NO: 35 |
| 2 | 3, 39 | IL-2gm1c (T3A, M39Q) | HSA | SEQ ID NO: 36 |
| 2 | 3, 39 | IL-2gm1d (T3A, M39A) | HSA | SEQ ID NO: 37 |
| 1 | 3 | IL-2-HSA (T3A) wild type | HSA | SEQ ID NO: 30 |

Encoding sequences for IL-2 mutant molecules IL-2gm1, IL-2gm4, IL-2gm6, IL-2gm7 and the encoding sequence for HSA were concatenated and constructed into eukaryotic expression vectors by molecular cloning method to prepare expression vectors for IL-2 mutant molecules, respectively. 293E cells cultured in Freestyle medium were used for transient transfection and expression of IL-2 mutant molecules. Twenty-four hours before transfection, 150 ml of 293E cells at $0.5\times10^6$ cells/ml was inoculated into a 1 L cell culture flask, and cultured in a shaker at 120 rpm in a 37° C. 5% $CO_2$ incubator. During transfection, 150 μl of 293 fectin was taken and added into 2.85 ml of OptiMEM, mixed well, and incubated at room temperature for 2 minutes; meanwhile, 150 μg of plasmids used to express IL-2 molecules was diluted in 3 ml of OptiMEM. The above-diluted transfection reagent and plasmid were mixed thoroughly, and incubated at room temperature for 15 minutes. Then all the mixture was added to the cells, mixed, and incubated in a shaker at 120 rpm in a 37° C. 5% $CO_2$ incubator for 7 days. The cell culture supernatant was collected, filtered through a 0.22 micron filter membrane, and then purified on a Q-HP ion exchange chromatography column (GE) by using 20 mM Tris 0-500 mM NaCl, pH 8.0 for linear elution. Samples were collected continuously by volume. Collected components were detected by SDS-PAGE using 4-20% gradient gel (GenScript), and samples were combined according to the electrophoretic purity.

Example 8. Preparation of Receptor Protein

To study the binding ability of IL-2 mutant molecules to IL-2Rα receptor and IL-2RBY heterodimerization receptor, human IL-2Rα receptor and IL-2Rβγ heterodimerization receptor were prepared for Biacore™ affinity detection.

For designing human IL-2Rα receptor, the encoding sequence for the extracellular domain of IL-2Rα was linked to the encoding sequence for 6×His Tag (SEQ ID NO: 31) and cloned into a eukaryotic expression vector. 293E cells cultured in Freestyle medium were used for transient transfection and expression of IL-2Rα receptor. Twenty-four hours before transfection, 150 ml of 293E cells at $0.5\times10^6$ cells/ml was inoculated into a 1 L cell culture flask, and cultured in a shaker at 120 rpm in a 37° C. 5% $CO_2$ incubator. During transfection, 150 μl of 293 fectin was taken and added into 2.85 ml of OptiMEM, mixed well, and incubated at room temperature for 2 minutes; meanwhile, 150 μg of plasmids used to express IL-2Rα receptor was diluted in 3 ml of OptiMEM. The above-diluted transfection reagent and plasmid were mixed thoroughly, and incubated at room temperature for 15 minutes. Then all the mixture was added to the cells, mixed, and incubated in a shaker at 120 rpm in a 37° C. 5% $CO_2$ incubator for 7 days. The cell culture supernatant was collected, filtered through a 0.22 micron filter membrane, and then purified on a Ni-NTA affinity chromatography column (GE) by using 20 mM PB-0.5 M NaCl-100 mM imidazole for elution. The purified protein was detected by SDS-PAGE using 4-20% gradient gel (GenScript).

The human IL-2Rβγ heterodimerization receptor was designed by using the "Knobs into Holes" technology to link the encoding sequence for IL-2RB extracellular domain with the encoding sequence for "Knobs" Fc fragment (SEQ ID NO: 32), and cloned into a eukaryotic expression vector. The encoding sequence for IL-2Rγ extracellular domain was linked to the encoding sequence for "Holes" Fc fragment (SEQ ID NO: 33), and cloned into a eukaryotic expression vector. 293E cells cultured in Freestyle medium were used for transient transfection and expression of IL-2Rβγ heterodimerization receptor. Twenty-four hours before transfection, 150 ml of 293E cells at $0.5\times10^6$ cells/ml was inoculated into a 1 L cell culture flask, and cultured in a shaker at 120 rpm in a 37° C. 5% $CO_2$ incubator. During transfection, 150 μl of 293 fectin was taken and added into 2.85 ml of OptiMEM, mixed well, and incubated at room temperature for 2 minutes; meanwhile, 75 μg of plasmids used to express IL-2Rβγ heterodimerization receptor was diluted in 3 ml of OptiMEM. The above-diluted transfection reagent and plasmid were mixed thoroughly, and incubated at room temperature for 15 minutes. Then all the mixture was added to the cells, mixed, and incubated in a shaker at 120 rpm in a 37° C. 5% $CO_2$ incubator for 7 days. The cell culture supernatant was collected, filtered through a 0.22 micron filter membrane, and then purified on a MabSelect SuRe affinity chromatography column (GE) by using 20 mM citrate-sodium citrate, pH 3.0 for elution. pH was adjusted to neutral with 1 M Tris base. The purified protein was detected by SDS-PAGE using 4-20% gradient gel (GenScript).

Example 9. Experiment to Detect Binding Affinity by Biacore™

For studying the affinity of the IL-2 mutant to the receptor compared with the wild-type IL-2, the recombinant monomer IL-2Rα subunit was used to determine the affinity of the IL-2 mutant and wild-type IL-2-HSA to human IL-2Rα subunit by Biacore™ 8K (GE) under the following conditions: immobilizing human IL-2Rα subunit on a CM5 chip (190RU). The IL-2 mutant and IL-2-HSA were used as analytes in HBS-EP buffer at 25° C. For IL-2Rα, the concentration of analyte was reduced from 200 nM to 1.526 nM (1:2 dilution), and the flow rate was 30 μl/min (binding time 180 seconds, dissociation time 300 seconds). For IL-2Rα, regeneration was performed with 20 mM NaOH, 30 μl/min for 10 seconds. For IL-2Rα, 1:1 binding was used with RI≠0, $R_{max}$=global fitting data.

Under the following conditions, recombinant IL-2Rβγ heterodimer was used to determine the affinity of IL-2 mutant and the wild-type IL-2-HSA to human IL-2Rβγ heterodimer by Biacore™ 8K (GE): human hIL-2Rβ, γ ECD-N-hIgG1Fc was immobilized on a Protein A chip (400RU). IL-2 mutant and IL-2-HSA were used as analytes in HBS-EP buffer at 25° C. For IL-2Rβγ, the concentration of analyte was reduced from 200 nM to 1.5625 nM (1:2 dilution), and the flow rate was 30 μl/min (binding time 180 seconds, dissociation time 300 seconds). For IL-2Rβγ, 10 mM Glycine (pH1.5), 30 μl/min, 30 seconds was used for regeneration. For IL-2Rβγ, 1:1 binding was used with RI≠0, $R_{max}$=local fitting data.

Results are as follows:

TABLE 8

Affinities (KD) of IL-2 mutants to the receptor compared with the wild-type IL-2

| Tested sample | Human IL-2Rα (Steady state) | Human IL-2Rα (dynamic state) | Human IL-2Rβγ heterodimer (dynamic state) |
| --- | --- | --- | --- |
| IL-2-HSA wild type | 5.56E−08M | 1.06E−07M | 1.53E−08M |
| IL-2gm1-HSA | no binding | no binding | 1.38E−08M |
| IL-2gm4-HSA | 7.26E−08M | 3.54E−08M | 3.30E−08M |
| IL-2gm6-HSA | no binding | no binding | 2.89E−08M |
| IL-2gm1a-HSA | no binding | no binding | 3.65E−08M |
| IL-2gm1b-HSA | no binding | no binding | 2.83E−08M |
| IL-2gm1c-HSA | no binding | no binding | 3.84E−08M |
| IL-2gm1d-HSA | 6.62E−08M | 1.13E−08M | 2.30E−08M |

Compared with the affinity of wild-type IL-2-HSA to human IL-2Rα subunit: there is no binding for IL-2gm1-HSA, IL-2gm6-HSA, IL-2gm1a-HSA, IL-2gm1b-HSA and IL-2gm1c-HSA, and there is binding for IL-2gm4-HSA and IL-2gm1d-HSA;

Compared with the affinity of wild-type IL-2-HSA to human recombinant IL-2Rβγ heterodimer: IL-2gm1-HSA, IL-2gm4-HSA, IL-2gm6-HSA, IL-2gm1a-HSA, IL-2gm1b-HSA, IL-2gm1c-HSA and IL-2gm1d-HSA are comparable to the wild type.

Therefore, IL-2gm1-HSA, IL-2gm1a-HSA, IL-2gm1b-HSA and IL-2gm1c-HSA are preferred target molecules.

Figure 8A:
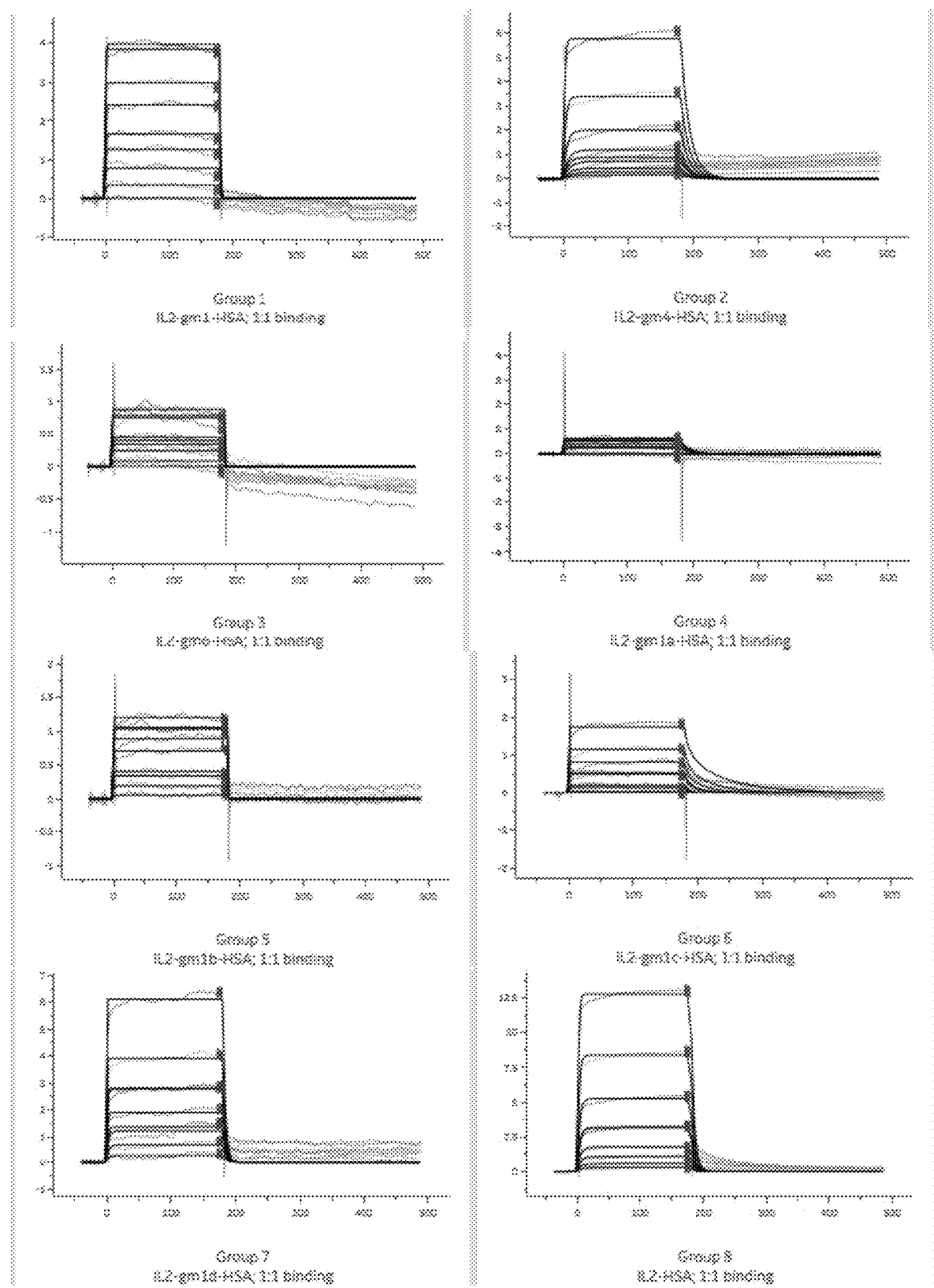
FIGS. 8A and 8B show the affinities of IL-2gm1-HSA, IL-2gm4-HSA, IL-2gm6-HSA, IL-2gm1a-HSA, IL-2gm1b-HSA, IL-2gm1c-HSA, IL-2gm1d-HSA, wild-type IL-2-HSA for human IL-2Rα subunit and human recombinant IL-2Rβγ heterodimer, respectively.

FIG. 8A shows the affinity of IL-2gm1-HSA, IL-2gm4-HSA, IL-2gm6-HSA, IL-2gm1a-HSA, IL-2gm1b-HSA, IL-2gm1c-HSA, IL-2gm1d-HSA, the wild type IL-2-HSA to human IL-2Rα subunit.

Figure 8B:
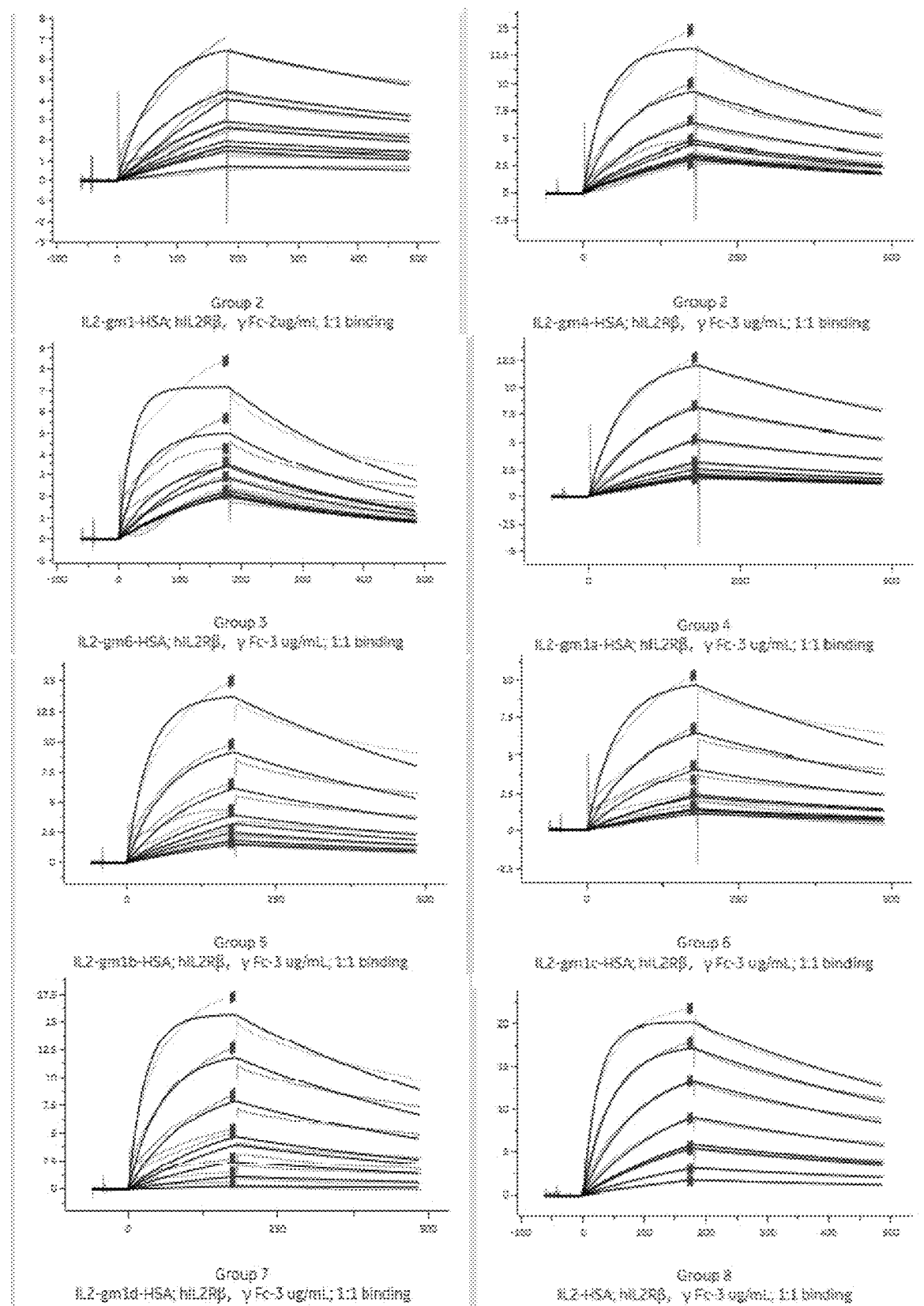

FIG. 8B shows the affinity of IL-2gm1-HSA, IL-2gm4-HSA, IL-2gm6-HSA, IL-2gm1a-HSA, IL-2gm1b-HSA, IL-2gm1c-HSA, IL-2gm1d-HSA, the wild type IL-2-HSA to human recombinant IL-2Rβγ heterodimer.

Example 10. Analysis on Cell Proliferation Using NK92 Cells

NK-92 cell is a strain of IL-2 dependent NK cell line derived from peripheral blood mononuclear cells of a 50-year-old white male with rapidly progressive non-Hodgkin's lymphoma, and the cell expresses CD25 on the surface. The inventors used NK92 cells to evaluate the activities of IL-2gm1-HSA, IL-2gm4-HSA, IL-2gm6-HSA and the wild-type IL-2-HSA in a cell proliferation analysis.

NK92 cells in the logarithmic growth phase were harvested, washed for one time with basal medium MEM-a, and cultured (5000 cells/well) with different concentrations of IL-2gm1-HSA, IL-2gm4-HSA, IL-2gm6-HSA and the wild-type IL-2-HSA in experimental medium (MEM-a medium from Gibco (Cat. No. 32561-037) supplemented with 12.5% fetal bovine serum and 12.5% horse serum) at 37° C. and 5% $CO_2$ incubator for a total of 48 hours. 100 µl of ATP detection substrate CellTiter-Glo® (from Promega (Cat. No. G7571)) was added to each well, and the full-wavelength fluorescence value was detected with a microplate reader (purchased from Molecular Devices (Model I3x)) by end-point method.

Figure 9:
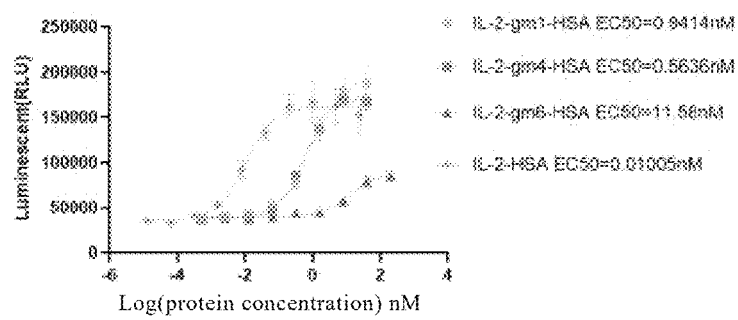
FIG. 9 shows how IL-2 mutants and wild-type IL-2 stimulate the proliferation of NK92 cells.

Activities of IL-2gm1-HSA, IL-2gm4-HSA, IL-2gm6-HSA and the wild-type IL-2 molecule IL-2-HSA were measured by an analysis on cell proliferation, and the results are shown in FIG. 9. All test articles induced the growth of NK92 cells in a dosage-dependent manner. When the cell proliferation folds are comparable, the larger the EC50, the weaker the activity of stimulating the growth of NK92. This change is due to the effects of the mutant protein on the binding to CD25, however the IL-2gm1-HSA mutant protein retains the activation of IL-2R signaling through the IL-2Rβγ heterodimer. Therefore, after the concentration was increased, the cells were effectively expanded. Compared with IL-2-HSA, the specific activity of IL-2gm1-HSA to stimulate the proliferation of NK92 cells was 1.07%, demonstrating that for NK-92 cell with CD25 expressed on the surface, IL-2gm1-HSA can eliminate the binding to CD25, and the stimulation effect was weakened since the IL-2Rαβγ heterotrimer was not formed. Compared with IL-2-HSA, the proliferation effects of IL-2gm1-HSA on NK92 cells are reduced by more than 100 times. Compared with IL-2-HSA, the specific activity of IL-2gm4-HSA to stimulate the proliferation of NK92 cells was 1.78%, and compared with IL-2-HSA, the specific activity of IL-2gm6-HSA to stimulate the proliferation of NK92 cells was 0.087%. After the concentration was increased, the cells were effectively expanded and the biological activities are retained.

Example 11. Measuring the Release of IFN-γ Induced by IL-2 Mutant

NK92 cells in the logarithmic growth phase were harvested, washed for one time with basal medium MEM-a, and cultured (5000 cells/well) with different concentrations of IL-2gm1-HSA, IL-2gm4-HSA, IL-2gm6-HSA and the wild-type IL-2-HSA in an experimental medium (MEM-a medium from Gibco (Cat. No. 32561-037) supplemented with 12.5% fetal bovine serum and 12.5% horse serum) at 37° C. and 5% $CO_2$ incubator for a total of 24 hours. The supernatant was harvested and analyzed for the release of IFN-γ using an anti-human IFN-γ ELISA kit from R&D (#SIF50).

Figure 10A:
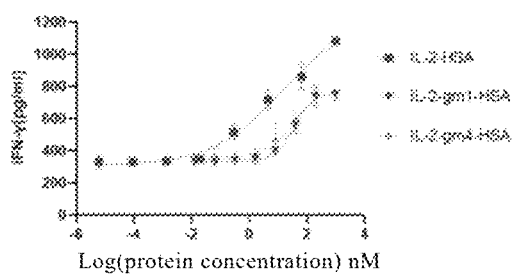
FIG. 10A shows the release of interferon γ from NK92 cells induced by different concentrations of IL-2gm1-HSA, IL-2gm4-HSA and wild-type IL-2-HSA; and FIG.

Results are shown in FIG. 10A, in which all of IL-2gm1-HSA, IL-2gm4-HSA and the wild-type IL-2-HSA exhibit stimulating effects on interferon gamma.

Figure 10B:
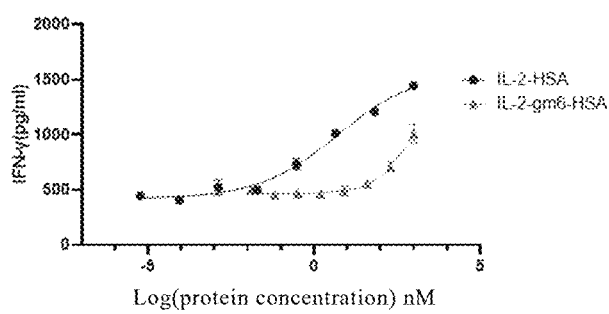

Results are shown in FIG. 10B, in which both of IL-2gm6-HSA and the wild-type IL-2-HSA exhibit stimulating effects on interferon gamma.

Example 12. Measuring Proliferation of PBMC Stimulated by IL-2 Mutants

Fresh blood samples from healthy Chinese people (n=2) were collected in sodium heparin tubes by the inventors and PBMCs were separated, resuspended in RPMI-1640 medium (containing 10% FBS) and inoculated in a 48-well plate ($1*10^6$ cells/well). PBMCs were stimulated with different concentrations of IL-2gm6-HSA and wild-type IL-2-HSA, and cultured in a 37° C., 5% $CO_2$ incubator for 6 days. Cell surface and intracellular marker antibodies were used for FACS staining to detect different cell populations. All of the samples were obtained by LSRFortessa™ cell analyzer.

NK cells are defined as CD3−/CD56+, and Treg cells are defined as CD3+CD4+CD25+Foxp3+.

Results are shown in FIGS. 11A-B, in which FIG. 11A shows that at a concentration of 4 nM, IL-2gm6-HSA exhibits slightly worse stimulating effects on the proliferation of NK cells compared with wild-type IL-2-HSA; and at a concentration of 100 nM, IL-2gm6-HSA significantly stimulates proliferation of NK cells compared with the wild-type IL-2-HSA; and FIG. 11B shows that at 4 nM and 100 nM concentrations, stimulating effects of IL-2gm6-HSA on Treg cells are significantly reduced compared with the wild-type IL-2-HSA.

Therefore, in this experiment, IL-2gm6-HSA significantly stimulates the proliferation of NK cells and significantly inhibits the proliferation of Treg cells.

Subsequently, the inventors also tested the stimulating effects of IL-2gm1-HSA and the wild-type IL-2-HSA on the proliferation of PBMCs.

NK cells are defined as CD3−/CD56+, and CD4+ cells are defined as CD3+/CD4+.

Results are shown in FIGS. 12A-B, in which FIG. 12A shows that at a stimulating concentration of 0-500 nM, the stimulating effects of IL-2gm1-HSA on the proliferation of NK cells are significantly higher than those of the wild-type IL-2-HSA; and FIG. 12B shows that at a stimulating concentration of 0-500 nM, the stimulating effects of IL-2gm1-HSA on the proliferation of CD4+ T cells are significantly reduced compared with the wild-type IL-2-HSA.

Therefore, in this experiment, IL-2gm1-HSA significantly stimulates the proliferation of NK cells and significantly inhibits the proliferation of CD4+ T cells.

All documents mentioned in the present invention are cited as references in this application, as if each document was individually cited as a reference. In addition, it should be understood that after reading the above teaching content of the present invention, those skilled in the art can make various changes or modifications to the present invention, and these equivalent forms also fall within the scope defined by the appended claims of the present application.

The invention claimed is:

1. An IL-2 mutant, wherein the IL-2 mutant comprises the amino acid sequence of SEQ ID NO: 34.

2. A polynucleotide, encoding the IL-2 mutant of claim 1.

3. An expression vector, comprising the polynucleotide of claim 2.

4. A host cell, comprising the expression vector of claim 3, or having the polynucleotide of claim 2 integrated into the genome of the host cell.

5. A pharmaceutical composition, comprising the IL-2 mutant protein of claim 1 and a pharmaceutically acceptable excipient.

6. A method for treating a cancer, comprising administering a therapeutically effective amount of the IL-2 mutant of claim 1 or a pharmaceutical composition comprising the IL-2 mutant to an individual in need thereof.

* * * * *

SEQUENCE LISTING

```
<160> NUMBER OF SEQ ID NOS: 37

<210> SEQ ID NO 1
<211> LENGTH: 139
<212> TYPE: PRT
<213> ORGANISM: Artificial sequence
<220> FEATURE:
<223> OTHER INFORMATION: IL-2gm1

<400> SEQUENCE: 1

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Asn Leu Thr Phe Lys Phe Tyr Met Pro Lys
            35                  40                  45

Lys Ala Thr Glu Leu Lys His Leu Gln Cys Leu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
    130                 135

<210> SEQ ID NO 2
<211> LENGTH: 718
<212> TYPE: PRT
<213> ORGANISM: Artificial sequence
<220> FEATURE:
<223> OTHER INFORMATION: IL-2gm1-HSA

<400> SEQUENCE: 2

Ala Pro Ala Ser Ser Ser Thr Lys Lys Thr Gln Leu Gln Leu Glu His
```

```
1               5                    10                   15
Leu Leu Leu Asp Leu Gln Met Ile Leu Asn Gly Ile Asn Asn Tyr Lys
                20                  25                  30
Asn Pro Lys Leu Thr Arg Asn Leu Thr Phe Lys Phe Tyr Met Pro Lys
                35                  40                  45
Lys Ala Thr Glu Leu Lys His Leu Gln Cys Leu Glu Glu Leu Lys
                50                  55                  60
Pro Leu Glu Glu Val Leu Asn Leu Ala Gln Ser Lys Asn Phe His Leu
65                  70                  75                  80
Arg Pro Arg Asp Leu Ile Ser Asn Ile Asn Val Ile Val Leu Glu Leu
                85                  90                  95
Lys Gly Ser Glu Thr Thr Phe Met Cys Glu Tyr Ala Asp Glu Thr Ala
                100                 105                 110
Thr Ile Val Glu Phe Leu Asn Arg Trp Ile Thr Phe Ala Gln Ser Ile
                115                 120                 125
Ile Ser Thr Leu Thr Asp Ala His Lys Ser Glu Val Ala His Arg Phe
                130                 135                 140
Lys Asp Leu Gly Glu Glu Asn Phe Lys Ala Leu Val Leu Ile Ala Phe
145                 150                 155                 160
Ala Gln Tyr Leu Gln Gln Cys Pro Phe Glu Asp His Val Lys Leu Val
                165                 170                 175
Asn Glu Val Thr Glu Phe Ala Lys Thr Cys Val Ala Asp Glu Ser Ala
                180                 185                 190
Glu Asn Cys Asp Lys Ser Leu His Thr Leu Phe Gly Asp Lys Leu Cys
                195                 200                 205
Thr Val Ala Thr Leu Arg Glu Thr Tyr Gly Glu Met Ala Asp Cys Cys
210                 215                 220
Ala Lys Gln Glu Pro Glu Arg Asn Glu Cys Phe Leu Gln His Lys Asp
225                 230                 235                 240
Asp Asn Pro Asn Leu Pro Arg Leu Val Arg Pro Glu Val Asp Val Met
                245                 250                 255
Cys Thr Ala Phe His Asp Asn Glu Glu Thr Phe Leu Lys Lys Tyr Leu
                260                 265                 270
Tyr Glu Ile Ala Arg Arg His Pro Tyr Phe Tyr Ala Pro Glu Leu Leu
                275                 280                 285
Phe Phe Ala Lys Arg Tyr Lys Ala Ala Phe Thr Glu Cys Cys Gln Ala
                290                 295                 300
Ala Asp Lys Ala Ala Cys Leu Leu Pro Lys Leu Asp Glu Leu Arg Asp
305                 310                 315                 320
Glu Gly Lys Ala Ser Ser Ala Lys Gln Arg Leu Lys Cys Ala Ser Leu
                325                 330                 335
Gln Lys Phe Gly Glu Arg Ala Phe Lys Ala Trp Ala Val Ala Arg Leu
                340                 345                 350
Ser Gln Arg Phe Pro Lys Ala Glu Phe Ala Glu Val Ser Lys Leu Val
                355                 360                 365
Thr Asp Leu Thr Lys Val His Thr Glu Cys Cys His Gly Asp Leu Leu
                370                 375                 380
Glu Cys Ala Asp Asp Arg Ala Asp Leu Ala Lys Tyr Ile Cys Glu Asn
385                 390                 395                 400
Gln Asp Ser Ile Ser Ser Lys Leu Lys Glu Cys Cys Glu Lys Pro Leu
                405                 410                 415
Leu Glu Lys Ser His Cys Ile Ala Glu Val Glu Asn Asp Glu Met Pro
                420                 425                 430
```

-continued

```
Ala Asp Leu Pro Ser Leu Ala Ala Asp Phe Val Glu Ser Lys Asp Val
            435                 440                 445

Cys Lys Asn Tyr Ala Glu Ala Lys Asp Val Phe Leu Gly Met Phe Leu
        450                 455                 460

Tyr Glu Tyr Ala Arg Arg His Pro Asp Tyr Ser Val Val Leu Leu Leu
465                 470                 475                 480

Arg Leu Ala Lys Thr Tyr Glu Thr Thr Leu Glu Lys Cys Cys Ala Ala
                485                 490                 495

Ala Asp Pro His Glu Cys Tyr Ala Lys Val Phe Asp Glu Phe Lys Pro
            500                 505                 510

Leu Val Glu Glu Pro Gln Asn Leu Ile Lys Gln Asn Cys Glu Leu Phe
        515                 520                 525

Glu Gln Leu Gly Glu Tyr Lys Phe Gln Asn Ala Leu Leu Val Arg Tyr
    530                 535                 540

Thr Lys Lys Val Pro Gln Val Ser Thr Pro Thr Leu Val Glu Val Ser
545                 550                 555                 560

Arg Asn Leu Gly Lys Val Gly Ser Lys Cys Cys Lys His Pro Glu Ala
                565                 570                 575

Lys Arg Met Pro Cys Ala Glu Asp Tyr Leu Ser Val Val Leu Asn Gln
            580                 585                 590

Leu Cys Val Leu His Glu Lys Thr Pro Val Ser Asp Arg Val Thr Lys
        595                 600                 605

Cys Cys Thr Glu Ser Leu Val Asn Arg Arg Pro Cys Phe Ser Ala Leu
    610                 615                 620

Glu Val Asp Glu Thr Tyr Val Pro Lys Glu Phe Asn Ala Glu Thr Phe
625                 630                 635                 640

Thr Phe His Ala Asp Ile Cys Thr Leu Ser Glu Lys Glu Arg Gln Ile
                645                 650                 655

Lys Lys Gln Thr Ala Leu Val Glu Leu Val Lys His Lys Pro Lys Ala
            660                 665                 670

Thr Lys Glu Gln Leu Lys Ala Val Met Asp Asp Phe Ala Ala Phe Val
        675                 680                 685

Glu Lys Cys Cys Lys Ala Asp Asp Lys Glu Thr Cys Phe Ala Glu Glu
    690                 695                 700

Gly Lys Lys Leu Val Ala Ala Ser Gln Ala Ala Leu Gly Leu
705                 710                 715
```

<210> SEQ ID NO 3
<211> LENGTH: 139
<212> TYPE: PRT
<213> ORGANISM: Artificial sequence
<220> FEATURE:
<223> OTHER INFORMATION: IL-2gm2

<400> SEQUENCE: 3

```
Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Asn Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80
```

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
    130                 135

<210> SEQ ID NO 4
<211> LENGTH: 139
<212> TYPE: PRT
<213> ORGANISM: Artificial sequence
<220> FEATURE:
<223> OTHER INFORMATION: IL-2gm3

<400> SEQUENCE: 4

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
    130                 135

<210> SEQ ID NO 5
<211> LENGTH: 139
<212> TYPE: PRT
<213> ORGANISM: Artificial sequence
<220> FEATURE:
<223> OTHER INFORMATION: IL-2gm3

<400> SEQUENCE: 5

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ser Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala

```
                100                 105                 110
Thr Ile Val Glu Phe Leu Asn Arg Trp Ile Thr Phe Ala Gln Ser Ile
        115                 120                 125

Ile Ser Thr Leu Thr His His His His His His
    130                 135

<210> SEQ ID NO 6
<211> LENGTH: 139
<212> TYPE: PRT
<213> ORGANISM: Artificial sequence
<220> FEATURE:
<223> OTHER INFORMATION: IL-2gm7

<400> SEQUENCE: 6

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His His
    130                 135

<210> SEQ ID NO 7
<211> LENGTH: 139
<212> TYPE: PRT
<213> ORGANISM: Artificial sequence
<220> FEATURE:
<223> OTHER INFORMATION: IL-2gm8

<400> SEQUENCE: 7

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125
```

Ile Ser Thr Leu Thr His His His His His
    130                 135

<210> SEQ ID NO 8
<211> LENGTH: 139
<212> TYPE: PRT
<213> ORGANISM: Artificial sequence
<220> FEATURE:
<223> OTHER INFORMATION: IL-2gm4

<400> SEQUENCE: 8

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
    130                 135

<210> SEQ ID NO 9
<211> LENGTH: 381
<212> TYPE: PRT
<213> ORGANISM: Artificial sequence
<220> FEATURE:
<223> OTHER INFORMATION: IL-2gm4-Fc

<400> SEQUENCE: 9

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Gly Gly Ser Gly Gly Ser Gly Gly
    130                 135                 140

Ser Gly Gly Ser Glu Pro Lys Ser Ser Asp Lys Thr His Thr Ser
145                 150                 155                 160

```
Pro Pro Ser Pro Ala Pro Glu Leu Glu Gly Gly Ser Val Phe Leu
            165                 170                 175
Phe Pro Pro Lys Pro Lys Asp Thr Leu Met Ile Ser Arg Thr Pro Glu
        180                 185                 190
Val Thr Cys Val Val Val Asp Val Ser His Glu Asp Pro Glu Val Lys
    195                 200                 205
Phe Asn Trp Tyr Val Asp Gly Val Glu Val His Asn Ala Lys Thr Lys
210                 215                 220
Pro Arg Glu Glu Gln Tyr Ala Ser Thr Tyr Arg Val Val Ser Val Leu
225                 230                 235                 240
Thr Val Leu His Gln Asp Trp Leu Asn Gly Lys Ala Tyr Ala Cys Ala
            245                 250                 255
Val Ser Asn Lys Ala Leu Pro Ala Pro Ile Glu Lys Thr Ile Ser Lys
        260                 265                 270
Ala Lys Gly Gln Pro Arg Glu Pro Gln Val Tyr Thr Leu Pro Pro Ser
    275                 280                 285
Arg Glu Glu Met Thr Lys Asn Gln Val Ser Leu Thr Cys Leu Val Lys
290                 295                 300
Gly Phe Tyr Pro Ser Asp Ile Ala Val Glu Trp Glu Ser Asn Gly Gln
305                 310                 315                 320
Pro Glu Asn Asn Tyr Lys Thr Thr Pro Pro Val Leu Asp Ser Asp Gly
            325                 330                 335
Ser Phe Phe Leu Tyr Ser Lys Leu Thr Val Asp Lys Ser Arg Trp Gln
        340                 345                 350
Gln Gly Asn Val Phe Ser Cys Ser Val Met His Glu Ala Leu His Asn
    355                 360                 365
His Tyr Thr Gln Lys Ser Leu Ser Leu Ser Pro Gly Lys
370                 375                 380

<210> SEQ ID NO 10
<211> LENGTH: 139
<212> TYPE: PRT
<213> ORGANISM: Artificial sequence
<220> FEATURE:
<223> OTHER INFORMATION: IL-2gm9

<400> SEQUENCE: 10

Ala Pro Ala Ser Ser Ser Thr Lys Lys Thr Gln Leu Gln Leu Glu His
1               5                   10                  15
Leu Leu Leu Asp Leu Gln Met Ile Leu Asn Gly Ile Asn Asn Tyr Lys
                20                  25                  30
Asn Pro Lys Leu Thr Arg Asn Leu Thr Phe Lys Phe Tyr Met Pro Lys
            35                  40                  45
Lys Ala Thr Glu Leu Lys His Leu Gln Cys Leu Glu Glu Glu Leu Lys
        50                  55                  60
Pro Leu Glu Glu Val Leu Asn Leu Thr Gln Ser Lys Asn Phe His Leu
65                  70                  75                  80
Arg Pro Arg Asp Leu Ile Ser Asn Ile Asn Val Ile Val Leu Glu Leu
                85                  90                  95
Lys Gly Ser Glu Thr Thr Phe Met Cys Glu Tyr Ala Asp Glu Thr Ala
            100                 105                 110
Thr Ile Val Glu Phe Leu Asn Arg Trp Ile Thr Phe Ala Gln Ser Ile
        115                 120                 125
Ile Ser Thr Leu Thr His His His His His His
    130                 135
```

<210> SEQ ID NO 11
<211> LENGTH: 139
<212> TYPE: PRT
<213> ORGANISM: Artificial sequence
<220> FEATURE:
<223> OTHER INFORMATION: IL-2gm10

<400> SEQUENCE: 11

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His His
            130                 135

<210> SEQ ID NO 12
<211> LENGTH: 139
<212> TYPE: PRT
<213> ORGANISM: Artificial sequence
<220> FEATURE:
<223> OTHER INFORMATION: IL-2gm11

<400> SEQUENCE: 12

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His His
            130                 135

<210> SEQ ID NO 13
<211> LENGTH: 139
<212> TYPE: PRT

<213> ORGANISM: Artificial sequence
<220> FEATURE:
<223> OTHER INFORMATION: IL-2gm12

<400> SEQUENCE: 13

```
Ala Pro Ala Ser Ser Ser Thr Lys Lys Thr Gln Leu Gln Leu Glu His
1               5                   10                  15
Leu Leu Leu Asp Leu Gln Met Ile Leu Asn Gly Ile Asn Asn Tyr Lys
            20                  25                  30
Asn Pro Lys Leu Thr Arg Met Leu Thr Phe Lys Phe Tyr Met Pro Lys
        35                  40                  45
Lys Ala Thr Glu Leu Lys His Leu Gln Cys Leu Glu Glu Glu Leu Lys
    50                  55                  60
Pro Leu Glu Glu Val Leu Asn Leu Thr Gln Ser Lys Asn Phe His Leu
65                  70                  75                  80
Arg Pro Arg Asp Leu Ile Ser Asn Ile Asn Val Ile Val Leu Glu Leu
                85                  90                  95
Lys Gly Ser Glu Thr Thr Phe Met Cys Glu Tyr Ala Asn Glu Thr Ala
                100                 105                 110
Thr Ile Val Glu Phe Leu Asn Arg Trp Ile Thr Phe Ala Gln Ser Ile
            115                 120                 125
Ile Ser Thr Leu Thr His His His His His His
            130                 135
```

<210> SEQ ID NO 14
<211> LENGTH: 139
<212> TYPE: PRT
<213> ORGANISM: Artificial sequence
<220> FEATURE:
<223> OTHER INFORMATION: IL-2gm5

<400> SEQUENCE: 14

```
Ala Pro Ala Ser Ser Ser Thr Lys Lys Thr Gln Leu Gln Leu Glu His
1               5                   10                  15
Leu Leu Leu Asp Leu Gln Met Ile Leu Asn Gly Ile Asn Asn Tyr Lys
            20                  25                  30
Asn Pro Lys Leu Thr Arg Asn Leu Thr Phe Lys Phe Tyr Met Pro Lys
        35                  40                  45
Asn Ala Thr Glu Leu Lys His Leu Gln Cys Leu Glu Glu Glu Leu Lys
    50                  55                  60
Pro Leu Glu Glu Val Leu Asn Leu Thr Gln Ser Lys Asn Phe His Leu
65                  70                  75                  80
Arg Pro Arg Asp Leu Ile Ser Asn Ile Asn Val Ile Val Leu Glu Leu
                85                  90                  95
Lys Gly Ser Glu Thr Thr Phe Met Cys Glu Tyr Ala Asp Glu Thr Ala
                100                 105                 110
Thr Ile Val Glu Phe Leu Asn Arg Trp Ile Thr Phe Ala Gln Ser Ile
            115                 120                 125
Ile Ser Thr Leu Thr His His His His His His
            130                 135
```

<210> SEQ ID NO 15
<211> LENGTH: 365
<212> TYPE: PRT
<213> ORGANISM: Artificial sequence
<220> FEATURE:
<223> OTHER INFORMATION: IL-2gm5-Fc

<400> SEQUENCE: 15

-continued

```
Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Glu Pro Lys Ser Ser Asp Lys Thr His Thr Ser
    130                 135                 140

Pro Pro Ser Pro Ala Pro Glu Leu Glu Gly Gly Ser Ser Val Phe Leu
145                 150                 155                 160

Phe Pro Pro Lys Pro Lys Asp Thr Leu Met Ile Ser Arg Thr Pro Glu
                165                 170                 175

Val Thr Cys Val Val Val Asp Val Ser His Glu Asp Pro Glu Val Lys
            180                 185                 190

Phe Asn Trp Tyr Val Asp Gly Val Glu Val His Asn Ala Lys Thr Lys
        195                 200                 205

Pro Arg Glu Glu Gln Tyr Ala Ser Thr Tyr Arg Val Val Ser Val Leu
    210                 215                 220

Thr Val Leu His Gln Asp Trp Leu Asn Gly Lys Ala Tyr Ala Cys Ala
225                 230                 235                 240

Val Ser Asn Lys Ala Leu Pro Ala Pro Ile Glu Lys Thr Ile Ser Lys
                245                 250                 255

Ala Lys Gly Gln Pro Arg Glu Pro Gln Val Tyr Thr Leu Pro Pro Ser
            260                 265                 270

Arg Glu Glu Met Thr Lys Asn Gln Val Ser Leu Thr Cys Leu Val Lys
        275                 280                 285

Gly Phe Tyr Pro Ser Asp Ile Ala Val Glu Trp Glu Ser Asn Gly Gln
    290                 295                 300

Pro Glu Asn Asn Tyr Lys Thr Thr Pro Pro Val Leu Asp Ser Asp Gly
305                 310                 315                 320

Ser Phe Phe Leu Tyr Ser Lys Leu Thr Val Asp Lys Ser Arg Trp Gln
                325                 330                 335

Gln Gly Asn Val Phe Ser Cys Ser Val Met His Glu Ala Leu His Asn
            340                 345                 350

His Tyr Thr Gln Lys Ser Leu Ser Leu Ser Pro Gly Lys
        355                 360                 365

<210> SEQ ID NO 16
<211> LENGTH: 139
<212> TYPE: PRT
<213> ORGANISM: Artificial sequence
<220> FEATURE:
<223> OTHER INFORMATION: IL-2gm13

<400> SEQUENCE: 16
```

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His His
    130                 135

<210> SEQ ID NO 17
<211> LENGTH: 139
<212> TYPE: PRT
<213> ORGANISM: Artificial sequence
<220> FEATURE:
<223> OTHER INFORMATION: IL-2gm14

<400> SEQUENCE: 17

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His His
    130                 135

<210> SEQ ID NO 18
<211> LENGTH: 139
<212> TYPE: PRT
<213> ORGANISM: Artificial sequence
<220> FEATURE:
<223> OTHER INFORMATION: IL-2gm15

<400> SEQUENCE: 18

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys

```
            20                  25                  30

Asn Pro Lys Leu Thr Arg Asn Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
        130                 135

<210> SEQ ID NO 19
<211> LENGTH: 139
<212> TYPE: PRT
<213> ORGANISM: Artificial sequence
<220> FEATURE:
<223> OTHER INFORMATION: IL-2gm6

<400> SEQUENCE: 19

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr His His His His His
        130                 135

<210> SEQ ID NO 20
<211> LENGTH: 365
<212> TYPE: PRT
<213> ORGANISM: Artificial sequence
<220> FEATURE:
<223> OTHER INFORMATION: IL-2gm6-Fc

<400> SEQUENCE: 20

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45
```

```
Asn Ala Thr Glu Leu Lys His Leu Gln Cys Leu Glu Glu Leu Lys
     50              55                  60

Pro Leu Glu Glu Val Leu Asn Leu Thr Gln Ser Lys Asn Phe His Leu
 65              70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asn Glu Thr Ala
                100                 105                 110

Thr Ile Val Glu Phe Leu Asn Arg Trp Ile Thr Phe Ala Gln Ser Ile
            115                 120                 125

Ile Ser Thr Leu Thr Glu Pro Lys Ser Ser Asp Lys Thr His Thr Ser
130                 135                 140

Pro Pro Ser Pro Ala Pro Glu Leu Glu Gly Gly Ser Ser Val Phe Leu
145                 150                 155                 160

Phe Pro Pro Lys Pro Lys Asp Thr Leu Met Ile Ser Arg Thr Pro Glu
                165                 170                 175

Val Thr Cys Val Val Val Asp Val Ser His Glu Asp Pro Glu Val Lys
            180                 185                 190

Phe Asn Trp Tyr Val Asp Gly Val Glu Val His Asn Ala Lys Thr Lys
        195                 200                 205

Pro Arg Glu Glu Gln Tyr Ala Ser Thr Tyr Arg Val Val Ser Val Leu
    210                 215                 220

Thr Val Leu His Gln Asp Trp Leu Asn Gly Lys Ala Tyr Ala Cys Ala
225                 230                 235                 240

Val Ser Asn Lys Ala Leu Pro Ala Pro Ile Glu Lys Thr Ile Ser Lys
                245                 250                 255

Ala Lys Gly Gln Pro Arg Glu Pro Gln Val Tyr Thr Leu Pro Pro Ser
            260                 265                 270

Arg Glu Glu Met Thr Lys Asn Gln Val Ser Leu Thr Cys Leu Val Lys
        275                 280                 285

Gly Phe Tyr Pro Ser Asp Ile Ala Val Glu Trp Glu Ser Asn Gly Gln
    290                 295                 300

Pro Glu Asn Asn Tyr Lys Thr Thr Pro Pro Val Leu Asp Ser Asp Gly
305                 310                 315                 320

Ser Phe Phe Leu Tyr Ser Lys Leu Thr Val Asp Lys Ser Arg Trp Gln
                325                 330                 335

Gln Gly Asn Val Phe Ser Cys Ser Val Met His Glu Ala Leu His Asn
            340                 345                 350

His Tyr Thr Gln Lys Ser Leu Ser Leu Ser Pro Gly Lys
        355                 360                 365

<210> SEQ ID NO 21
<211> LENGTH: 718
<212> TYPE: PRT
<213> ORGANISM: Artificial sequence
<220> FEATURE:
<223> OTHER INFORMATION: IL-2gm6-HSA

<400> SEQUENCE: 21

Ala Pro Ala Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Lys Leu Thr Arg Asn Leu Thr Phe Lys Phe Tyr Met Pro Lys
         35                  40                  45
```

```
Asn Ala Thr Glu Leu Lys His Leu Gln Cys Leu Glu Glu Leu Lys
    50              55                  60

Pro Leu Glu Glu Val Leu Asn Leu Thr Gln Ser Lys Asn Phe His Leu
65              70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
                100                 105                 110

Thr Ile Val Glu Phe Leu Asn Arg Trp Ile Thr Phe Ala Gln Ser Ile
            115                 120                 125

Ile Ser Thr Leu Thr Asp Ala His Lys Ser Glu Val Ala His Arg Phe
130                 135                 140

Lys Asp Leu Gly Glu Glu Asn Phe Lys Ala Leu Val Leu Ile Ala Phe
145                 150                 155                 160

Ala Gln Tyr Leu Gln Gln Cys Pro Phe Glu Asp His Val Lys Leu Val
                165                 170                 175

Asn Glu Val Thr Glu Phe Ala Lys Thr Cys Val Ala Asp Glu Ser Ala
            180                 185                 190

Glu Asn Cys Asp Lys Ser Leu His Thr Leu Phe Gly Asp Lys Leu Cys
            195                 200                 205

Thr Val Ala Thr Leu Arg Glu Thr Tyr Gly Glu Met Ala Asp Cys Cys
210                 215                 220

Ala Lys Gln Glu Pro Glu Arg Asn Glu Cys Phe Leu Gln His Lys Asp
225                 230                 235                 240

Asp Asn Pro Asn Leu Pro Arg Leu Val Arg Pro Glu Val Asp Val Met
                245                 250                 255

Cys Thr Ala Phe His Asp Asn Glu Glu Thr Phe Leu Lys Lys Tyr Leu
            260                 265                 270

Tyr Glu Ile Ala Arg Arg His Pro Tyr Phe Tyr Ala Pro Glu Leu Leu
            275                 280                 285

Phe Phe Ala Lys Arg Tyr Lys Ala Ala Phe Thr Glu Cys Cys Gln Ala
            290                 295                 300

Ala Asp Lys Ala Ala Cys Leu Leu Pro Lys Leu Asp Glu Leu Arg Asp
305                 310                 315                 320

Glu Gly Lys Ala Ser Ser Ala Lys Gln Arg Leu Lys Cys Ala Ser Leu
                325                 330                 335

Gln Lys Phe Gly Glu Arg Ala Phe Lys Ala Trp Ala Val Ala Arg Leu
            340                 345                 350

Ser Gln Arg Phe Pro Lys Ala Glu Phe Ala Glu Val Ser Lys Leu Val
            355                 360                 365

Thr Asp Leu Thr Lys Val His Thr Glu Cys Cys His Gly Asp Leu Leu
370                 375                 380

Glu Cys Ala Asp Asp Arg Ala Asp Leu Ala Lys Tyr Ile Cys Glu Asn
385                 390                 395                 400

Gln Asp Ser Ile Ser Ser Lys Leu Lys Glu Cys Cys Glu Lys Pro Leu
                405                 410                 415

Leu Glu Lys Ser His Cys Ile Ala Glu Val Glu Asn Asp Glu Met Pro
            420                 425                 430

Ala Asp Leu Pro Ser Leu Ala Ala Asp Phe Val Glu Ser Lys Asp Val
            435                 440                 445

Cys Lys Asn Tyr Ala Glu Ala Lys Asp Val Phe Leu Gly Met Phe Leu
450                 455                 460

Tyr Glu Tyr Ala Arg Arg His Pro Asp Tyr Ser Val Val Leu Leu Leu
```

```
                465                 470                 475                 480
Arg Leu Ala Lys Thr Tyr Glu Thr Thr Leu Glu Lys Cys Cys Ala Ala
                485                 490                 495

Ala Asp Pro His Glu Cys Tyr Ala Lys Val Phe Asp Glu Phe Lys Pro
            500                 505                 510

Leu Val Glu Glu Pro Gln Asn Leu Ile Lys Gln Asn Cys Glu Leu Phe
            515                 520                 525

Glu Gln Leu Gly Glu Tyr Lys Phe Gln Asn Ala Leu Leu Val Arg Tyr
        530                 535                 540

Thr Lys Lys Val Pro Gln Val Ser Thr Pro Thr Leu Val Glu Val Ser
545                 550                 555                 560

Arg Asn Leu Gly Lys Val Gly Ser Lys Cys Cys Lys His Pro Glu Ala
                565                 570                 575

Lys Arg Met Pro Cys Ala Glu Asp Tyr Leu Ser Val Val Leu Asn Gln
            580                 585                 590

Leu Cys Val Leu His Glu Lys Thr Pro Val Ser Asp Arg Val Thr Lys
        595                 600                 605

Cys Cys Thr Glu Ser Leu Val Asn Arg Arg Pro Cys Phe Ser Ala Leu
610                 615                 620

Glu Val Asp Glu Thr Tyr Val Pro Lys Glu Phe Asn Ala Glu Thr Phe
625                 630                 635                 640

Thr Phe His Ala Asp Ile Cys Thr Leu Ser Glu Lys Glu Arg Gln Ile
                645                 650                 655

Lys Lys Gln Thr Ala Leu Val Glu Leu Val Lys His Lys Pro Lys Ala
            660                 665                 670

Thr Lys Glu Gln Leu Lys Ala Val Met Asp Asp Phe Ala Ala Phe Val
        675                 680                 685

Glu Lys Cys Cys Lys Ala Asp Asp Lys Glu Thr Cys Phe Ala Glu Glu
            690                 695                 700

Gly Lys Lys Leu Val Ala Ala Ser Gln Ala Ala Leu Gly Leu
705                 710                 715

<210> SEQ ID NO 22
<211> LENGTH: 365
<212> TYPE: PRT
<213> ORGANISM: Artificial sequence
<220> FEATURE:
<223> OTHER INFORMATION: IL-2qm-Fc

<400> SEQUENCE: 22

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Ala Lys Phe Ala Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Gly Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
```

|     |     |     |     | 115 |     |     |     |     | 120 |     |     |     |     | 125 |     |
| --- | --- | --- | --- | --- | --- | --- | --- | --- | --- | --- | --- | --- | --- | --- | --- |

Ile Ser Thr Leu Thr Glu Pro Lys Ser Ser Asp Lys Thr His Thr Ser
 130                 135                 140

Pro Pro Ser Pro Ala Pro Glu Leu Glu Gly Gly Ser Ser Val Phe Leu
145                 150                 155                 160

Phe Pro Pro Lys Pro Lys Asp Thr Leu Met Ile Ser Arg Thr Pro Glu
                165                 170                 175

Val Thr Cys Val Val Val Asp Val Ser His Glu Asp Pro Glu Val Lys
            180                 185                 190

Phe Asn Trp Tyr Val Asp Gly Val Glu Val His Asn Ala Lys Thr Lys
        195                 200                 205

Pro Arg Glu Glu Gln Tyr Ala Ser Thr Tyr Arg Val Val Ser Val Leu
    210                 215                 220

Thr Val Leu His Gln Asp Trp Leu Asn Gly Lys Ala Tyr Ala Cys Ala
225                 230                 235                 240

Val Ser Asn Lys Ala Leu Pro Ala Pro Ile Glu Lys Thr Ile Ser Lys
                245                 250                 255

Ala Lys Gly Gln Pro Arg Glu Pro Gln Val Tyr Thr Leu Pro Pro Ser
            260                 265                 270

Arg Glu Glu Met Thr Lys Asn Gln Val Ser Leu Thr Cys Leu Val Lys
        275                 280                 285

Gly Phe Tyr Pro Ser Asp Ile Ala Val Glu Trp Glu Ser Asn Gly Gln
    290                 295                 300

Pro Glu Asn Asn Tyr Lys Thr Thr Pro Pro Val Leu Asp Ser Asp Gly
305                 310                 315                 320

Ser Phe Phe Leu Tyr Ser Lys Leu Thr Val Asp Lys Ser Arg Trp Gln
                325                 330                 335

Gln Gly Asn Val Phe Ser Cys Ser Val Met His Glu Ala Leu His Asn
            340                 345                 350

His Tyr Thr Gln Lys Ser Leu Ser Leu Ser Pro Gly Lys
        355                 360                 365

<210> SEQ ID NO 23
<211> LENGTH: 467
<212> TYPE: PRT
<213> ORGANISM: Artificial sequence
<220> FEATURE:
<223> OTHER INFORMATION: Synthetic construct

<400> SEQUENCE: 23

Glu Leu Cys Asp Asp Pro Pro Glu Ile Pro His Ala Thr Phe Lys
1               5                   10                  15

Ala Met Ala Tyr Lys Glu Gly Thr Met Leu Asn Cys Glu Cys Lys Arg
            20                  25                  30

Gly Phe Arg Arg Ile Lys Ser Gly Ser Leu Tyr Met Leu Cys Thr Gly
        35                  40                  45

Asn Ser Ser His Ser Ser Trp Asp Asn Gln Cys Gln Cys Thr Ser Ser
    50                  55                  60

Ala Thr Arg Asn Thr Thr Lys Gln Val Thr Pro Gln Pro Glu Glu Gln
65                  70                  75                  80

Lys Glu Arg Lys Thr Thr Glu Met Gln Ser Pro Met Gln Pro Val Asp
                85                  90                  95

Gln Ala Ser Leu Pro Gly His Cys Arg Glu Pro Pro Pro Trp Glu Asn
            100                 105                 110

Glu Ala Thr Glu Arg Ile Tyr His Phe Val Val Gly Gln Met Val Tyr

```
            115                 120                 125
Tyr Gln Cys Val Gln Gly Tyr Arg Ala Leu His Arg Gly Pro Ala Glu
        130                 135                 140

Ser Val Cys Lys Met Thr His Gly Lys Thr Arg Trp Thr Gln Pro Gln
145                 150                 155                 160

Leu Ile Cys Thr Gly Glu Met Glu Thr Ser Gln Phe Pro Gly Glu Glu
                165                 170                 175

Lys Pro Gln Ala Ser Pro Glu Gly Arg Pro Glu Ser Glu Thr Ser Cys
            180                 185                 190

Leu Val Thr Thr Thr Asp Phe Gln Ile Gln Thr Glu Met Ala Ala Thr
        195                 200                 205

Met Glu Thr Ser Ile Phe Thr Thr Glu Tyr Gln Gly Gly Ser Gly
    210                 215                 220

Gly Gly Ser Gly Gly Ser Gly Gly Ser Glu Pro Lys Ser Ser
225                 230                 235                 240

Asp Lys Thr His Thr Ser Pro Pro Ser Pro Ala Pro Glu Leu Leu Gly
                245                 250                 255

Gly Ser Ser Val Phe Leu Phe Pro Pro Lys Pro Lys Asp Thr Leu Met
            260                 265                 270

Ile Ser Arg Thr Pro Glu Val Thr Cys Val Val Val Asp Val Ser His
        275                 280                 285

Glu Asp Pro Glu Val Lys Phe Asn Trp Tyr Val Asp Gly Val Glu Val
290                 295                 300

His Asn Ala Lys Thr Lys Pro Arg Glu Glu Gln Tyr Ala Ser Thr Tyr
305                 310                 315                 320

Arg Val Val Ser Val Leu Thr Val Leu His Gln Asp Trp Leu Asn Gly
                325                 330                 335

Lys Glu Tyr Lys Cys Lys Val Ser Asn Lys Ala Leu Pro Ala Pro Ile
            340                 345                 350

Glu Lys Thr Ile Ser Lys Ala Lys Gly Gln Pro Arg Glu Pro Gln Val
        355                 360                 365

Tyr Thr Leu Pro Pro Ser Arg Asp Glu Leu Thr Lys Asn Gln Val Ser
    370                 375                 380

Leu Thr Cys Leu Val Lys Gly Phe Tyr Pro Ser Asp Ile Ala Val Glu
385                 390                 395                 400

Trp Glu Ser Asn Gly Gln Pro Glu Asn Asn Tyr Lys Thr Thr Pro Pro
                405                 410                 415

Val Leu Asp Ser Asp Gly Ser Phe Phe Leu Tyr Ser Lys Leu Thr Val
            420                 425                 430

Asp Lys Ser Arg Trp Gln Gln Gly Asn Val Phe Ser Cys Ser Val Met
        435                 440                 445

His Glu Ala Leu His Asn His Tyr Thr Gln Lys Ser Leu Ser Leu Ser
    450                 455                 460

Pro Gly Lys
465

<210> SEQ ID NO 24
<211> LENGTH: 16
<212> TYPE: PRT
<213> ORGANISM: Artificial sequence
<220> FEATURE:
<223> OTHER INFORMATION: Synthetic construct

<400> SEQUENCE: 24

Gly Gly Gly Ser Gly Gly Gly Ser Gly Gly Gly Ser Gly Gly Gly Ser
```

<210> SEQ ID NO 25
<211> LENGTH: 19
<212> TYPE: PRT
<213> ORGANISM: Artificial sequence
<220> FEATURE:
<223> OTHER INFORMATION: Synthetic construct

<400> SEQUENCE: 25

```
Met Gly Trp Ser Cys Ile Ile Leu Phe Leu Val Ala Thr Ala Thr Gly
1               5                   10                  15

Val His Ser
```

<210> SEQ ID NO 26
<211> LENGTH: 721
<212> TYPE: PRT
<213> ORGANISM: Artificial sequence
<220> FEATURE:
<223> OTHER INFORMATION: IL-2-gm1-HSA

<400> SEQUENCE: 26

```
Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Asn Leu Thr Phe Lys Phe Tyr Met Pro Lys
            35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Ala Ala Ala Asp Ala His Lys Ser Glu Val Ala
130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
        195                 200                 205

Lys Leu Cys Thr Val Ala Thr Leu Arg Glu Thr Tyr Gly Glu Met Ala
210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
```

-continued

```
              275                 280                 285
Glu Leu Leu Phe Phe Ala Lys Arg Tyr Lys Ala Ala Phe Thr Glu Cys
              290                 295                 300
Cys Gln Ala Ala Asp Lys Ala Ala Cys Leu Leu Pro Lys Leu Asp Glu
305                 310                 315                 320
Leu Arg Asp Glu Gly Lys Ala Ser Ser Ala Lys Gln Arg Leu Lys Cys
                    325                 330                 335
Ala Ser Leu Gln Lys Phe Gly Glu Arg Ala Phe Lys Ala Trp Ala Val
                340                 345                 350
Ala Arg Leu Ser Gln Arg Phe Pro Lys Ala Glu Phe Ala Glu Val Ser
                355                 360                 365
Lys Leu Val Thr Asp Leu Thr Lys Val His Thr Glu Cys Cys His Gly
            370                 375                 380
Asp Leu Leu Glu Cys Ala Asp Asp Arg Ala Asp Leu Ala Lys Tyr Ile
385                 390                 395                 400
Cys Glu Asn Gln Asp Ser Ile Ser Ser Lys Leu Lys Glu Cys Cys Glu
                    405                 410                 415
Lys Pro Leu Leu Glu Lys Ser His Cys Ile Ala Glu Val Glu Asn Asp
                420                 425                 430
Glu Met Pro Ala Asp Leu Pro Ser Leu Ala Ala Asp Phe Val Glu Ser
                435                 440                 445
Lys Asp Val Cys Lys Asn Tyr Ala Glu Ala Lys Asp Val Phe Leu Gly
450                 455                 460
Met Phe Leu Tyr Glu Tyr Ala Arg Arg His Pro Asp Tyr Ser Val Val
465                 470                 475                 480
Leu Leu Leu Arg Leu Ala Lys Thr Tyr Glu Thr Thr Leu Glu Lys Cys
                    485                 490                 495
Cys Ala Ala Ala Asp Pro His Glu Cys Tyr Ala Lys Val Phe Asp Glu
                500                 505                 510
Phe Lys Pro Leu Val Glu Glu Pro Gln Asn Leu Ile Lys Gln Asn Cys
                515                 520                 525
Glu Leu Phe Glu Gln Leu Gly Glu Tyr Lys Phe Gln Asn Ala Leu Leu
            530                 535                 540
Val Arg Tyr Thr Lys Lys Val Pro Gln Val Ser Thr Pro Thr Leu Val
545                 550                 555                 560
Glu Val Ser Arg Asn Leu Gly Lys Val Gly Ser Lys Cys Cys Lys His
                    565                 570                 575
Pro Glu Ala Lys Arg Met Pro Cys Ala Glu Asp Tyr Leu Ser Val Val
                580                 585                 590
Leu Asn Gln Leu Cys Val Leu His Glu Lys Thr Pro Val Ser Asp Arg
                595                 600                 605
Val Thr Lys Cys Cys Thr Glu Ser Leu Val Asn Arg Arg Pro Cys Phe
            610                 615                 620
Ser Ala Leu Glu Val Asp Glu Thr Tyr Val Pro Lys Glu Phe Asn Ala
625                 630                 635                 640
Glu Thr Phe Thr Phe His Ala Asp Ile Cys Thr Leu Ser Glu Lys Glu
                    645                 650                 655
Arg Gln Ile Lys Lys Gln Thr Ala Leu Val Glu Leu Val Lys His Lys
                660                 665                 670
Pro Lys Ala Thr Lys Glu Gln Leu Lys Ala Val Met Asp Asp Phe Ala
                675                 680                 685
Ala Phe Val Glu Lys Cys Cys Lys Ala Asp Asp Lys Glu Thr Cys Phe
            690                 695                 700
```

Ala Glu Glu Gly Lys Lys Leu Val Ala Ala Ser Gln Ala Ala Leu Gly
705                 710                 715                 720

Leu

<210> SEQ ID NO 27
<211> LENGTH: 721
<212> TYPE: PRT
<213> ORGANISM: Artificial sequence
<220> FEATURE:
<223> OTHER INFORMATION: IL-2-gm4-HSA

<400> SEQUENCE: 27

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Ala Ala Asp Ala His Lys Ser Glu Val Ala
    130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
        195                 200                 205

Lys Leu Cys Thr Val Ala Thr Leu Arg Glu Thr Tyr Gly Glu Met Ala
    210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
        275                 280                 285

Glu Leu Leu Phe Phe Ala Lys Arg Tyr Lys Ala Ala Phe Thr Glu Cys
    290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

```
Ala Ser Leu Gln Lys Phe Gly Glu Arg Ala Phe Lys Ala Trp Ala Val
            340                 345                 350
Ala Arg Leu Ser Gln Arg Phe Pro Lys Ala Glu Phe Ala Glu Val Ser
        355                 360                 365
Lys Leu Val Thr Asp Leu Thr Lys Val His Thr Glu Cys Cys His Gly
    370                 375                 380
Asp Leu Leu Glu Cys Ala Asp Asp Arg Ala Asp Leu Ala Lys Tyr Ile
385                 390                 395                 400
Cys Glu Asn Gln Asp Ser Ile Ser Ser Lys Leu Lys Glu Cys Cys Glu
                405                 410                 415
Lys Pro Leu Leu Glu Lys Ser His Cys Ile Ala Glu Val Glu Asn Asp
            420                 425                 430
Glu Met Pro Ala Asp Leu Pro Ser Leu Ala Ala Asp Phe Val Glu Ser
        435                 440                 445
Lys Asp Val Cys Lys Asn Tyr Ala Glu Ala Lys Asp Val Phe Leu Gly
    450                 455                 460
Met Phe Leu Tyr Glu Tyr Ala Arg Arg His Pro Asp Tyr Ser Val Val
465                 470                 475                 480
Leu Leu Leu Arg Leu Ala Lys Thr Tyr Glu Thr Thr Leu Glu Lys Cys
                485                 490                 495
Cys Ala Ala Ala Asp Pro His Glu Cys Tyr Ala Lys Val Phe Asp Glu
            500                 505                 510
Phe Lys Pro Leu Val Glu Glu Pro Gln Asn Leu Ile Lys Gln Asn Cys
        515                 520                 525
Glu Leu Phe Glu Gln Leu Gly Glu Tyr Lys Phe Gln Asn Ala Leu Leu
    530                 535                 540
Val Arg Tyr Thr Lys Lys Val Pro Gln Val Ser Thr Pro Thr Leu Val
545                 550                 555                 560
Glu Val Ser Arg Asn Leu Gly Lys Val Gly Ser Lys Cys Cys Lys His
                565                 570                 575
Pro Glu Ala Lys Arg Met Pro Cys Ala Glu Asp Tyr Leu Ser Val Val
            580                 585                 590
Leu Asn Gln Leu Cys Val Leu His Glu Lys Thr Pro Val Ser Asp Arg
        595                 600                 605
Val Thr Lys Cys Cys Thr Glu Ser Leu Val Asn Arg Arg Pro Cys Phe
    610                 615                 620
Ser Ala Leu Glu Val Asp Glu Thr Tyr Val Pro Lys Glu Phe Asn Ala
625                 630                 635                 640
Glu Thr Phe Thr Phe His Ala Asp Ile Cys Thr Leu Ser Glu Lys Glu
                645                 650                 655
Arg Gln Ile Lys Lys Gln Thr Ala Leu Val Glu Leu Val Lys His Lys
            660                 665                 670
Pro Lys Ala Thr Lys Glu Gln Leu Lys Ala Val Met Asp Asp Phe Ala
        675                 680                 685
Ala Phe Val Glu Lys Cys Cys Lys Ala Asp Asp Lys Glu Thr Cys Phe
    690                 695                 700
Ala Glu Glu Gly Lys Lys Leu Val Ala Ala Ser Gln Ala Ala Leu Gly
705                 710                 715                 720
Leu
```

<210> SEQ ID NO 28
<211> LENGTH: 721
<212> TYPE: PRT
<213> ORGANISM: Artificial sequence
<220> FEATURE:
<223> OTHER INFORMATION: IL-2-gm6-HSA

<400> SEQUENCE: 28

```
Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Asn Leu Thr Phe Lys Phe Tyr Met Pro Lys
        35                  40                  45

Asn Ala Thr Glu Leu Lys His Leu Gln Cys Leu Glu Glu Glu Leu Lys
    50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asn Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Ala Ala Asp Ala His Lys Ser Glu Val Ala
    130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
        195                 200                 205

Lys Leu Cys Thr Val Ala Thr Leu Arg Glu Thr Tyr Gly Glu Met Ala
    210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
        275                 280                 285

Glu Leu Leu Phe Phe Ala Lys Arg Tyr Lys Ala Ala Phe Thr Glu Cys
    290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
        355                 360                 365

Lys Leu Val Thr Asp Leu Thr Lys Val His Thr Glu Cys Cys His Gly
    370                 375                 380

Asp Leu Leu Glu Cys Ala Asp Asp Arg Ala Asp Leu Ala Lys Tyr Ile
385                 390                 395                 400
```

```
Cys Glu Asn Gln Asp Ser Ile Ser Ser Lys Leu Lys Glu Cys Cys Glu
                405                 410                 415
Lys Pro Leu Leu Glu Lys Ser His Cys Ile Ala Glu Val Glu Asn Asp
            420                 425                 430
Glu Met Pro Ala Asp Leu Pro Ser Leu Ala Ala Asp Phe Val Glu Ser
        435                 440                 445
Lys Asp Val Cys Lys Asn Tyr Ala Glu Ala Lys Asp Val Phe Leu Gly
    450                 455                 460
Met Phe Leu Tyr Glu Tyr Ala Arg Arg His Pro Asp Tyr Ser Val Val
465                 470                 475                 480
Leu Leu Leu Arg Leu Ala Lys Thr Tyr Glu Thr Thr Leu Glu Lys Cys
                485                 490                 495
Cys Ala Ala Ala Asp Pro His Glu Cys Tyr Ala Lys Val Phe Asp Glu
            500                 505                 510
Phe Lys Pro Leu Val Glu Glu Pro Gln Asn Leu Ile Lys Gln Asn Cys
        515                 520                 525
Glu Leu Phe Glu Gln Leu Gly Glu Tyr Lys Phe Gln Asn Ala Leu Leu
    530                 535                 540
Val Arg Tyr Thr Lys Lys Val Pro Gln Val Ser Thr Pro Thr Leu Val
545                 550                 555                 560
Glu Val Ser Arg Asn Leu Gly Lys Val Gly Ser Lys Cys Cys Lys His
                565                 570                 575
Pro Glu Ala Lys Arg Met Pro Cys Ala Glu Asp Tyr Leu Ser Val Val
            580                 585                 590
Leu Asn Gln Leu Cys Val Leu His Glu Lys Thr Pro Val Ser Asp Arg
        595                 600                 605
Val Thr Lys Cys Cys Thr Glu Ser Leu Val Asn Arg Arg Pro Cys Phe
    610                 615                 620
Ser Ala Leu Glu Val Asp Glu Thr Tyr Val Pro Lys Glu Phe Asn Ala
625                 630                 635                 640
Glu Thr Phe Thr Phe His Ala Asp Ile Cys Thr Leu Ser Glu Lys Glu
                645                 650                 655
Arg Gln Ile Lys Lys Gln Thr Ala Leu Val Glu Leu Val Lys His Lys
            660                 665                 670
Pro Lys Ala Thr Lys Glu Gln Leu Lys Ala Val Met Asp Asp Phe Ala
        675                 680                 685
Ala Phe Val Glu Lys Cys Cys Lys Ala Asp Asp Lys Glu Thr Cys Phe
    690                 695                 700
Ala Glu Glu Gly Lys Lys Leu Val Ala Ala Ser Gln Ala Ala Leu Gly
705                 710                 715                 720
Leu

<210> SEQ ID NO 29
<211> LENGTH: 721
<212> TYPE: PRT
<213> ORGANISM: Artificial sequence
<220> FEATURE:
<223> OTHER INFORMATION: IL-2-gm7-HSA

<400> SEQUENCE: 29

Ala Pro Ala Ser Ser Ser Thr Lys Lys Thr Gln Leu Gln Leu Glu His
1               5                   10                  15
Leu Leu Leu Asp Leu Gln Met Ile Leu Asn Gly Ile Asn Asn Tyr Lys
            20                  25                  30
```

```
Asn Pro Lys Leu Thr Arg Met Leu Thr Phe Lys Phe Tyr Met Pro Lys
             35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asn Glu Thr Ala
                100                 105                 110

Thr Ile Val Glu Phe Leu Asn Arg Trp Ile Thr Phe Ala Gln Ser Ile
            115                 120                 125

Ile Ser Thr Leu Thr Ala Ala Asp Ala His Lys Ser Glu Val Ala
    130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
    195                 200                 205

Lys Leu Cys Thr Val Ala Thr Leu Arg Glu Thr Tyr Gly Glu Met Ala
210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
    275                 280                 285

Glu Leu Leu Phe Phe Ala Lys Arg Tyr Lys Ala Ala Phe Thr Glu Cys
290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
    355                 360                 365

Lys Leu Val Thr Asp Leu Thr Lys Val His Thr Glu Cys Cys His Gly
370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
                405                 410                 415

Lys Pro Leu Leu Glu Lys Ser His Cys Ile Ala Glu Val Glu Asn Asp
            420                 425                 430

Glu Met Pro Ala Asp Leu Pro Ser Leu Ala Ala Asp Phe Val Glu Ser
    435                 440                 445

Lys Asp Val Cys Lys Asn Tyr Ala Glu Ala Lys Asp Val Phe Leu Gly
```

```
            450                 455                 460
Met Phe Leu Tyr Glu Tyr Ala Arg Arg His Pro Asp Tyr Ser Val Val
465                 470                 475                 480

Leu Leu Leu Arg Leu Ala Lys Thr Tyr Glu Thr Thr Leu Glu Lys Cys
                485                 490                 495

Cys Ala Ala Ala Asp Pro His Glu Cys Tyr Ala Lys Val Phe Asp Glu
            500                 505                 510

Phe Lys Pro Leu Val Glu Glu Pro Gln Asn Leu Ile Lys Gln Asn Cys
        515                 520                 525

Glu Leu Phe Glu Gln Leu Gly Glu Tyr Lys Phe Gln Asn Ala Leu Leu
    530                 535                 540

Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
                565                 570                 575

Pro Glu Ala Lys Arg Met Pro Cys Ala Glu Asp Tyr Leu Ser Val Val
            580                 585                 590

Leu Asn Gln Leu Cys Val Leu His Glu Lys Thr Pro Val Ser Asp Arg
        595                 600                 605

Val Thr Lys Cys Cys Thr Glu Ser Leu Val Asn Arg Arg Pro Cys Phe
    610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
                645                 650                 655

Arg Gln Ile Lys Lys Gln Thr Ala Leu Val Glu Leu Val Lys His Lys
            660                 665                 670

Pro Lys Ala Thr Lys Glu Gln Leu Lys Ala Val Met Asp Asp Phe Ala
        675                 680                 685

Ala Phe Val Glu Lys Cys Cys Lys Ala Asp Asp Lys Glu Thr Cys Phe
    690                 695                 700

Ala Glu Glu Gly Lys Lys Leu Val Ala Ala Ser Gln Ala Ala Leu Gly
705                 710                 715                 720

Leu

<210> SEQ ID NO 30
<211> LENGTH: 721
<212> TYPE: PRT
<213> ORGANISM: Artificial sequence
<220> FEATURE:
<223> OTHER INFORMATION: Synthetic construct

<400> SEQUENCE: 30

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95
```

```
Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
            115                 120                 125

Ile Ser Thr Leu Thr Ala Ala Asp Ala His Lys Ser Glu Val Ala
130             135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
        195                 200                 205

Lys Leu Cys Thr Val Ala Thr Leu Arg Glu Thr Tyr Gly Glu Met Ala
            210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
            275                 280                 285

Glu Leu Leu Phe Phe Ala Lys Arg Tyr Lys Ala Ala Phe Thr Glu Cys
            290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
            355                 360                 365

Lys Leu Val Thr Asp Leu Thr Lys Val His Thr Glu Cys Cys His Gly
            370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
                405                 410                 415

Lys Pro Leu Leu Glu Lys Ser His Cys Ile Ala Glu Val Glu Asn Asp
            420                 425                 430

Glu Met Pro Ala Asp Leu Pro Ser Leu Ala Ala Asp Phe Val Glu Ser
            435                 440                 445

Lys Asp Val Cys Lys Asn Tyr Ala Glu Ala Lys Asp Val Phe Leu Gly
            450                 455                 460

Met Phe Leu Tyr Glu Tyr Ala Arg Arg His Pro Asp Tyr Ser Val Val
465                 470                 475                 480

Leu Leu Leu Arg Leu Ala Lys Thr Tyr Glu Thr Thr Leu Glu Lys Cys
                485                 490                 495

Cys Ala Ala Ala Asp Pro His Glu Cys Tyr Ala Lys Val Phe Asp Glu
            500                 505                 510
```

```
Phe Lys Pro Leu Val Glu Glu Pro Gln Asn Leu Ile Lys Gln Asn Cys
            515                 520                 525

Glu Leu Phe Glu Gln Leu Gly Glu Tyr Lys Phe Gln Asn Ala Leu Leu
530                 535                 540

Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
                565                 570                 575

Pro Glu Ala Lys Arg Met Pro Cys Ala Glu Asp Tyr Leu Ser Val Val
            580                 585                 590

Leu Asn Gln Leu Cys Val Leu His Glu Lys Thr Pro Val Ser Asp Arg
        595                 600                 605

Val Thr Lys Cys Cys Thr Glu Ser Leu Val Asn Arg Arg Pro Cys Phe
    610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
                645                 650                 655

Arg Gln Ile Lys Lys Gln Thr Ala Leu Val Glu Leu Val Lys His Lys
            660                 665                 670

Pro Lys Ala Thr Lys Glu Gln Leu Lys Ala Val Met Asp Asp Phe Ala
        675                 680                 685

Ala Phe Val Glu Lys Cys Cys Lys Ala Asp Asp Lys Glu Thr Cys Phe
    690                 695                 700

Ala Glu Glu Gly Lys Lys Leu Val Ala Ala Ser Gln Ala Ala Leu Gly
705                 710                 715                 720

Leu

<210> SEQ ID NO 31
<211> LENGTH: 257
<212> TYPE: PRT
<213> ORGANISM: Artificial sequence
<220> FEATURE:
<223> OTHER INFORMATION: Synthetic construct

<400> SEQUENCE: 31

Met Asp Ser Tyr Leu Leu Met Trp Gly Leu Leu Thr Phe Ile Met Val
1               5                   10                  15

Pro Gly Cys Gln Ala Glu Leu Cys Asp Asp Pro Pro Glu Ile Pro
                20                  25                  30

His Ala Thr Phe Lys Ala Met Ala Tyr Lys Glu Gly Thr Met Leu Asn
            35                  40                  45

Cys Glu Cys Lys Arg Gly Phe Arg Arg Ile Lys Ser Gly Ser Leu Tyr
        50                  55                  60

Met Leu Cys Thr Gly Asn Ser Ser His Ser Ser Trp Asp Asn Gln Cys
65                  70                  75                  80

Gln Cys Thr Ser Ser Ala Thr Arg Asn Thr Thr Lys Gln Val Thr Pro
                85                  90                  95

Gln Pro Glu Glu Gln Lys Glu Arg Lys Thr Thr Glu Met Gln Ser Pro
            100                 105                 110

Met Gln Pro Val Asp Gln Ala Ser Leu Pro Gly His Cys Arg Glu Pro
        115                 120                 125

Pro Pro Trp Glu Asn Glu Ala Thr Glu Arg Ile Tyr His Phe Val Val
    130                 135                 140

Gly Gln Met Val Tyr Tyr Gln Cys Val Gln Gly Tyr Arg Ala Leu His
```

```
                145                 150                 155                 160
Arg Gly Pro Ala Glu Ser Val Cys Lys Met Thr His Gly Lys Thr Arg
                    165                 170                 175

Trp Thr Gln Pro Gln Leu Ile Cys Thr Gly Glu Met Glu Thr Ser Gln
                    180                 185                 190

Phe Pro Gly Glu Glu Lys Pro Gln Ala Ser Pro Gly Arg Pro Glu
                    195                 200                 205

Ser Glu Thr Ser Cys Leu Val Thr Thr Thr Asp Phe Gln Ile Gln Thr
                    210                 215                 220

Glu Met Ala Ala Thr Met Glu Thr Ser Ile Phe Thr Thr Glu Tyr Gln
225                 230                 235                 240

Asp Asp Asp Asp Lys Ser Gly Gly Gly Ser His His His His His
                    245                 250                 255

His

<210> SEQ ID NO 32
<211> LENGTH: 477
<212> TYPE: PRT
<213> ORGANISM: Artificial sequence
<220> FEATURE:
<223> OTHER INFORMATION: Synthetic construct

<400> SEQUENCE: 32

Met Gly Trp Ser Cys Ile Ile Leu Phe Leu Val Ala Thr Ala Thr Gly
1               5                   10                  15

Val His Ser Ala Ser Glu Pro Lys Ser Cys Asp Lys Thr His Thr Cys
                    20                  25                  30

Pro Pro Cys Pro Ala Pro Glu Leu Leu Gly Gly Pro Ser Val Phe Leu
            35                  40                  45

Phe Pro Pro Lys Pro Lys Asp Thr Leu Met Ile Ser Arg Thr Pro Glu
        50                  55                  60

Val Thr Cys Val Val Val Asp Val Ser His Glu Asp Pro Glu Val Lys
65                  70                  75                  80

Phe Asn Trp Tyr Val Asp Gly Val Glu Val His Asn Ala Lys Thr Lys
                    85                  90                  95

Pro Arg Glu Glu Gln Tyr Asn Ser Thr Tyr Arg Val Val Ser Val Leu
                100                 105                 110

Thr Val Leu His Gln Asp Trp Leu Asn Gly Lys Glu Tyr Lys Cys Lys
            115                 120                 125

Val Ser Asn Lys Ala Leu Pro Ala Pro Ile Glu Lys Thr Ile Ser Lys
        130                 135                 140

Ala Lys Gly Gln Pro Arg Glu Pro Gln Val Tyr Thr Leu Pro Pro Ser
145                 150                 155                 160

Arg Asp Glu Leu Thr Lys Asn Gln Val Ser Leu Trp Cys Leu Val Lys
                    165                 170                 175

Gly Phe Tyr Pro Ser Asp Ile Ala Val Glu Trp Glu Ser Asn Gly Gln
                180                 185                 190

Pro Glu Asn Asn Tyr Lys Thr Thr Pro Pro Val Leu Asp Ser Asp Gly
            195                 200                 205

Ser Phe Phe Leu Tyr Ser Lys Leu Thr Val Asp Lys Ser Arg Trp Gln
        210                 215                 220

Gln Gly Asn Val Phe Ser Cys Ser Val Met His Glu Ala Leu His Asn
225                 230                 235                 240

His Tyr Thr Gln Lys Ser Leu Ser Leu Ser Pro Gly Ser Gly Gly Gly
                    245                 250                 255
```

Gly Ser Asp Asp Asp Lys Ala Val Asn Gly Thr Ser Gln Phe Thr
            260                 265                 270

Cys Phe Tyr Asn Ser Arg Ala Asn Ile Ser Cys Val Trp Ser Gln Asp
            275                 280                 285

Gly Ala Leu Gln Asp Thr Ser Cys Gln Val His Ala Trp Pro Asp Arg
            290                 295                 300

Arg Arg Trp Asn Gln Thr Cys Glu Leu Leu Pro Val Ser Gln Ala Ser
305                 310                 315                 320

Trp Ala Cys Asn Leu Ile Leu Gly Ala Pro Asp Ser Gln Lys Leu Thr
                325                 330                 335

Thr Val Asp Ile Val Thr Leu Arg Val Leu Cys Arg Glu Gly Val Arg
                340                 345                 350

Trp Arg Val Met Ala Ile Gln Asp Phe Lys Pro Phe Glu Asn Leu Arg
                355                 360                 365

Leu Met Ala Pro Ile Ser Leu Gln Val Val His Val Glu Thr His Arg
            370                 375                 380

Cys Asn Ile Ser Trp Glu Ile Ser Gln Ala Ser His Tyr Phe Glu Arg
385                 390                 395                 400

His Leu Glu Phe Glu Ala Arg Thr Leu Ser Pro Gly His Thr Trp Glu
                405                 410                 415

Glu Ala Pro Leu Leu Thr Leu Lys Gln Lys Gln Glu Trp Ile Cys Leu
                420                 425                 430

Glu Thr Leu Thr Pro Asp Thr Gln Tyr Glu Phe Gln Val Arg Val Lys
            435                 440                 445

Pro Leu Gln Gly Glu Phe Thr Thr Trp Ser Pro Trp Ser Gln Pro Leu
            450                 455                 460

Ala Phe Arg Thr Lys Pro Ala Ala Leu Gly Lys Asp Thr
465                 470                 475

<210> SEQ ID NO 33
<211> LENGTH: 503
<212> TYPE: PRT
<213> ORGANISM: Artificial sequence
<220> FEATURE:
<223> OTHER INFORMATION: Synthetic construct

<400> SEQUENCE: 33

Met Gly Trp Ser Cys Ile Ile Leu Phe Leu Val Ala Thr Ala Thr Gly
1               5                   10                  15

Val His Ser Ala Ser Glu Pro Lys Ser Cys Asp Lys Thr His Thr Cys
                20                  25                  30

Pro Pro Cys Pro Ala Pro Glu Leu Leu Gly Gly Pro Ser Val Phe Leu
            35                  40                  45

Phe Pro Pro Lys Pro Lys Asp Thr Leu Met Ile Ser Arg Thr Pro Glu
        50                  55                  60

Val Thr Cys Val Val Val Asp Val Ser His Glu Asp Pro Glu Val Lys
65                  70                  75                  80

Phe Asn Trp Tyr Val Asp Gly Val Glu Val His Asn Ala Lys Thr Lys
                85                  90                  95

Pro Arg Glu Glu Gln Tyr Asn Ser Thr Tyr Arg Val Val Ser Val Leu
            100                 105                 110

Thr Val Leu His Gln Asp Trp Leu Asn Gly Lys Glu Tyr Lys Cys Lys
        115                 120                 125

Val Ser Asn Lys Ala Leu Pro Ala Pro Ile Glu Lys Thr Ile Ser Lys
    130                 135                 140

Ala Lys Gly Gln Pro Arg Glu Pro Gln Val Tyr Thr Leu Pro Pro Ser
145                 150                 155                 160

Arg Asp Glu Leu Thr Lys Asn Gln Val Ser Leu Ser Cys Ala Val Lys
                165                 170                 175

Gly Phe Tyr Pro Ser Asp Ile Ala Val Glu Trp Glu Ser Asn Gly Gln
            180                 185                 190

Pro Glu Asn Asn Tyr Lys Thr Thr Pro Pro Val Leu Asp Ser Asp Gly
        195                 200                 205

Ser Phe Phe Leu Val Ser Lys Leu Thr Val Asp Lys Ser Arg Trp Gln
210                 215                 220

Gln Gly Asn Val Phe Ser Cys Ser Val Met His Glu Ala Leu His Asn
225                 230                 235                 240

His Tyr Thr Gln Lys Ser Leu Ser Leu Ser Pro Gly Ser Gly Gly Gly
                245                 250                 255

Gly Ser Asp Asp Asp Lys Leu Asn Thr Thr Ile Leu Thr Pro Asn
            260                 265                 270

Gly Asn Glu Asp Thr Thr Ala Asp Phe Phe Leu Thr Thr Met Pro Thr
        275                 280                 285

Asp Ser Leu Ser Val Ser Thr Leu Pro Leu Pro Glu Val Gln Cys Phe
290                 295                 300

Val Phe Asn Val Glu Tyr Met Asn Cys Thr Trp Asn Ser Ser Ser Glu
305                 310                 315                 320

Pro Gln Pro Thr Asn Leu Thr Leu His Tyr Trp Tyr Lys Asn Ser Asp
                325                 330                 335

Asn Asp Lys Val Gln Lys Cys Ser His Tyr Leu Phe Ser Glu Glu Ile
            340                 345                 350

Thr Ser Gly Cys Gln Leu Gln Lys Lys Glu Ile His Leu Tyr Gln Thr
        355                 360                 365

Phe Val Val Gln Leu Gln Asp Pro Arg Glu Pro Arg Arg Gln Ala Thr
370                 375                 380

Gln Met Leu Lys Leu Gln Asn Leu Val Ile Pro Trp Ala Pro Glu Asn
385                 390                 395                 400

Leu Thr Leu His Lys Leu Ser Glu Ser Gln Leu Glu Leu Asn Trp Asn
                405                 410                 415

Asn Arg Phe Leu Asn His Cys Leu Glu His Leu Val Gln Tyr Arg Thr
            420                 425                 430

Asp Trp Asp His Ser Trp Thr Glu Gln Ser Val Asp Tyr Arg His Lys
        435                 440                 445

Phe Ser Leu Pro Ser Val Asp Gly Gln Lys Arg Tyr Thr Phe Arg Val
450                 455                 460

Arg Ser Arg Phe Asn Pro Leu Cys Gly Ser Ala Gln His Trp Ser Glu
465                 470                 475                 480

Trp Ser His Pro Ile His Trp Gly Ser Asn Thr Ser Lys Glu Asn Pro
                485                 490                 495

Phe Leu Phe Ala Leu Glu Ala
            500

<210> SEQ ID NO 34
<211> LENGTH: 721
<212> TYPE: PRT
<213> ORGANISM: Artificial sequence
<220> FEATURE:
<223> OTHER INFORMATION: IL-2-gm1a-HSA

<400> SEQUENCE: 34

```
Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25              30

Asn Pro Lys Leu Thr Arg Asp Leu Thr Phe Lys Phe Tyr Met Pro Lys
            35              40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ala Gln Ser Ile
            115                 120                 125

Ile Ser Thr Leu Thr Ala Ala Ala Asp Ala His Lys Ser Glu Val Ala
        130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
            195                 200                 205

Lys Leu Cys Thr Val Ala Thr Leu Arg Glu Thr Tyr Gly Glu Met Ala
210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
            275                 280                 285

Glu Leu Leu Phe Phe Ala Lys Arg Tyr Lys Ala Ala Phe Thr Glu Cys
            290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
            355                 360                 365

Lys Leu Val Thr Asp Leu Thr Lys Val His Thr Glu Cys Cys His Gly
            370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
                405                 410                 415
```

```
Lys Pro Leu Leu Glu Lys Ser His Cys Ile Ala Glu Val Glu Asn Asp
            420                 425                 430

Glu Met Pro Ala Asp Leu Pro Ser Leu Ala Ala Asp Phe Val Glu Ser
        435                 440                 445

Lys Asp Val Cys Lys Asn Tyr Ala Glu Ala Lys Asp Val Phe Leu Gly
    450                 455                 460

Met Phe Leu Tyr Glu Tyr Ala Arg Arg His Pro Asp Tyr Ser Val Val
465                 470                 475                 480

Leu Leu Leu Arg Leu Ala Lys Thr Tyr Glu Thr Thr Leu Glu Lys Cys
                485                 490                 495

Cys Ala Ala Ala Asp Pro His Glu Cys Tyr Ala Lys Val Phe Asp Glu
            500                 505                 510

Phe Lys Pro Leu Val Glu Glu Pro Gln Asn Leu Ile Lys Gln Asn Cys
        515                 520                 525

Glu Leu Phe Glu Gln Leu Gly Glu Tyr Lys Phe Gln Asn Ala Leu Leu
    530                 535                 540

Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
                565                 570                 575

Pro Glu Ala Lys Arg Met Pro Cys Ala Glu Asp Tyr Leu Ser Val Val
            580                 585                 590

Leu Asn Gln Leu Cys Val Leu His Glu Lys Thr Pro Val Ser Asp Arg
        595                 600                 605

Val Thr Lys Cys Cys Thr Glu Ser Leu Val Asn Arg Arg Pro Cys Phe
    610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
                645                 650                 655

Arg Gln Ile Lys Lys Gln Thr Ala Leu Val Glu Leu Val Lys His Lys
            660                 665                 670

Pro Lys Ala Thr Lys Glu Gln Leu Lys Ala Val Met Asp Asp Phe Ala
        675                 680                 685

Ala Phe Val Glu Lys Cys Cys Lys Ala Asp Asp Lys Glu Thr Cys Phe
    690                 695                 700

Ala Glu Glu Gly Lys Lys Leu Val Ala Ala Ser Gln Ala Ala Leu Gly
705                 710                 715                 720

Leu

<210> SEQ ID NO 35
<211> LENGTH: 721
<212> TYPE: PRT
<213> ORGANISM: Artificial sequence
<220> FEATURE:
<223> OTHER INFORMATION: IL-2-gm1b-HSA

<400> SEQUENCE: 35

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Glu Leu Thr Phe Lys Phe Tyr Met Pro Lys
        35                  40                  45

Lys Ala Thr Glu Leu Lys His Leu Gln Cys Leu Glu Glu Glu Leu Lys
```

```
                50                  55                  60
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ala Gln Ser Ile
                115                 120                 125

Ile Ser Thr Leu Thr Ala Ala Asp Ala His Lys Ser Glu Val Ala
130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175

Lys Leu Val Asn Glu Val Thr Glu Phe Ala Lys Thr Cys Val Ala Asp
                180                 185                 190

Glu Ser Ala Glu Asn Cys Asp Lys Ser Leu His Thr Leu Phe Gly Asp
                195                 200                 205

Lys Leu Cys Thr Val Ala Thr Leu Arg Glu Thr Tyr Gly Glu Met Ala
210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
                260                 265                 270

Lys Tyr Leu Tyr Glu Ile Ala Arg Arg His Pro Tyr Phe Tyr Ala Pro
                275                 280                 285

Glu Leu Leu Phe Phe Ala Lys Arg Tyr Lys Ala Ala Phe Thr Glu Cys
                290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
                325                 330                 335

Ala Ser Leu Gln Lys Phe Gly Glu Arg Ala Phe Lys Ala Trp Ala Val
                340                 345                 350

Ala Arg Leu Ser Gln Arg Phe Pro Lys Ala Glu Phe Ala Glu Val Ser
                355                 360                 365

Lys Leu Val Thr Asp Leu Thr Lys Val His Thr Glu Cys Cys His Gly
                370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
                405                 410                 415

Lys Pro Leu Leu Glu Lys Ser His Cys Ile Ala Glu Val Glu Asn Asp
                420                 425                 430

Glu Met Pro Ala Asp Leu Pro Ser Leu Ala Ala Asp Phe Val Glu Ser
                435                 440                 445

Lys Asp Val Cys Lys Asn Tyr Ala Glu Ala Lys Asp Val Phe Leu Gly
                450                 455                 460

Met Phe Leu Tyr Glu Tyr Ala Arg Arg His Pro Asp Tyr Ser Val Val
465                 470                 475                 480
```

```
Leu Leu Leu Arg Leu Ala Lys Thr Tyr Glu Thr Thr Leu Glu Lys Cys
            485                 490                 495

Cys Ala Ala Ala Asp Pro His Glu Cys Tyr Ala Lys Val Phe Asp Glu
            500                 505                 510

Phe Lys Pro Leu Val Glu Glu Pro Gln Asn Leu Ile Lys Gln Asn Cys
            515                 520                 525

Glu Leu Phe Glu Gln Leu Gly Glu Tyr Lys Phe Gln Asn Ala Leu Leu
            530                 535                 540

Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
            565                 570                 575

Pro Glu Ala Lys Arg Met Pro Cys Ala Glu Asp Tyr Leu Ser Val Val
            580                 585                 590

Leu Asn Gln Leu Cys Val Leu His Glu Lys Thr Pro Val Ser Asp Arg
            595                 600                 605

Val Thr Lys Cys Cys Thr Glu Ser Leu Val Asn Arg Arg Pro Cys Phe
            610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
            645                 650                 655

Arg Gln Ile Lys Lys Gln Thr Ala Leu Val Glu Leu Val Lys His Lys
            660                 665                 670

Pro Lys Ala Thr Lys Glu Gln Leu Lys Ala Val Met Asp Asp Phe Ala
            675                 680                 685

Ala Phe Val Glu Lys Cys Cys Lys Ala Asp Asp Lys Glu Thr Cys Phe
            690                 695                 700

Ala Glu Glu Gly Lys Lys Leu Val Ala Ala Ser Gln Ala Ala Leu Gly
705                 710                 715                 720

Leu

<210> SEQ ID NO 36
<211> LENGTH: 721
<212> TYPE: PRT
<213> ORGANISM: Artificial sequence
<220> FEATURE:
<223> OTHER INFORMATION: IL-2-gm1c-HSA

<400> SEQUENCE: 36

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Gln Leu Thr Phe Lys Phe Tyr Met Pro Lys
            35                  40                  45

Lys Ala Thr Glu Leu Lys His Leu Gln Cys Leu Glu Glu Glu Leu Lys
            50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
            85                  90                  95

Lys Gly Ser Glu Thr Thr Phe Met Cys Glu Tyr Ala Asp Glu Thr Ala
            100                 105                 110
```

-continued

Thr Ile Val Glu Phe Leu Asn Arg Trp Ile Thr Phe Ala Gln Ser Ile
            115                 120                 125

Ile Ser Thr Leu Thr Ala Ala Asp Ala His Lys Ser Glu Val Ala
130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
            165                 170                 175

Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
        195                 200                 205

Lys Leu Cys Thr Val Ala Thr Leu Arg Glu Thr Tyr Gly Glu Met Ala
        210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
            245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
        275                 280                 285

Glu Leu Leu Phe Phe Ala Lys Arg Tyr Lys Ala Ala Phe Thr Glu Cys
        290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
            325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
        355                 360                 365

Lys Leu Val Thr Asp Leu Thr Lys Val His Thr Glu Cys Cys His Gly
        370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
            405                 410                 415

Lys Pro Leu Leu Glu Lys Ser His Cys Ile Ala Glu Val Glu Asn Asp
            420                 425                 430

Glu Met Pro Ala Asp Leu Pro Ser Leu Ala Ala Asp Phe Val Glu Ser
        435                 440                 445

Lys Asp Val Cys Lys Asn Tyr Ala Glu Ala Lys Asp Val Phe Leu Gly
        450                 455                 460

Met Phe Leu Tyr Glu Tyr Ala Arg Arg His Pro Asp Tyr Ser Val Val
465                 470                 475                 480

Leu Leu Leu Arg Leu Ala Lys Thr Tyr Glu Thr Thr Leu Glu Lys Cys
            485                 490                 495

Cys Ala Ala Ala Asp Pro His Glu Cys Tyr Ala Lys Val Phe Asp Glu
            500                 505                 510

Phe Lys Pro Leu Val Glu Glu Pro Gln Asn Leu Ile Lys Gln Asn Cys
        515                 520                 525

Glu Leu Phe Glu Gln Leu Gly Glu Tyr Lys Phe Gln Asn Ala Leu Leu

```
            530                 535                 540
Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
                565                 570                 575

Pro Glu Ala Lys Arg Met Pro Cys Ala Glu Asp Tyr Leu Ser Val Val
                580                 585                 590

Leu Asn Gln Leu Cys Val Leu His Glu Lys Thr Pro Val Ser Asp Arg
            595                 600                 605

Val Thr Lys Cys Cys Thr Glu Ser Leu Val Asn Arg Arg Pro Cys Phe
        610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
                645                 650                 655

Arg Gln Ile Lys Lys Gln Thr Ala Leu Val Glu Leu Val Lys His Lys
                660                 665                 670

Pro Lys Ala Thr Lys Glu Gln Leu Lys Ala Val Met Asp Asp Phe Ala
            675                 680                 685

Ala Phe Val Glu Lys Cys Cys Lys Ala Asp Asp Lys Glu Thr Cys Phe
        690                 695                 700

Ala Glu Glu Gly Lys Lys Leu Val Ala Ala Ser Gln Ala Ala Leu Gly
705                 710                 715                 720

Leu

<210> SEQ ID NO 37
<211> LENGTH: 721
<212> TYPE: PRT
<213> ORGANISM: Artificial sequence
<220> FEATURE:
<223> OTHER INFORMATION: IL-2-gm1d-HSA

<400> SEQUENCE: 37

Ala Pro Ala Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Ala Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ala Gln Ser Ile
        115                 120                 125

Ile Ser Thr Leu Thr Ala Ala Asp Ala His Lys Ser Glu Val Ala
    130                 135                 140

His Arg Phe Lys Asp Leu Gly Glu Glu Asn Phe Lys Ala Leu Val Leu
145                 150                 155                 160

Ile Ala Phe Ala Gln Tyr Leu Gln Gln Cys Pro Phe Glu Asp His Val
                165                 170                 175
```

```
Lys Leu Val Asn Glu Val Thr Glu Phe Ala Lys Thr Cys Val Ala Asp
            180                 185                 190

Glu Ser Ala Glu Asn Cys Asp Lys Ser Leu His Thr Leu Phe Gly Asp
            195                 200                 205

Lys Leu Cys Thr Val Ala Thr Leu Arg Glu Thr Tyr Gly Glu Met Ala
            210                 215                 220

Asp Cys Cys Ala Lys Gln Glu Pro Glu Arg Asn Glu Cys Phe Leu Gln
225                 230                 235                 240

His Lys Asp Asp Asn Pro Asn Leu Pro Arg Leu Val Arg Pro Glu Val
                245                 250                 255

Asp Val Met Cys Thr Ala Phe His Asp Asn Glu Glu Thr Phe Leu Lys
            260                 265                 270

Lys Tyr Leu Tyr Glu Ile Ala Arg Arg His Pro Tyr Phe Tyr Ala Pro
            275                 280                 285

Glu Leu Leu Phe Phe Ala Lys Arg Tyr Lys Ala Ala Phe Thr Glu Cys
            290                 295                 300

Cys Gln Ala Ala Asp Lys Ala Ala Cys Leu Leu Pro Lys Leu Asp Glu
305                 310                 315                 320

Leu Arg Asp Glu Gly Lys Ala Ser Ser Ala Lys Gln Arg Leu Lys Cys
            325                 330                 335

Ala Ser Leu Gln Lys Phe Gly Glu Arg Ala Phe Lys Ala Trp Ala Val
            340                 345                 350

Ala Arg Leu Ser Gln Arg Phe Pro Lys Ala Glu Phe Ala Glu Val Ser
            355                 360                 365

Lys Leu Val Thr Asp Leu Thr Lys Val His Thr Glu Cys Cys His Gly
            370                 375                 380

Asp Leu Leu Glu Cys Ala Asp Asp Arg Ala Asp Leu Ala Lys Tyr Ile
385                 390                 395                 400

Cys Glu Asn Gln Asp Ser Ile Ser Ser Lys Leu Lys Glu Cys Cys Glu
                405                 410                 415

Lys Pro Leu Leu Glu Lys Ser His Cys Ile Ala Glu Val Glu Asn Asp
            420                 425                 430

Glu Met Pro Ala Asp Leu Pro Ser Leu Ala Ala Asp Phe Val Glu Ser
            435                 440                 445

Lys Asp Val Cys Lys Asn Tyr Ala Glu Ala Lys Asp Val Phe Leu Gly
            450                 455                 460

Met Phe Leu Tyr Glu Tyr Ala Arg Arg His Pro Asp Tyr Ser Val Val
465                 470                 475                 480

Leu Leu Leu Arg Leu Ala Lys Thr Tyr Glu Thr Thr Leu Glu Lys Cys
                485                 490                 495

Cys Ala Ala Ala Asp Pro His Glu Cys Tyr Ala Lys Val Phe Asp Glu
            500                 505                 510

Phe Lys Pro Leu Val Glu Glu Pro Gln Asn Leu Ile Lys Gln Asn Cys
            515                 520                 525

Glu Leu Phe Glu Gln Leu Gly Glu Tyr Lys Phe Gln Asn Ala Leu Leu
            530                 535                 540

Val Arg Tyr Thr Lys Lys Val Pro Gln Val Ser Thr Pro Thr Leu Val
545                 550                 555                 560

Glu Val Ser Arg Asn Leu Gly Lys Val Gly Ser Lys Cys Cys Lys His
                565                 570                 575

Pro Glu Ala Lys Arg Met Pro Cys Ala Glu Asp Tyr Leu Ser Val Val
            580                 585                 590
```

-continued

```
Leu Asn Gln Leu Cys Val Leu His Glu Lys Thr Pro Val Ser Asp Arg
            595                 600                 605

Val Thr Lys Cys Cys Thr Glu Ser Leu Val Asn Arg Arg Pro Cys Phe
    610                 615                 620

Ser Ala Leu Glu Val Asp Glu Thr Tyr Val Pro Lys Glu Phe Asn Ala
625                 630                 635                 640

Glu Thr Phe Thr Phe His Ala Asp Ile Cys Thr Leu Ser Glu Lys Glu
                645                 650                 655

Arg Gln Ile Lys Lys Gln Thr Ala Leu Val Glu Leu Val Lys His Lys
            660                 665                 670

Pro Lys Ala Thr Lys Glu Gln Leu Lys Ala Val Met Asp Asp Phe Ala
            675                 680                 685

Ala Phe Val Glu Lys Cys Cys Lys Ala Asp Asp Lys Glu Thr Cys Phe
    690                 695                 700

Ala Glu Glu Gly Lys Lys Leu Val Ala Ala Ser Gln Ala Ala Leu Gly
705                 710                 715                 720

Leu
```